US012153154B2

(12) United States Patent
Jouaux et al.

(10) Patent No.: US 12,153,154 B2
(45) Date of Patent: Nov. 26, 2024

(54) PROVIDING TRANSIT INFORMATION

(71) Applicant: Apple Inc., Cupertino, CA (US)

(72) Inventors: François M. Jouaux, Woodside, CA (US); Rama Krishna Chitta, Milpitas, CA (US); Lukas M. Marti, Santa Clara, CA (US); Michael P. Dal Santo, San Francisco, CA (US); Ronald Keryuan Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/566,476

(22) Filed: Dec. 30, 2021

(65) Prior Publication Data

US 2022/0221552 A1 Jul. 14, 2022

Related U.S. Application Data

(63) Continuation of application No. 16/276,986, filed on Feb. 15, 2019, now Pat. No. 11,385,318, which is a
(Continued)

(51) Int. Cl.
*G01S 5/02* (2010.01)
*G01C 21/26* (2006.01)
(Continued)

(52) U.S. Cl.
CPC ............ *G01S 5/0294* (2013.01); *G01C 21/26* (2013.01); *G01C 21/3691* (2013.01);
(Continued)

(58) Field of Classification Search
CPC ....... G01S 5/0294; H04W 4/42; H04W 4/024; H04W 4/029; H04W 4/40; H04W 4/023;
(Continued)

(56) References Cited

U.S. PATENT DOCUMENTS 6,138,026 A  10/2000  Irvin
6,374,176 B1  4/2002  Schmier et al.
(Continued)

FOREIGN PATENT DOCUMENTS

| CN | 1486576 A | 3/2004 |
|---|---|---|
| CN | 101438580 A | 5/2009 |
| CN | 101989127 A | 3/2011 |
| CN | 102087722 A | 6/2011 |
| CN | 102298608 A | 12/2011 |
| CN | 102577158 A | 7/2012 |

(Continued)

OTHER PUBLICATIONS

Daniel Kelly et al: "Uncovering Measurements of Social and Demographic Behavior From Smartphone Location Data", https://www.researchgate.net/journal/IEEE-Transactions-on-Systems-Man-and-Cybernetics-Part-A-Systems-and-Humans-1083-4427, vol. 43, No. 2, Mar. 2013 (Mar. 2013), pp. 188-198, XP011493864, ISSN: 2168-2291, DOI: 10.1109ArSMC. 2013.2238926.

*Primary Examiner* — Peter D Nolan
*Assistant Examiner* — Luke Huynh
(74) *Attorney, Agent, or Firm* — Aikin & Gallant, LLP

(57) ABSTRACT

Methods, systems, and computer program products for determining transit routes through crowd-sourcing, for determining an estimated time of arrival (ETA) of a vehicle of the transit route at a given location, and for providing predictive reminders to a user for catching a vehicle of the transit route. A server receives signal source information about wireless signal sources detected by user devices, including information about a first wireless signal source detected by some devices. The server determines that the first wireless signal source is moving. The server determines that the first wireless signal source is associated with a public transit route upon determining that the signal source information satisfies one or more selection criteria. The server stores information associating the first wireless signal source with the public transit route as transit movement data corresponding to the public transit route.

20 Claims, 21 Drawing Sheets

Related U.S. Application Data continuation of application No. 15/069,642, filed on Mar. 14, 2016, now Pat. No. 10,209,341, which is a continuation of application No. 14/502,104, filed on Sep. 30, 2014, now Pat. No. 9,285,231, which is a continuation of application No. PCT/US2014/054320, filed on Sep. 5, 2014, which is a continuation of application No. 14/020,689, filed on Sep. 6, 2013, now Pat. No. 9,267,805.

(60) Provisional application No. 62/004,989, filed on May 30, 2014.

(51) Int. Cl.
```
G01C 21/36      (2006.01)
G06Q 10/047     (2023.01)
G06Q 10/101     (2023.01)
G06Q 90/00      (2006.01)
G08G 1/01       (2006.01)
G08G 1/123      (2006.01)
H04W 4/02       (2018.01)
H04W 4/024      (2018.01)
H04W 4/029      (2018.01)
H04W 4/40       (2018.01)
H04W 4/42       (2018.01)
H04W 88/00      (2009.01)
```

(52) U.S. Cl.
CPC ......... *G06Q 10/047* (2013.01); *G06Q 10/101* (2013.01); *G06Q 90/00* (2013.01); *G08G 1/0112* (2013.01); *G08G 1/0125* (2013.01); *G08G 1/0141* (2013.01); *G08G 1/123* (2013.01); *H04W 4/023* (2013.01); *H04W 4/024* (2018.02); *H04W 4/029* (2018.02); *H04W 4/40* (2018.02); *H04W 4/42* (2018.02); *H04W 88/005* (2013.01)

(58) Field of Classification Search
CPC .. G01C 21/26; G01C 21/3691; G06Q 10/047; G06Q 10/101; G06Q 90/00; G08G 1/0112; G08G 1/0125; G08G 1/0141; G08G 1/123
USPC ......................................................... 701/465
See application file for complete search history.

(56) References Cited

U.S. PATENT DOCUMENTS

| | | |
|---|---|---|
| 6,477,462 B1 | 11/2002 | Rychlak |
| 6,889,138 B1 | 5/2005 | Krull et al. |
| 7,571,050 B2 | 8/2009 | Liebling |
| 8,090,393 B1 | 1/2012 | Emigh et al. |
| 8,102,255 B1 | 1/2012 | Emigh |
| 8,138,907 B2 | 3/2012 | Barbeau et al. |
| 8,188,859 B1 | 5/2012 | Emigh |
| 8,299,915 B1 | 10/2012 | Emigh |
| 8,385,944 B1 | 2/2013 | Nelissen |
| 8,577,332 B1 | 11/2013 | Quint et al. |
| 8,797,156 B1 | 8/2014 | Emigh |
| 8,990,107 B2 | 3/2015 | Liang et al. |
| 9,046,375 B1 | 6/2015 | Emigh |
| 9,076,009 B2 | 7/2015 | Sathish et al. |
| 9,194,717 B2 | 11/2015 | Jouaux et al. |
| 9,243,911 B2 | 1/2016 | Coughlin et al. |
| 9,267,805 B2 | 2/2016 | Marti et al. |
| 9,285,231 B2 | 3/2016 | Jouaux et al. |
| 9,615,202 B2 | 4/2017 | Dal Santo et al. |
| 9,778,345 B2 | 10/2017 | Jouaux et al. |
| 9,807,565 B2 | 10/2017 | Marti et al. |
| 9,843,894 B2 | 12/2017 | Marti et al. |
| 9,843,895 B2 | 12/2017 | Huang et al. |
| 10,111,042 B2 | 10/2018 | Marti et al. |
| 10,209,341 B2 | 2/2019 | Jouaux et al. |
| 10,362,440 B2 | 7/2019 | Dal Santo et al. |
| 10,375,515 B2 | 8/2019 | Jensen et al. |
| 10,791,419 B2 | 9/2020 | Dal Santo et al. |
| 11,363,405 B2 | 6/2022 | Dal Santo et al. |
| 11,385,318 B2 | 7/2022 | Jouaux et al. |
| 2002/0069017 A1 | 6/2002 | Schmier et al. |
| 2002/0161587 A1 | 10/2002 | Pitts |
| 2003/0014181 A1 | 1/2003 | Myr |
| 2003/0137435 A1 | 7/2003 | Haddad et al. |
| 2003/0148771 A1 | 8/2003 | De Verteuil |
| 2004/0088104 A1 | 5/2004 | Izbicki et al. |
| 2005/0258980 A1 | 11/2005 | Conover |
| 2006/0009905 A1 | 1/2006 | Soderberg et al. |
| 2006/0164259 A1 | 7/2006 | Winkler et al. |
| 2006/0173618 A1 | 8/2006 | Eyer et al. |
| 2007/0016553 A1 | 1/2007 | Dumals |
| 2007/0024440 A1 | 2/2007 | Moran et al. |
| 2007/0149214 A1 | 6/2007 | Walsh et al. |
| 2007/0191029 A1 | 8/2007 | Zarem et al. |
| 2008/0001276 A1 | 1/2008 | Lee et al. |
| 2008/0007399 A1 | 1/2008 | Hart |
| 2008/0012761 A1 | 1/2008 | Derrick et al. |
| 2008/0255758 A1 | 10/2008 | Graham et al. |
| 2009/0196267 A1 | 8/2009 | Walker, Sr. |
| 2010/0106603 A1 | 4/2010 | Dey et al. |
| 2010/0183134 A1 | 7/2010 | Vendrow et al. |
| 2010/0197325 A1 | 8/2010 | Dredge |
| 2010/0225447 A1* | 9/2010 | Adra ................ G01S 5/0294 340/10.1 |
| 2010/0268450 A1 | 10/2010 | Evanitsky |
| 2010/0287178 A1 | 11/2010 | Lambert et al. |
| 2010/0304756 A1 | 12/2010 | Yang |
| 2011/0029465 A1 | 2/2011 | Ito et al. |
| 2011/0046881 A1 | 2/2011 | Karaoguz |
| 2011/0070863 A1* | 3/2011 | Ma ..................... H04W 4/029 455/410 |
| 2011/0070865 A1 | 3/2011 | Nelson et al. |
| 2011/0071881 A1 | 3/2011 | Zheng et al. |
| 2011/0072020 A1 | 3/2011 | Ngo et al. |
| 2011/0137834 A1 | 6/2011 | Ide et al. |
| 2011/0184768 A1 | 7/2011 | Norton et al. |
| 2011/0195727 A1 | 8/2011 | Proulx et al. |
| 2011/0219328 A1 | 9/2011 | Ilvessalmi et al. |
| 2011/0300852 A1 | 12/2011 | Krishnaswamy et al. |
| 2011/0313956 A1 | 12/2011 | Abe et al. |
| 2012/0052871 A1 | 3/2012 | Cochran |
| 2012/0058782 A1 | 3/2012 | Li |
| 2012/0088525 A1 | 4/2012 | Kurokawa |
| 2012/0108259 A1 | 5/2012 | Weiss |
| 2012/0122407 A1 | 5/2012 | Alpress et al. |
| 2012/0131066 A1 | 5/2012 | Jain |
| 2012/0149394 A1 | 6/2012 | Singh et al. |
| 2012/0149415 A1 | 6/2012 | Valaee et al. |
| 2012/0182933 A1 | 7/2012 | Bandhakavi et al. |
| 2013/0066548 A1 | 3/2013 | Gruen et al. |
| 2013/0159234 A1 | 6/2013 | Xing et al. |
| 2013/0252633 A1 | 9/2013 | Liang |
| 2013/0252638 A1 | 9/2013 | Yang et al. |
| 2013/0315042 A1 | 11/2013 | Kindel |
| 2013/0345971 A1 | 12/2013 | Stamm et al. |
| 2014/0058778 A1 | 2/2014 | Mclarty et al. |
| 2014/0094199 A1 | 4/2014 | Palanki et al. |
| 2014/0099921 A1 | 4/2014 | Weiss |
| 2014/0141808 A1 | 5/2014 | Deng |
| 2014/0162693 A1 | 6/2014 | Wachter et al. |
| 2014/0164358 A1 | 6/2014 | Benzatti |
| 2014/0171013 A1 | 6/2014 | Varoglu et al. |
| 2014/0197967 A1 | 7/2014 | Modica et al. |
| 2014/0229099 A1 | 8/2014 | Garrett et al. |
| 2014/0288821 A1* | 9/2014 | Modica ................ G06Q 50/30 701/465 |
| 2014/0364149 A1 | 12/2014 | Marti et al. |
| 2014/0364150 A1 | 12/2014 | Marti et al. |
| 2014/0372904 A1* | 12/2014 | Liu .................... G01C 21/3415 715/753 |
| 2015/0031397 A1 | 1/2015 | Jouaux et al. |
| 2015/0073702 A1 | 3/2015 | Jouaux et al. |

(56) References Cited

U.S. PATENT DOCUMENTS

| | | |
|---|---|---|
| 2015/0073703 A1 | 3/2015 | Jouaux et al. |
| 2015/0087264 A1 | 3/2015 | Goyal |
| 2015/0199380 A1 | 7/2015 | Avramova et al. |
| 2015/0201307 A1 | 7/2015 | Dishneau |
| 2015/0237470 A1 | 8/2015 | Mayor |
| 2015/0304437 A1 | 10/2015 | Vaccari |
| 2015/0350828 A1 | 12/2015 | Marti et al. |
| 2015/0350841 A1 | 12/2015 | Dal Santo et al. |
| 2015/0350842 A1 | 12/2015 | Huang et al. |
| 2015/0350843 A1 | 12/2015 | Jensen et al. |
| 2016/0003637 A1 | 1/2016 | Andersen |
| 2016/0174048 A1 | 6/2016 | Marti et al. |
| 2016/0238693 A1 | 8/2016 | Jouaux et al. |
| 2019/0250243 A1 | 8/2019 | Jouaux et al. |
| 2021/0084437 A1 | 3/2021 | Dal Santo et al. |

FOREIGN PATENT DOCUMENTS

| | | |
|---|---|---|
| CN | 102577443 A | 7/2012 |
| CN | 104067305 A | 9/2014 |
| EP | 1501321 A2 | 1/2005 |
| EP | 2284768 A2 | 2/2011 |
| WO | 2002089089 A1 | 11/2002 |
| WO | 2007089087 A1 | 8/2007 |
| WO | 2012038781 A1 | 3/2012 |
| WO | 2013024276 A1 | 2/2013 |
| WO | 2013024279 A1 | 2/2013 |

\* cited by examiner

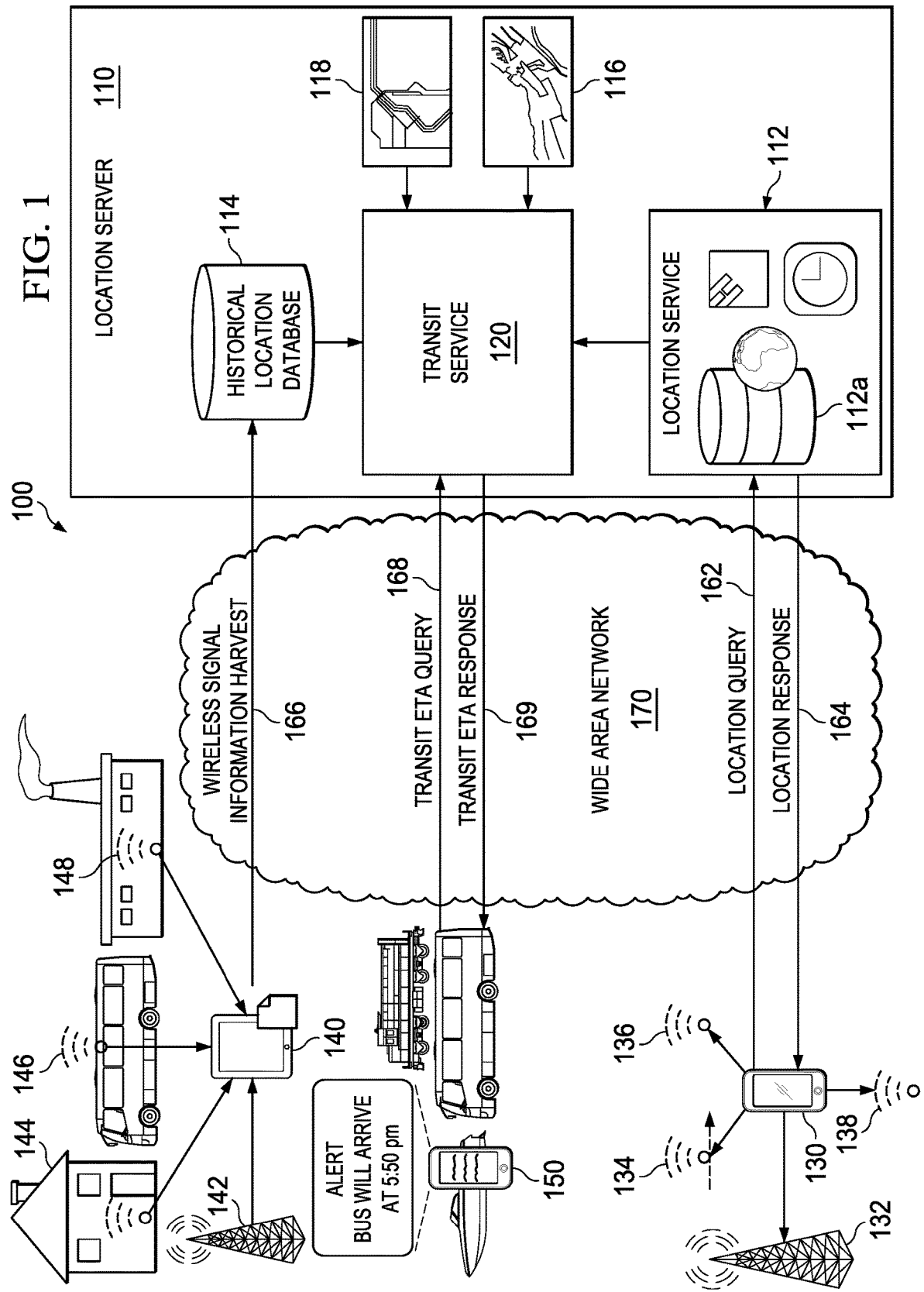

PROVIDING TRANSIT INFORMATION

CROSS REFERENCE TO RELATED APPLICATIONS

This application is a continuation of and claims priority from U.S. patent application Ser. No. 16/276,986, which is a continuation of U.S. patent application Ser. No. 15/069,642, filed Mar. 14, 2016, now U.S. Pat. No. 10,209,341, issued Feb. 19, 2019, which is a continuation of U.S. application Ser. No. 14/502,104, filed on Sep. 30, 2014, now U.S. Pat. No. 9,285,231, issued Mar. 15, 2016, which is a continuation of PCT Application No. PCT/US2014/054320 filed on Sep. 5, 2014, which claims priority from U.S. Patent Application No. 62/004,989 filed on May 30, 2014, and from U.S. patent application Ser. No. 14/020,689 filed on Sep. 6, 2013, now U.S. Pat. No. 9,267,805. The contents of these priority applications are hereby incorporated by reference in their entirety.

TECHNICAL FIELD

This disclosure relates generally to location-based services.

BACKGROUND

An online location service can provide location information to user devices. The location service can receive queries from the user devices over network connections, and respond to these queries.

SUMMARY

Techniques for providing transit information are described. Crowd-sourced information can help determine locations along a transit route. One or more location servers can track transit vehicles that are wireless network-enabled. The location servers can aggregate crowd-sourced information to provide a location service for the transit route, including providing individual users with live information about their transit routes. User devices may remember which wireless network-enabled transit vehicles are important to their users, and accordingly obtain location information for these transit vehicles to provide live relevant transit updates to the users.

Techniques for modeling significant transit routes are also described. A significant transit route can be a transit route that is significant to a user of a user device for a variety of reasons. The user device can determine that a transit route is a significant location upon determining that, with sufficient certainty, the user device rode on a vehicle that shuttles on that transit route for a sufficient amount of time. The user device can construct a state model that is an abstraction of one or more transit routes. The state model can include states representing the significant transit routes. The states representing the significant transit routes can also include one or more significant locations, or significant times, or both, associated with the significant transit routes. Transitions representing movement of the user device between significant locations on a significant transit route may be modeled as well. The user device can use the state model to provide predictive user assistance.

In a general aspect, a server receives, from a plurality of user devices, signal source information about wireless signal sources detected by the user devices, including information about a first wireless signal source detected by some of the user devices. The server determines that the first wireless signal source is moving. The server determines that the first wireless signal source is associated with a first vehicle on a public transit route upon determining that the signal source information received from the plurality of user devices satisfies one or more selection criteria. The one or more selection criteria include that a number of user devices observing the first wireless signal source satisfies a threshold number, and that a motion path reconstructed from locations and times in the signal source information matches a pre-stored path of the public transit route. In response to determining that the first wireless signal source is associated with a first vehicle on a public transit route, the server stores, in a storage device coupled to the server, an identifier of the first wireless signal source, and information associating the first wireless signal source with the public transit route as transit movement data corresponding to the public transit route.

Particular implementations may include one or more of the following features. The server may receive, from a first user device, a request for an estimated time of arrival (ETA) for a next vehicle of the public transit route at a first location of the first user device. Based on the transit movement data, the server may compute an instant location of the first wireless signal source. Upon computing the instant location of the first wireless signal source, the server may determine that the first vehicle will be the next vehicle of the public transit route to arrive at the first location. The server may compute the ETA for the first vehicle at the first location based on the instant location of the wireless signal source and motion information of the wireless signal source. The server may send, to the first user device, the ETA for the first vehicle at the first location.

Computing the ETA for the first vehicle may comprise computing the ETA for the first vehicle at the first location based on log of networks and associated locations that provide historical route progression times for the public transit route. The log of networks and associated locations may be generated at the server using aggregate information received from the user devices at periodic intervals.

The server may store, in the storage device, a representation of the first vehicle along with information associating the representation of the first vehicle with at least one of the identifier of the first wireless signal source or the public transit route.

Determining that the first wireless signal source is moving may be based on determining that the first wireless signal source is detected by the user devices in more than one location.

The server may compute an instant location of the first wireless signal source based on information about static wireless signal sources included in the signal source information received from the plurality of user devices. Locations of the static wireless signal sources may be known to the server. The server may send to the user devices that detected the first wireless signal source, information about the instant location of the first wireless signal source.

The server may store, in the storage device coupled to the server, information about the wireless signal sources detected by the user devices, including information identifying the wireless signal sources that are associated with public moving networks. The server may send, to the user devices, a subset of the information identifying the wireless signal sources that are associated with public moving networks. The subset may include wireless signal sources that are within a limited area around locations of the user devices.

A first user device may receive, from the server, information identifying wireless signal sources that are associated with public moving networks and are within a limited area around an instant location of the first user device. The information may include the first wireless signal source. The first user device may cache the information received from the server. The first user device may detect the first wireless signal source at multiple locations during displacements of the first user device. The first user device may determine, using the information cached by the user device, that the first wireless signal source is associated with a public moving network. Based on determining that the first wireless signal source is associated with the public moving network, the first user device may send to the server, information associating the first wireless signal source with the displacements of the first user device.

The server may receive, from the first user device, the information associating the first wireless signal source with the displacements of the first user device. The server may determine a motion path of the first vehicle based on the information associating the first wireless signal source with the displacements of the first user device. The server may use the motion path of the first vehicle in computing an ETA for the first vehicle at a location on the public transit route.

In another general aspect, a user device detects a plurality of first indications associating a first wireless signal source with a first location. The user device receives, from a location server, a plurality of second indications that the first wireless signal source is moving. The user device determines that each of a number of the first indications and a number of the second indications satisfies a respective significance threshold. In response to determining that each of the number of the first and the second indications satisfies the respective significance threshold, the user device designates the first location as a location that is significant to a user of the user device and the first wireless signal source as associated with a transit route that is significant to the user. The user device adds the first location and the transit route to a state model that includes one or more states each representing a stationary location designated as significant to the user and one or more transitions between states each representing a movement of the user between locations.

Particular implementations may include one or more of the following features. Detecting the plurality of first indications may comprise the user device sending a request to the location server for a location of the first wireless signal source. The request may include identifying information of the first wireless signal source. The user device may receive, from the location server, a response that includes the location of the first wireless signal source.

Receiving the plurality of second indications may comprise the location server receiving, from a plurality of user devices, signal source information about wireless signal sources detected by the user devices. The signal source information may include locations of the first wireless signal source detected by a subset of the user devices. The location server may determine, based on the signal source information received from the plurality of user devices, that the first wireless signal source is moving each time the first wireless signal source is detected by each user device. The location server may send, to the user device, information indicating that the first wireless signal source is moving.

The user device may determine that the first wireless signal source is associated with a public transit route that is significant to the user. Determining that the first wireless signal source is associated with the public transit route may comprise the location server determining that the first wireless signal source is a public signal source upon determining that the first signal source satisfies one or more selection criteria, which may include that a number of user devices observing the first wireless signal source satisfies a threshold number. The user device may receive, from the location server, information indicating that the first wireless signal source is associated with a public transit route.

Determining that the first wireless signal source is associated with a public transit route may comprise the user device observing behavioral patterns of the user when the first wireless signal source is detected. Based on the observation, the user device may infer that the user is a passenger in a transit vehicle when the first wireless signal source is detected. In response to the inferring, the user device may determine that the first wireless signal source is associated with a public transit route.

The user device may provide the state model to a forecasting subsystem of the user device for determining an estimated time of arrival (ETA) of a transit vehicle associated with the transit route at the first location based on a current time and an instant location of the transit vehicle. The user device may send a message to the user based on the ETA of the transit vehicle at the first location, a current location of the user device, the current time and a probability density determined based on states and transitions of the state model.

Determining the ETA of the transit vehicle at the first location may comprise the user device sending, to the location server, a message requesting ETA at the first location. The message may include information associated with the first wireless signal source. The user device may receive, from the location server, the ETA of the transit vehicle associated with the first wireless signal source at the first location.

Determining the ETA of the transit vehicle at the first location may comprise the user device predicting that the user will board the vehicle at the first location based on the current time and the current location of the user device.

Determining the ETA of the vehicle at the first location may comprise the user device determining that the user is traveling aboard the transit vehicle based on the current time and the current location of the user device. The user device may predict that the user will disembark the transit vehicle at the first location based on the current time and the current location of the user device.

The user device may determine that the user device is moving along the transit route associated with the first wireless signal source. In response to determining that the user device is moving along the transit route associated with the first wireless signal source, the user device may send, to the location server, messages indicating displacements of the user device along the transit route. The messages may include information associated with the first wireless signal source.

Implementations of the above techniques include methods, systems, computer program products and computer-readable media. One such computer program product is suitably embodied in a non-transitory storage medium that stores instructions executable by one or more processors. The instructions are configured to cause the one or more processors to perform the above-described actions. One such system includes one or more processors and instructions stored in a storage medium. The instructions, when executed by the one or more processors, are configured to cause the one or more processors to perform the above-described actions.

The features described in this specification can be implemented to achieve one or more advantages. For example, a server may provide live and accurate transit information to users about transit vehicles that are moving along routes of interest to the users. Estimated times of arrival of the transit vehicles at locations that are significant to the users may be provided. Additionally or alternatively, user devices may learn transit routines of their associated users and proactively alert users about transit arrival, or departure, or both, at locations that are significant to the users.

A user device can learn a movement pattern of the user device, and adapt itself to that movement pattern. Using the techniques described in this specification, a user device can implement predictive user assistance. The user device implementing predictive user assistance can provide the assistance based on the movement pattern without requiring additional user input. Accordingly, a user of the user device may have a better experience using services, especially location based services, of the user device. For example, the user device can determine that a user usually goes from home to work at 8:00 am on weekdays and from home to a gymnasium at 8:00 am on weekends. Upon being turned on shortly before 8:00 am, on weekdays, the user device can automatically display traffic information on a route from home to work; whereas on weekends, the user device can automatically display traffic information on a route from home to the gymnasium.

The features described in this specification can be implemented to maximize privacy protection of users. In implementations where the operations are performed by a server, the server needs no more information from the user devices than the network addresses of the wireless signal sources seen by the user devices. Accordingly, the server does not need to store information about a user or a user device other than the location information about the wireless signal sources seen by the user devices.

The details of one or more implementations for providing live transit information are set forth in the accompanying drawings and the description below. Other features, aspects, and advantages of providing live transit information will become apparent from the description, the drawings, and the claims.

BRIEF DESCRIPTION OF THE DRAWINGS

FIG. 1 is a block diagram of an exemplary system for providing transit information.

FIGS. 7AX, 7BX, and 7CX are block diagrams illustrating components of an exemplary user device implementing predictive user assistance.

Like reference symbols in the various drawings indicate like elements.

DETAILED DESCRIPTION

Exemplary Provision for Transit Information

Figure 1X:
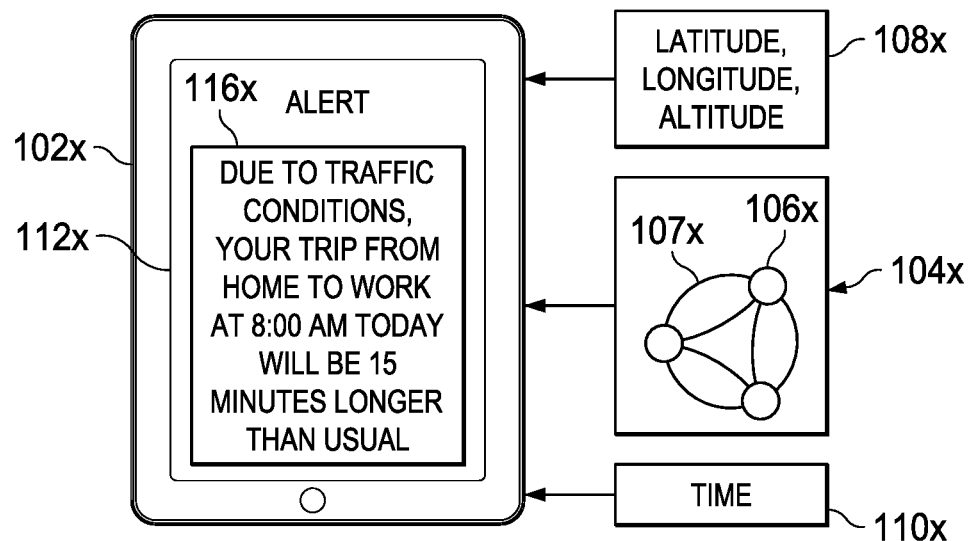
FIG. 1X is a diagram illustrating an exemplary implementation of predictive user assistance.

FIG. 1 is a block diagram of an exemplary system 100 for providing transit information. For example, the system 100 enables a location server 110 to determine moving wireless signal sources detected by user devices and determine the instant locations of these wireless signal sources. The location server 110 also may associate the moving wireless signal sources with public transit networks. In some implementations, in response to queries from user devices, the location server 110 may provide estimated time of arrival (ETA) of the public transit vehicles at the locations of the user devices.

As shown, the system 100 may include, apart from the location server 110, one or more user devices 130, 140 and 150. The location server 110 may include a location service 112, a historical location database 114, a datastore of movement traces 116 of moving wireless signal sources, database 118 storing routes of transit networks, and a transit service 120. Each user device 130, 140, or 150 may be associated with one or more signal sources detected by the device, including, for example, signal sources 132, 134, 136 and 138 detected by user device 130; and signal sources 142, 144, 146 and 148 detected by user device 140.

Location service 112 can store identifiers of signal sources 132, 134, 136, 138, 142, 144, and 148 in the database 112a, or the historical location database 114, or both. The identifiers can be MAC addresses of the respective signal sources. The database 112a, or the historical location database 114, or both, can store the identifiers in association with locations of the signal sources.

Location server 110 can receive location request from user device 130. The location query can include signal sources detected by user device 130. For example, the location query can include MAC addresses of signal sources 132, 134, 136 and 138. Using known locations of signal sources 132, 136, and 138, location server 110 can determine the unknown location of signal source 134.

Location server 110 can determine that, according to location queries received from multiple user devices, including user device 130, the signal source 134 was observed at different locations by the multiple user devices. Accordingly, location server 110 can determine that signal source 134 is moving.

Location server 110 can determine that, according to location queries received from multiple user devices, more than a threshold number of user devices observed the signal source 134. In response, location server 110 can determine that signal source 134 is a public moving signal source that is used by multiple people.

Location server 110 can receive harvest data from user device 140. The harvest data can include a sequence of signal sources detected by user device 140. For example, the harvest data can include a MAC address of signal source 142 associated with a first timestamp, a MAC address of signal source 144 associated with a second timestamp, and a MAC address of signal source 148 associated with a third timestamp. Using respective locations of signal sources 142, 144, and 148, and the respective timestamps, location server 110 can determine a motion path of user device 140.

Location server 110 can determine that, according to the harvest data, user device 140 was able to observe signal source 146 along the motion path. Accordingly, location server 110 can determine that signal source 146 is moving along the motion path. Location server 110 can determine that, according to harvest data received from multiple user devices, more than a threshold number of user devices moved along the same motion path as signal source 146. In response, location server 110 can determine that signal source 146 is associated with vehicle of a public transit network and is used by multiple people. A public transit network can be any network that can be used by multiple people at a same time, and that has a fixed schedule and a fixed route. The public transit network may or may not be accessible by all general public. For example, a public transit network can be a bus or trolley, a company shuttle, a ferry ship, a subway train or a high-speed train. The public transit network may be operated by, for example, a government entity, a private company, or a charitable organization.

The motion path of user device 140 may overlap with motion paths of other user devices observing movement of signal source 146 entirely or partially. For example, signal source 146 can be a Wi-Fi™ access point (AP) installed on a bus. User device 140 may be brought onto the bus by a first user at a first bus stop, and may exit the bus at a second bus stop. The motion path observed by user device 140 may include a section of the transit route of the bus between the first bus stop and the second bus stop. Another user device may be brought onto the bus by a second user at the second bus stop, and exit at a third bus stop, and so on. By crowd-sourcing, location server 110 can receive data about movement traces 116 from multiple user devices each reporting a section of a route. Location server 110 can stitch the sections, based on the MAC address of the AP, to determine a complete route of movement of signal source 146. Location server 110 can match the complete route with a route stored in database 118 to confirm that signal source 146 is associated with a vehicle of the route, e.g., "line number nine," of a transit system. Location server 110 can store this information in historical location database 114, including associating a route, rather than a point location, with signal source 146. Location server can use this information to provide user assistance.

For example, location server 110 can receive transit ETA query 168 from user device 150 requesting information on when a bus of "line number nine" is going to arrive at a given location. The given location can be a current location of user device 150 or a user specified location. Location server 110 can determine, from crowd-sourced data, current locations of signal sources associated with vehicles of line number nine. Location server 110 can determine that a current location of signal source 146 is located closest to the given location, and accordingly, the bus equipped with signal source 146 will be the bus that is going to arrive next. Location server 110 can determine the ETA based on the current location of signal source 146 and an observed speed of signal source 146 as provided by crowd-sourced devices. Location server 110 can then provide the ETA as part of the ETA response message 169 to mobile device 150 as user assistance data.

A user device, which also may be referred to interchangeably as a client device, may be a mobile device, including, for example, a smartphone; an electronic tablet; a portable music player; an electronic book reader; a wearable device including, for example, a smart watch, smart eyeglasses or a fitness tracker; a regular cellular phone; or a laptop computer, among others. For example, user device 130 may be a smartphone, while user device 140 may be an electronic tablet, and user device 150 may be another mobile device. Alternatively, a user device may be a desktop computer.

A user device may detect signals from wireless signal sources where the user device is located. The wireless signal sources may include cellular network base stations; Institute of Electrical and Electronics Engineers (IEEE) 802.11 (Wi-Fi) network access points; Bluetooth™ sources, including, for example, iBeacon™ nodes; or satellite transceivers, among others. For example, the user device 130 may detect a signal from a wireless signal source 132 that is a cellular base station when the device is in the coverage area of the base station 132. Additionally or alternatively, the user device 130 may detect signal broadcasts by Wi-Fi network access points 134, 136 and 138 that are within the reception range of the user device.

In some implementations, when the user device detects one or more wireless signal sources, the user device may send a message to the location server 110 that includes information about the detected wireless signal sources. For example, the user device 130 may send a location query 162 to the location server 110, inquiring about the locations of the wireless signal sources 132, 134, 136 and 138 that are detected by the device. The location server may be located remotely from the user devices, and the communication between the location server and the user devices may be performed over a wide area network 170, as shown.

The information included in the location query may include identifying information about the wireless signal sources seen by the user device, e.g., the link layer or medium access control (MAC) address of the hardware network interface of the wireless signal source; or the network name of the wireless network corresponding to the wireless signal source, including, for example, the service set identifier (SSID) for an IEEE 802.11 wireless network; or any other suitable information.

Upon receiving the message from the user device, the location server proceeds to determine the locations of the wireless signal source included in the message, for example, using the location service 112. In some implementations, the location server 110 may store the locations of the static or fixed wireless signal sources in a database 112a coupled to the location service 112. In this context, a static or fixed wireless signal source includes a wireless signal source that is not moving, including, for example, a wireless signal source associated with a network in an office building or a coffee shop. The location server can compute unknown locations of wireless signal sources based on known locations of static wireless signal sources that are included in the message received from the user device, as described below with respect to FIGS. 2A, 2B and 2C. In some implementations, the location server stores the identifying information for the wireless signal sources identified from the user device messages, along with their computed locations. For example, the location service 112 stores in the database 112a the identifying information for the wireless signal source 134 along with the associated location computed as described above. The identifying information stored may be the MAC address of the wireless signal source, or the network name (e.g., SSID), or both, apart from any other suitable information that is included in the message.

In some implementations, the location server can determine whether a wireless signal source indicated in a message received from a user device is static or moving. For example, if a particular wireless signal source is seen in multiple messages received by the location server, and the corresponding locations computed for the wireless signal source are different, then the location server determines that the particular wireless signal source is moving. The multiple messages may be received from different user devices, or the same user device, or both. The location server can correlate the particular wireless signal source from the multiple messages based on the identifying information, for example, MAC address, for the wireless signal source that is common to the messages.

In some implementations, the location server can determine whether a wireless signal source included in a message received from a user device is a public wireless signal source or private, that is, whether the wireless signal source is associated with a public or a private network. The mechanism for determining whether a wireless signal source is associated with a public network or a private network is described in greater detail in the following sections.

In response to the location query from a user device, the location server sends a message to the user device that includes the determined locations for the various wireless signal sources indicated in the location query. For example, the location service 112 responds to the location query 162 with a location response message 164 sent to the user device 130. The location response message includes the determined locations of one or more of the wireless signal sources 132, 134, 136 and 138. The location response may include the fixed locations for the static wireless signal sources, or the instant locations for the moving wireless signal sources, or both.

Additionally, the location server may include identifying information (e.g., MAC addresses) of all the public moving wireless signal sources that are within a certain neighborhood of the location of the user device. In some implementations, informing the user devices about which wireless signal sources are public facilitates the user devices to track public moving wireless signal sources. This tracking information is sent to the location server, which enables the location server to trace the movement of public wireless signal sources and store these movement traces, for example, movement traces 116, as described in greater detail in the following sections.

In some implementations, the location server uses the movement traces of the public wireless signal sources to match the public wireless signal sources to mass transit networks. In this context, a mass transit network refers to a transit network that is used by multiple people, and in which the transit vehicles run on well-known, e.g., fixed, routes, and on regular schedules. Such transit networks may include public metropolitan transport networks, company shuttle networks, chartered bus networks, long-distance train and bus networks, among others.

The location server 110 may store routes for the mass transit networks, which are also referred to as public transit routes, in the database 118. The location server 110 may match the movement trace 116 of a wireless signal source to the routes stored in the database 118 to determine whether the wireless signal source is associated with a public transit route, for example, when the public moving wireless signal source is a Wi-Fi network access point in a commuter bus on a public transit route. In this manner, the location server 110 can realtime trajectories of transport vehicles on public transit routes. Tracing the movement of the wireless signal sources and matching them to transit routes is described in greater detail with reference to FIG. 3.

In addition or alternative to sending location queries for detected wireless signal source, each user device may send periodic messages to the location server that include all wireless signal sources detected by the user device during a preceding time period. For example, the user device 140 may send to the location server 110, once a day, a wireless signal information harvest message 166 that includes a list of all the wireless signal sources detected by the user device during the previous 24-hour period, along with the locations where the wireless signal sources were detected. The location server 110 stores the harvests of the wireless signal sources that are received from various user devices in storage coupled to the location server 110, e.g., the historical location database 114.

In the manner described in the preceding sections, the location server may collect instantaneous and historical information about wireless signal sources and identify which of these wireless signal sources are moving, or public, or both. By associating the wireless signal sources to known transit routes, the location server can generate live transit information.

The information about wireless signal sources collected by the location server may be used in different ways. In some implementations, the information may be used to provide live transit services to consumers, including responding to queries from user devices with ETAs for transit vehicles where the user devices are presently located.

For example, a user of the user device 150 may want to know the time at which a transit vehicle on a public transit route will arrive at a location significant to the user. The user may be at a bus stop, and may want to know at what time the next bus for the user's route will arrive at the bus stop. Alternatively, the user may be at a train station, and may want to know at what time the next train on the user's route will arrive at the train station.

To obtain the public transit ETA information, the user may operate the user device 150 to send a transit ETA query message 168 to the location server 110. Alternatively, in some implementations, the user device 150 may automatically send the transit ETA query message 168 to the location server 110, without intervention by the user. This may be the case, for example, when the user device detects that it is at the transit stop, or the user device determines that it is the time of the day when the user typically boards a transit vehicle on the particular public transit route from the transit stop.

The transit ETA query message 168 includes information that enables the location server to determine the public transit route for which the ETA is sought. For example, the ETA query message 168 may include the network interface address (e.g., MAC address) of the public moving wireless signal source that is associated with the public transit route.

Upon receiving the ETA query message 168, the location server 110 computes the ETA for the next transit vehicle on user's route to arrive at the user's significant location. In some implementations, the ETA computation is done by the transit service 120. To compute the ETA, the transit service 120 obtains instant locations of public moving wireless signal sources from the location service 112. The instant locations are determined by the location service 112 based on location query/location response message exchanges with user devices.

The transit service also obtains historical data for the desired public transit route from the historical location database 114. The historical data, which may include arrival/departure times of transit vehicles at different locations, time of day, days of week, among others, may be determined by matching periodic harvest data with lists of transit routes stored in database 118. In some implementations, the transit service also obtains live movement traces 116 of the transit vehicles.

Based on the above data obtained from other services and memory, the transit service 120 can predict the ETA for the first-to-arrive transit vehicle at the significant location of the user device 150. Upon determining the ETA, the transit service responds to the user device 150 with a transit ETA response message 169 that includes the ETA for the next transit vehicle on the desired public transit route at the location of the user device.

In some implementations, upon receiving the ETA response message 169, the user device 150 may alert the user by presenting a message on a display coupled to the user device. For example, the user device 150 may present the message that "Bus will arrive at 5:50 pm," thereby alerting the user.

In the above manner, the system 100 may be used to provide live transit service to users, where the provision of live transit service is facilitated by crowd-sourcing information about public moving wireless signal sources in the system.

As described in the preceding sections and used in the context of this disclosure, a public signal source is associated with a mobile wireless network that is used by multiple users in a non-private, e.g., non-residential, setting, or to which access is unrestricted, or both. For example, a public network may include a public transit network, for example, in commuter buses or trains. In some implementations, a public network may include a network that is accessible by registered users, but to which access by the general populace is otherwise restricted. This may be, for example, a network in an employee shuttle bus operated by a company. In some implementations, a public network also may include a network in a public place, for example, a store, shopping mall or a transport terminal, or an office network that is accessible only to the employees, among others.

In some implementations, the location server may determine a wireless signal source to be public based on the number of user devices detecting the wireless signal source. For example, multiple messages that are received from different user devices may include the identifying information for a same wireless signal source. The location server may determine that multiple users have connected to the wireless signal source. Based on this determination, the location server may categorize the associated network as public, and accordingly, the associated wireless signal source indicated in the messages as a public signal source. For example, the location service 112 may identify the MAC address of the wireless signal source 134 in messages received from multiple user devices, and also notice that multiple user devices have connected to the corresponding network. Accordingly, the location service 112 determines that the wireless signal source 134 is associated with a public network. The location server stores the public categorization of the wireless signal sources with the other information of the wireless signal sources.

In some implementations, the location server may determine a wireless signal source to be public if the number of user devices connecting to the wireless signal source exceeds a predetermined threshold number. The threshold number may be set based on various metrics and statistical analyses done by the location server to weed out false positives, e.g., a private wireless signal source being identified as public, or false negatives, e.g., a public wireless signal source being flagged as private.

Additionally or alternatively, other criteria may be used by the location server to determine whether a wireless signal source is public or private. For example, based on information stored in its databases, the location server may identify the wireless signal source as associated with a network at a public place, or a public transit network.

In some implementations, in determining the list of public moving wireless signal sources in the neighborhood of a user device, the location server may estimate the location of the user device based on the determined location of the wireless signal sources indicated in the latest location query message from the user device. The neighborhood around the user device may be set based on various metrics, for example, range of signal reception with a particular bit error rate at the user device.

As described previously, each user device may periodically send signal information harvest messages 166 to the location server 110 that include various wireless signal sources detected by the user device during a given time period. The period, which may be set in the system software running on the user device, may be 24 hours, or it may be some other suitable time interval, e.g., 1 hour, 2 hours, or 6 hours, among others. For example, during a day, the user device 140 may detect signals from a Wi-Fi network access point or a Bluetooth node 144 or 148 when the device is being used at the residence or workplace, respectively, of the user of the device. The user device 140 may detect signals from a Wi-Fi network access point or a Bluetooth node 146 when the device is in a moving vehicle. This may be the case, for example, when the user is traveling in a Wi-Fi-enabled public transit bus or train. Alternatively, this may be the case, for example, when the user is in a private vehicle that is not network enabled, but the private vehicle is moving on the road alongside a Wi-Fi-enabled public transit and therefore the user device 140 detects signals broadcast by the Wi-Fi network access point or a Bluetooth node 146 on the public transit vehicle. Additionally or alternatively, the device 140 may detect a signal from a cellular base station 142 when the device is the coverage area of the base station 142.

In some implementations, the location server 110 can associate wireless signal sources included in the signal information harvest messages 166 to public transit routes stored in database 118 based on the locations of the wireless signal sources. For example, for each moving wireless signal source identified in a wireless signal information harvest message 166, e.g., based on its MAC address, the location server 110 attempts to match the reported locations of the moving wireless signal source to locations included in the stored public transit routes. If the number of reported locations of the moving wireless signal source that are matched to locations on a particular public transit route exceeds a predetermined threshold, then the location server associates the moving wireless signal source to the particular public transit route.

In some implementations, the information associating the moving wireless signal source to the particular public transit route may be stored along with the received harvest information in the historical locations database 114. In this manner, the location server 110 can build a historical pattern of movement of public transit vehicles on their routes, based on the location information of their associated moving wireless signal sources. The historical pattern may include the arrival or departure times of the public transit vehicles at specific locations along the public transit route over an extended time period, or other suitable parameters.

In the manner described in the preceding sections, the location server may collect both instantaneous and historical location information about moving wireless signal sources. By associating public moving wireless signal sources to known public transit routes, the location server can generate live transit information for the public transit routes. For example, the location server can determine the instant location of a transit vehicle based on the location query/response mechanism. Additionally, the location server can determine the predicted route of the transit vehicle, and the times of movement of the vehicle along the route, based on the historical information for the public transit route.

In some implementations, the transit ETA query 168 may include the network name (e.g., IEEE 802.11 SSID) of the network associated with the user's public transit route. As discussed in the preceding section, the network name may have been previously learned by the user device from the wireless signal detected by the user device. Following the location query/response message exchange with the location server 110, the user device learned that the particular wireless signal source and the corresponding network that is identified by its network name is associated with the public transit route taken by the user, i.e., the network is operational on a transit vehicle on the user's route. The user device may cache the network name along with its association to the transit vehicle, or the public transit route, or both. The user device may include the network name when sending a subsequent ETA query message 168 to the location server 110 for that particular route.

Identifying a public transit route based on the name of a network associated with the transit route may be useful in some situations. For example, the user may be on a transit train that has multiple wireless signal sources servicing a single network operational on the train. Knowledge of the network name would enable the location server to associate the various wireless signal sources with the single network. The user device may send an ETA query 168 that includes the network interface address of a public moving wireless signal source that is cached by the user device (e.g., from a prior detection) and associated with the transit train. However, this particular wireless signal source may no longer be operational (e.g., the network access point may have failed due to a defect). In this situation, the wireless signal source would not be detected by other user devices at the time of the ETA query 168, and therefore the location server would not be able to compute an instant location for the wireless signal source. Accordingly, the location server would fail to provide an ETA based on the network interface address of the wireless signal source.

On the other hand, if the ETA query 168 included the network name of the corresponding network, then the location server may successfully identify other wireless signal sources associated with the network name, based on either historical data, or location queries from other user devices that include the network name along with other identifying information for the wireless signal sources, or both. Upon identifying at least one wireless signal source associated with the network name and that is operational, the location server can compute an instant location of the identified wireless signal source, e.g., based on the location queries from other user devices who are presently on the transit train and therefore their location queries include the identifying information for this wireless signal source detected by the user devices. Having determined the instant location of the operational wireless signal source, and therefore the instant location of the transit vehicle on which the network corresponding to the network name in the ETA query 168 is operational, the location server can successfully provide an ETA for the transit vehicle. In some implementations, for computing the ETA, the transit service 120 can determine the present location of transit vehicles on the desired public transit route, e.g., based on the movement traces 116 of the transit vehicles on the route. In addition, the transit service 120 can determine the expected trajectory of movement of the transit vehicles, e.g., based on historical data and the known transit route. In situations where there are more than one transit vehicle identified as moving on the public transit route, the transit service also may determine which particular transit vehicle on the route would be the first to arrive at the location of the user device 150 that sent the ETA query message 168. In this manner, the transit service can predict the ETA for the first-to-arrive transit vehicle at the location of the user device 150.

Figure 2X:
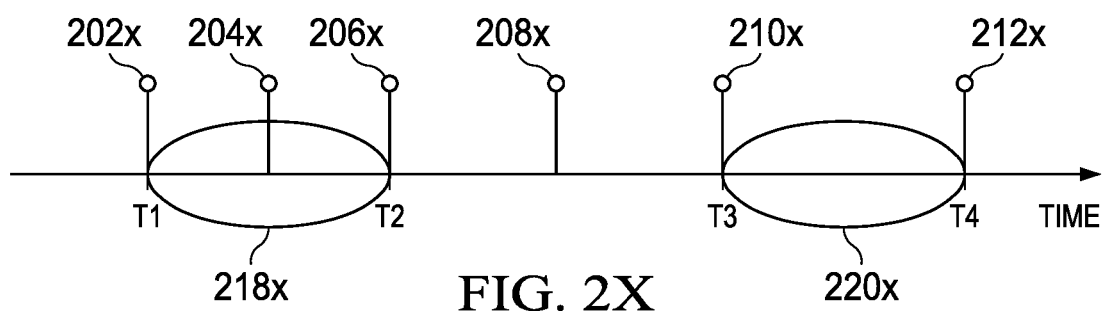
FIG. 2X is a diagram illustrating exemplary techniques of determining location clusters.
Figure 2C:
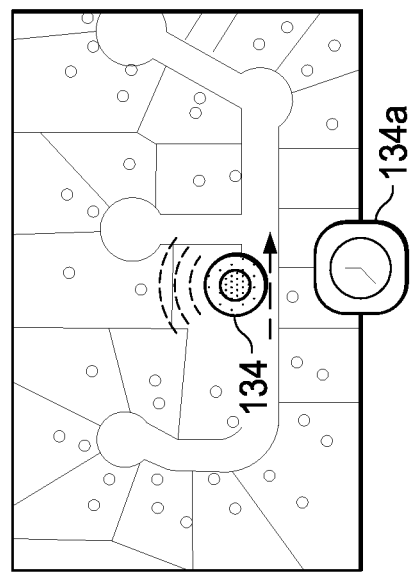
FIGS. 2A, 2B and 2C illustrate an example of location determination of a wireless signal source by the location server.
Figure 2B:
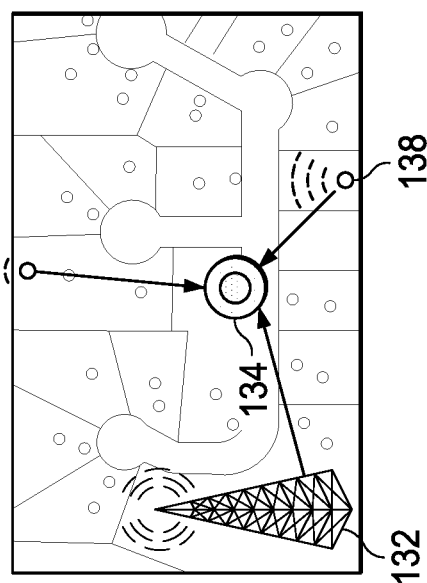
Figure 2A:
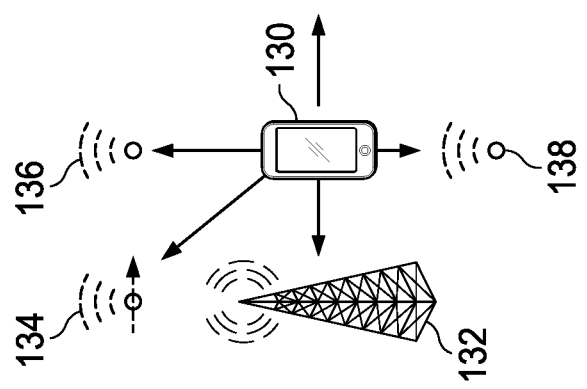

FIGS. 2A, 2B and 2C illustrate an example of location determination of wireless signal source 134 by the location server 110. As described previously and shown in FIG. 2A, the user device 130 detects signals from wireless signal sources 132, 134, 136 and 138. The user device 130 sends to the location server 110 the location query 162, which includes identifying information for the wireless signal sources 132, 134, 136 and 138. The location of the wireless signal source 134 included in the query 162 may be unknown to the location service 112, but the locations of the wireless signal sources 132, 136 and 138 may be known. The location service 112 determines, using the information stored in the database 112a, that the wireless signal source 132 is a cellular base station, i.e., a static signal source, and the wireless signal sources 136 and 138 are static Wi-Fi network access points known to the location service 112. Based on the known locations of 132, 136 and 138, the location service 112 can compute the location of wireless signal source 134 using some well-known location determination algorithm, e.g., by triangulation, as illustrated in FIG. 2B. Accordingly, the location service 112 obtains the instant location of the wireless signal source 134, e.g., the location at the time instant 134a, as illustrated by FIG. 2C.

In this context, the instant location of a wireless signal source refers to the location of the wireless signal source at the time instant the wireless signal source transmitted the signal that was detected by the user device. The signals transmitted by a wireless signal source include various information, for example the MAC address of the wireless signal source, the name of the associated network, the time instant at which the signal was generated, among others. The user device extracts this time instant information from the signal corresponding to the wireless signal source that is detected by the user device, and sends this time instant along with the identifying information of the wireless signal source to the location server as part of the location query. Accordingly, in the example illustrated in FIG. 2C, 134a indicates the time instant at which the wireless signal source 134 transmitted the signal that was detected by the user device 130.

In some implementations, the movement traces 116 of the public moving wireless signal sources may be used to improve the prediction accuracy for the ETA. For example, a transit vehicle may deviate from the usual public transit route due to some extraordinary circumstance, e.g., road closure along the usual route. Alternatively or additionally, the arrival/departure times of the transit vehicle may diverge significantly from the historical times recorded by the location server, e.g., due to an accident along the public transit route. In such circumstances, predicting the ETA for the transit vehicle based on the instant location of an associated public moving wireless signal source and the historical data may yield inaccurate estimates, since the transit vehicle may no longer be on the usual route or traveling consistent with historical recorded times. However, knowing the live movement trace of the transit vehicle may enable the location server to determine how much the present route of the transit vehicle has diverged from the usual public transit route, or the present arrival/departure times have deviated from the regular arrival/departure times, or both. The location server can then estimate the time or distance to be traversed by the vehicle to return to the usual public transit route (since it is expected that a public transit vehicle will attempt to return from the deviation to the normal route) and therefore compute the ETA at the location of the user device making the ETA query.

Additionally or alternatively, in some implementations the movement traces of public moving wireless signal sources may help to improve knowledge of public transit routes. For example, the location server can compute the movement trace of a public moving wireless signal source based on the signal information harvest received from user devices. The location server may determine that the movement trace of the corresponding transit vehicle deviates from the associated public transit route known to the location server. If the movement trace computed over a period of time based on multiple signal information harvests are consistent, but deviate from the known public transit route, then the location server may determine that the public transit route it has stored is outdated. Accordingly, the location server may update the public transit route based on the computed movement trace.

Figure 3:
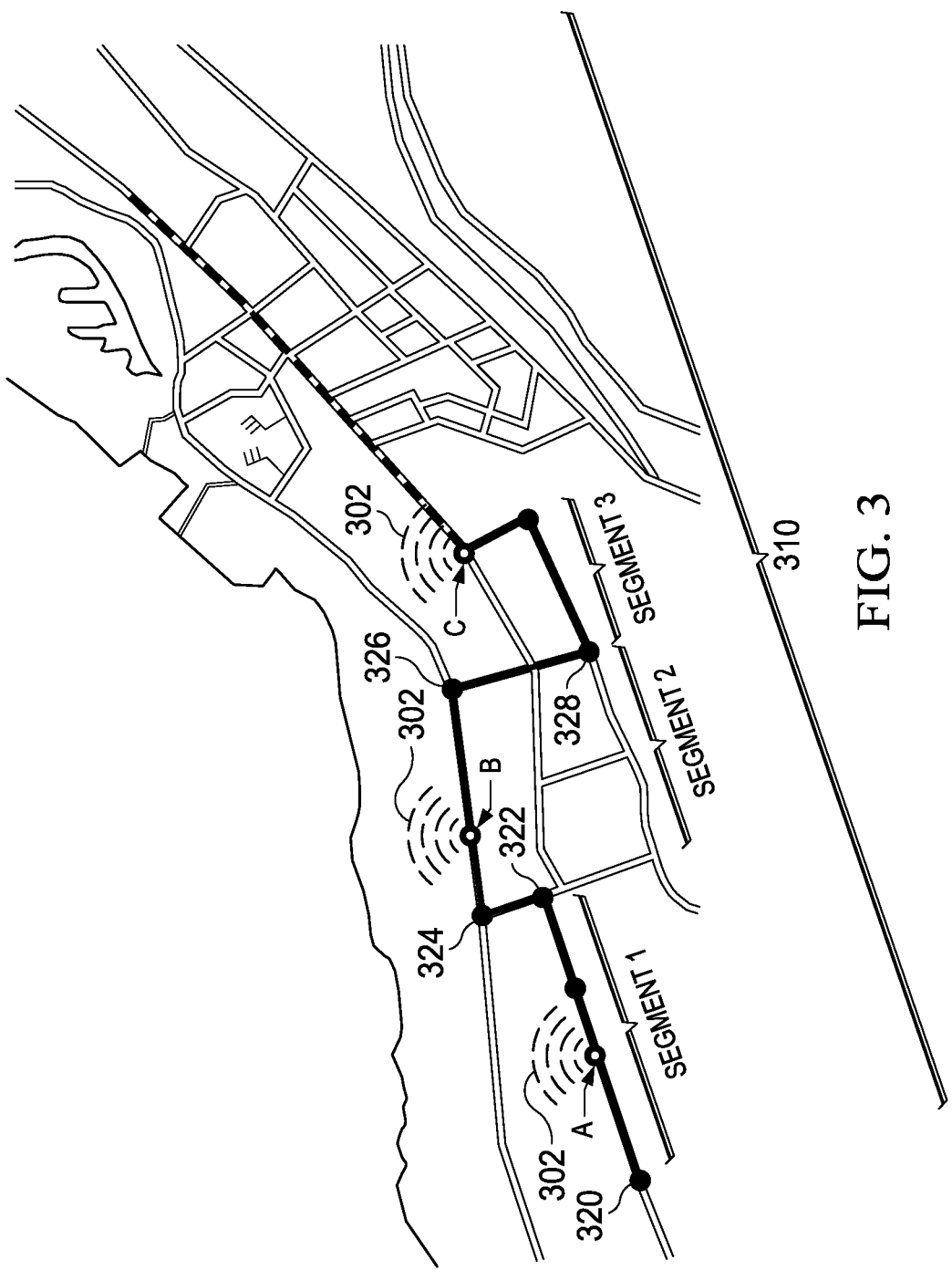
FIG. 3 illustrates an example of computing movement traces of a public moving wireless signal source.

FIG. 3 illustrates an example of computing movement traces of a public moving wireless signal source 302. In some implementations, the public moving wireless signal source 302 may be the same signal source as the public moving wireless signal source 134 detected by the user devices (e.g., user device 130) in the system 100, and the movement trace of the public moving wireless signal source 302 may be computed by the location server 110. Accordingly, the following describes the computation of the movement trace as performed by the system 100. However, in other implementations, the public moving wireless signal source 302 may be a different signal source and its movement trace may be computed by other location servers in other systems.

As described previously, the user device may cache information about all public moving wireless signal sources in its neighborhood, based on information received from the location server. For example, the user device 130 receives a list of public moving wireless signal sources from the location server 110 as part of the location response message 164.

In some implementations, the user device may have an option set in the system software that allows tracing, i.e., tracking the locations of the user device as the device moves. In such implementations, when the user device moves above a certain threshold speed, which may be set in the device system software, the tracing for the user device is enabled.

The user device may detect signals from one or more wireless signal sources as it is moving. When the user device has tracing enabled and it detects a signal that includes identifying information (e.g., MAC address) for a wireless signal source that matches the identifying information of a cached public wireless signal source, then the user device flags the signal source as a public signal source. Since the detected signal source is flagged as public, the user device proceeds to track the signals from the wireless signal source.

When the user device sends its trace data to the location server, it includes the identifying information for the public moving wireless signal source if the user device is tracking signals from the signal source. In some implementations, the user device includes information about the public moving wireless signal source only if it detects signals from the signal source for a time period above a certain threshold during the trace. However, in other implementations, the user device includes the information about the public moving wireless signal source if it detects signals from the signal source for any time period.

For example, the user device 130 may have tracing enabled and it detects a signal from wireless signal source 302, which the user device matches to the information in its cache about public moving wireless signal sources. As the user device 130 tracks its movement, it detects signals from the public moving wireless signal source 302 at different locations along its path, e.g., at location A and at location B, or C, or both. The user device 130 reports to the location server 110 the identifying information about the wireless signal source 302 along with its trace data, which indicates that the user device 130 has detected public moving wireless signal source 302 at locations A, B and/or C at specific times included in the trace data.

The user device reports its trace data to the location server periodically, e.g., every 5 minutes. Accordingly, the location server obtains live trace data for public moving wireless signal sources. If the location server establishes a match between the live trace of the public moving wireless signal source and a public transit route, the location server determines that the public moving wireless signal source corresponds to a transit vehicle on the public transit route. Then the location server can use the realtime trace data for the transit vehicle to forecast locations and ETAs for the vehicle.

For example, based on the trace data received from user device 130, the location server 110 can determine that the trajectory of the public moving wireless signal source 302 is the same as the path of movement of the user device 130, since the public moving wireless signal source 302 was detected at locations A, B and/or C along the path of movement of the user device 130. The location server 110 successfully matches the trajectory to the public transit route 310. The location server 110 can then use the live trajectory of the transit vehicle associated with the public moving wireless signal source 302 in conjunction with historical data from the database 114 to forecast locations and ETAs for the transit vehicle at various points along the public transit route 310.

In some implementations, multiple user devices may send live traces to the location server that include identifying information about the same public moving wireless signal source. The location server may stitch the traces together from the multiple user devices to generate a comprehensive trajectory for the public moving wireless signal source and thereby provide live transit information for the corresponding public transit route. This may be useful, e.g., when any one user device traces the public moving wireless signal source for only a limited path of movement. The trace received from this user device may not be sufficient by itself to match definitively to a public transit route. However, traces from multiple user devices that track the same signal source within close time periods may be combined together to match the trajectory to a public transit route.

For example, the user of user device 130 may board the public transit bus associated with the public moving wireless signal source 302 at transit stop 320. The user device 130 may start tracing the public moving wireless signal source 302 upon detecting the signal from 302 at location A. The user may leave the bus at transit stop 322, at which time the live trace provided by the user device 130 will stop, since the speed of the user device 130 falls below the threshold. Therefore, user device 130 may provide a live trace for the public moving wireless signal source 302 between transit stops 320 and 322, which corresponds to section, e.g., segment 1, of the public transit route 310.

Segment 1 may be of insufficient length for the location server 110 to extrapolate the trace and compare to public transit routes. However, a second user device belonging to a second user may provide a live trace for the signal source 302 for segment 2, which may correspond to a section of the public transit route 310 between transit stops 324 and 326. The second user may be another passenger on the transit bus associated with signal source 302, e.g., someone who boarded the bus at transit stop 324 and disembarked at transit stop 326. Alternatively, the second user may be traveling in a different vehicle (e.g., a passenger in a car) that shares a trajectory with the transit bus for segment 2, and is sufficiently close (e.g., moving side by side along the road) to the transit bus to detect signals from the signal source 302 during the duration their trajectories are aligned.

The second user may stop tracing the signal source 302 beyond transit stop 326. This may be the case, for example, when the second user is a transit passenger who disembarks the bus at transit stop 326, or the second user is traveling in a different vehicle whose path diverges from that of the transit bus after the transit stop 326. However, a third user device belonging to a third user may provide a live trace for the signal source 302 for a third segment, e.g., segment 3, which may correspond to a section of the public transit route 310 between transit stop 328 and location C. Similar to the second user, the third user may be a passenger on the transit bus associated with signal source 302, or traveling in a different vehicle close within the wireless transmission range of the signal source 302 for a length of the road.

Each of the segments 1, 2 or 3 by itself may be of insufficient length for the location server 110 to extrapolate the trace for the segment and compare to public transit routes. However, upon receiving the traces from the user device 130 and the second and third users, the location server 110 determines that each trace is associated with the public moving wireless signal source 302. The location server also may determine that the time periods of the traces are close to one another, indicating that all the traces are from the same movement instance for the signal source 302, rather than being from separate instances when the signal source 302 was traveling along these segments.

Based on these determinations, the location server may "stitch" or combine the traces together to generate a longer trace of sufficient length that can be compared to public transit routes. In some areas where the traces do not overlap, the location server may extrapolate to combine the traces. For example, the location server 110 stiches the segments 1, 2 and 3 to generate a longer trace that covers the trajectory for the signal source 302 between transit stop 320 and location C. In some sections, for example, between transit stops 322 and 324, or between 326 and 328, trace data was unavailable. For these sections, the location server 110 may extrapolate to tie the non-overlapping traces together.

The combined trace generated for the signal source 302 by stitching the segment traces together is of sufficient length to compare to public transit routes. Based on comparing to the lists of public transit routes stored in database 118, the location server 110 successfully matches the combined trace to the public transit route 310. Accordingly, the location server 110 determines that the wireless signal source 302 corresponds to a transit vehicle on the public transit route 310.

In this manner, the location server can use live trace data for public moving wireless signal sources to determine realtime trajectories for transit vehicles on public transit routes. The realtime trajectories facilitate more accurate forecasts for arrival/departures at locations along the routes, or providing ETAs for specific locations, or both, among other uses.

Exemplary Server Components

Figure 4:
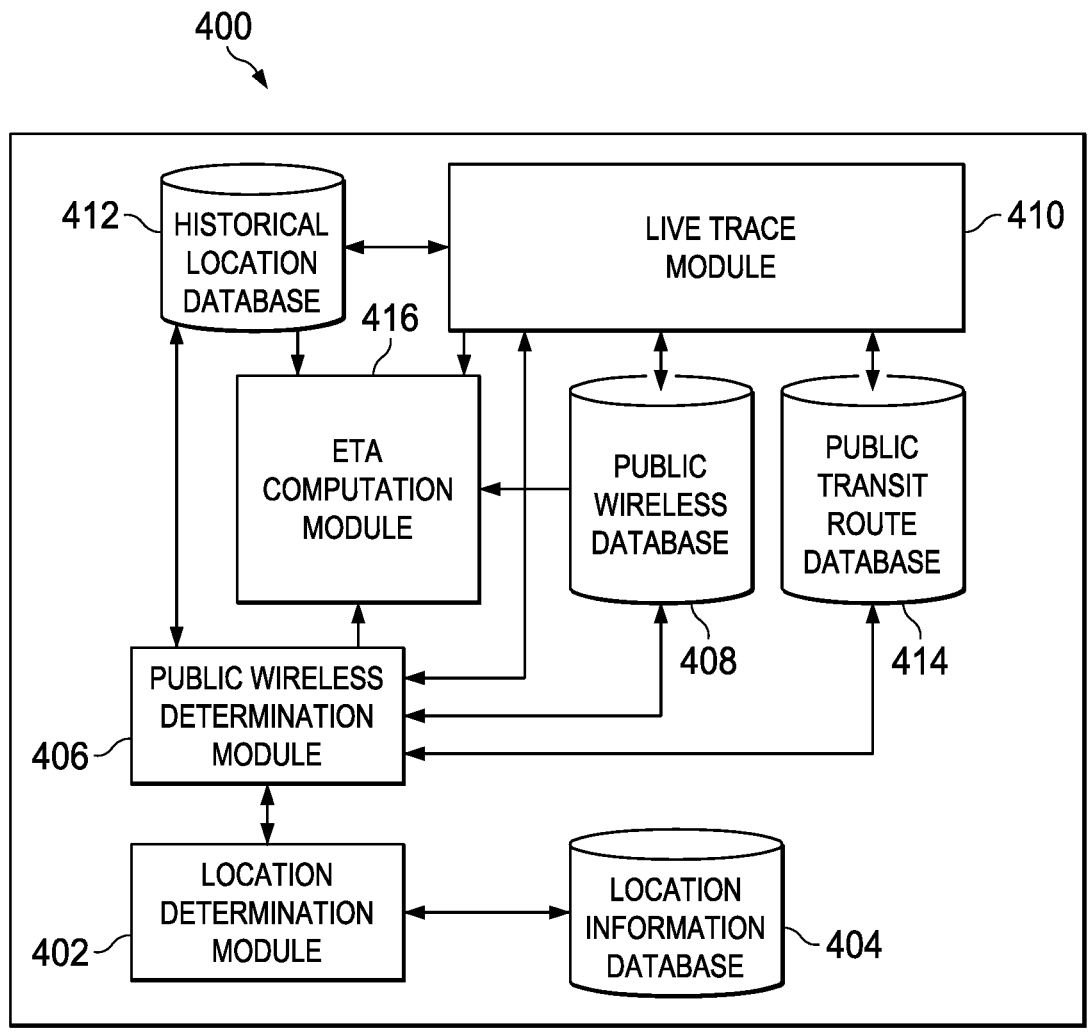
FIG. 4 is a block diagram illustrating exemplary components of a location server.

FIG. 4 is a block diagram illustrating exemplary components of a location server 400. In some implementations, the location server 400 may be similar to the location server 110. Accordingly, the components of the location server 400 are described in relation to the modules of the location server 110. However, in other implementations, the location server 400 may be different from the location server 110 such that the components of the servers may be dissimilar.

Each component of the location server 400, for example, a module or a database as described below, may include hardware, or software, or both. The hardware may include processors, or memory (e.g., temporary storage memories or hard drives), or both. The software may include firmware, system software, application software, or any suitable combination of these.

The components of the location server 400 may include the location determination module 402, public wireless determination module 406, live trace module 410, and ETA computation module 416. The components of the location server 400 also may include the location information database 404, public wireless database 408, historical location database 412, and public transit route database 414.

The location determination module 402 receives location queries from user devices, e.g., the location query 162 from user device 130, which include addresses of wireless signal sources for which locations are requested. As described previously, the location server 400, i.e., the location determination module 402, may know the locations of the static wireless signal sources, which may be stored in the location information database 404. Based on the locations of the static wireless signal sources, the location determination module 402 computes the locations of moving wireless signal sources include in the location queries. The location determination module 402 responds to the location queries with location response messages, e.g., the location response message 164, which include the known locations of the static wireless signal sources and the computed locations of the moving wireless signal sources. In some implementations, the locations may be expressed in <latitude, longitude> coordinates.

The public wireless determination module 406 determines whether one or more wireless signal sources included in the location queries are moving and public. The location determination module 402 may send the identifying information for the wireless signal sources obtained from the location queries to the public wireless determination module 406.

The public wireless determination module 406 checks whether any wireless signal source sent by the location determination module 402 is known to be a public moving wireless signal source. For example, the module 406 may compare the identifying information for the wireless signal sources with those of the public moving wireless signal sources stored in the public wireless database 408. Additionally or alternatively, the module 406 may determine whether a wireless signal source is moving and public by checking whether the wireless signal source is detected at multiple different locations, and whether multiple user devices exceeding a threshold connect to the wireless signal source, respectively.

The public wireless determination module 406 receives periodic signal information harvests from user devices, which include location data for public moving wireless signal sources seen by the user devices. The module 406 matches the location data in the periodic harvests to public transit routes stored in the public transit route database 414. Additionally or alternatively, the module 406 stores the location data in the historical location database 412. For example, the module 406 receives wireless signal information harvest message 166 from the user device 140, which may be matched to one or more public transit routes from the database 414, and stored in the historical location database 412.

The live trace module 410 determines realtime traces or trajectories for public transit vehicles based on trace data received from the user devices. The live trace module 410 obtains trace data from user devices and computes trajectories for public moving wireless signal sources that are included in the trace data. For example, the live trace module 410 may compute a trajectory for the signal source 302 based on trace data received from the user device 130.

In some implementations, the live trace module computes trajectory for a public moving wireless signal source based on trace data obtained from multiple user devices. For example, the live trace module 410 may compute a trajectory for the signal source 302 by stitching together trace data for segments 1, 2 and 3 that are received from the user device 130, the second and the third user devices respectively.

The live trace module 410 compares the computed trajectory for a public moving wireless signal source to known lists of public transit routes, which may be stored in the public transit route database 414. If a match is found with a public transit route, then the live trace module determines the computed trajectory to be realtime trace data for a transit vehicle on the matching public transit route.

The ETA computation module 416 receives ETA queries from user devices. For example, the ETA computation module 416 may receive the transit ETA query 168 from the user device 150. The module 416 matches transit information included in an ETA query to public moving wireless signal sources in transit vehicles that are operational on the public transit route indicated in the ETA query by communicating with the public wireless determination module 406, or based on information stored in the public wireless database 408, or the public transit route database 414, or any suitable combination of these. The ETA computation module 416 obtains instant locations of the public moving wireless signal sources from the module 406, and computes ETA at the desired location indicated in the ETA query.

The ETA computation module 416 may source historical arrival/departure information from the database 412 to compute the ETA. In some implementations, the ETA module may communicate with the live trace module 410 to obtain realtime trace data for the vehicles on the public transit route indicated in the ETA query. Upon computing the ETA, the module 416 responds to the ETA query with information about the computed ETA. For example, the module 416 sends a transit ETA response 169 from the user device 150.

In some implementations, one or more of the location determination module 402, the public wireless determination module 406, and the live trace module 410 may be implemented together as a single module. For example, the modules 402, 406 and 410 may be combined together and be similar to the location service 112.

The ETA computation module 416 may be similar to the transit service 120. In some implementations, the ETA computation module 416 also may be combined with the other modules and implemented as a single module. For example, the modules 402, 406, 410 and 416 may be combined together and be similar to a combined service that includes the location service 112 and the transit service 120.

In some implementations, the location information database 404 may be combined with the public wireless database 408. For example, the databases 404 and 408 may be combined together and be similar to the database 112a. The historical location database 412 may be similar to the historical location database 114, and the public transit route database 414 may be similar to the database 118. In some implementations, the various databases may be combined into a single database. For example, the databases 404, 408, 412 and 414 may be combined together into a single database, which may be similar to a database that includes the database 112a, the historical location database 114, movement traces 116 and the database 118 storing transit routes.

Exemplary Procedures for Providing Transit Information

Figure 5:
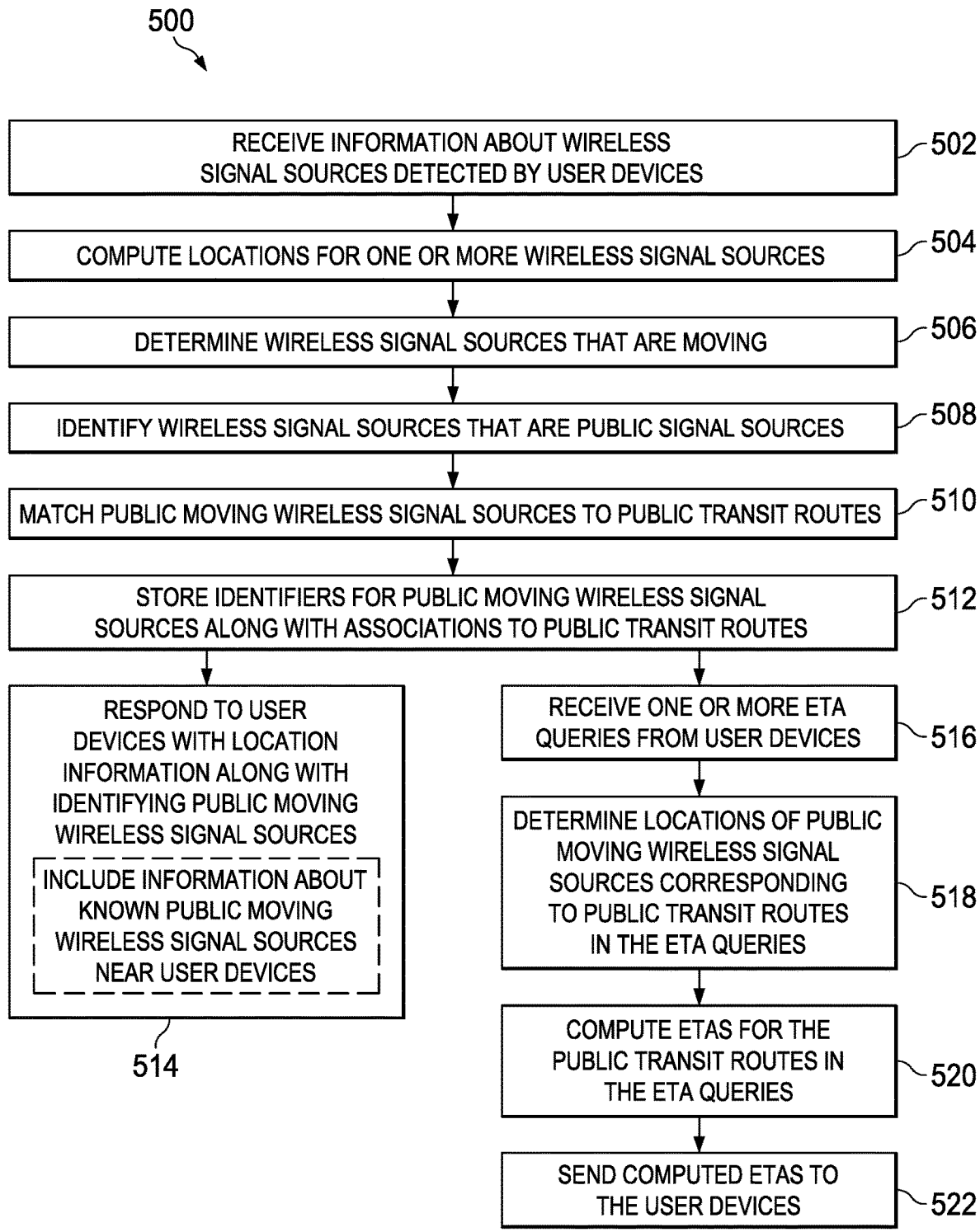
FIG. 5 is a flowchart illustrating an exemplary process for providing transit information.

FIG. 5 is a flowchart illustrating an exemplary process 500 for providing transit information. The process 500 may be used for identifying wireless signal sources as public moving wireless signal sources based on crowd-sourcing information from user devices, and associating public moving wireless signal sources to transit vehicles on public transit routes. For example, the process 500 may be implemented by the location server 110 to provide the location service 112. In addition, the process 500 may be used for providing ETAs of public transit vehicles at users' locations. For example, the location server 110 may implement the process 500 to provide the transit service 120. Accordingly, the following section describes the process 500 as being performed by components of the system 100. However, the process 500 may be performed by other systems or system configurations.

In some implementations, the process 500 is implemented by components of the location server 110 working in conjunction with one another, for example, the location service 112, historical location database 114, datastore for movement traces 116, database 118 of transit routes and the transit service 120. These components use one or more processors included in the location server 110 to execute instructions configured by a service provider that are stored in memory coupled to the location server (e.g. the database 114 or some other suitable memory), thereby providing crowd-sourced transit information as described by the process 500.

At 502, the server receives information about wireless signal sources detected by the user devices. For example, the location server 110 receives location queries, periodic harvests, or trace data, or any suitable combination of these, from multiple user devices. Location queries may include the location query 162 from the user device 130, which includes identifying information (e.g., MAC addresses) about the wireless signal sources 132, 134, 136 and 138 detected by the user device 130. The periodic harvest may include the wireless signal information harvest message 166 from the user device 140. The trace data may include data from second or third user devices traveling along the segments 2 or 3. Some of the location queries, periodic harvests, or trace data received from the multiple user devices include identifying information about the wireless signal source 134.

At 504, the server computes location for one or more wireless signal sources. For example, the location server 110 obtains identifying information about the wireless signal sources 132, 134, 136 and 138 from the location query 162. The location server 110 determines that the location of the wireless signal source 134 is unknown, while the locations of the static signal sources 132, 136 and 138 are known (e.g. stored in the database 112a). Consequently, the server computes the location for the signal source 134 based on the known locations of the static signal sources 132, 136 and 138 (e.g., using triangulation).

At 506, the server determines wireless signal sources that are moving. For example, the server determines that one or more of location queries, periodic harvests, or trace data received from other user devices (e.g., user device 140) include the identifying information for the wireless signal source 134, and the locations computed for the signal source 134 from this information are different from the location computed based on the location query 162. Additionally or alternatively, the server determines, by looking up historical location data in the database 114, that locations of the signal source 134 that were previously received are different from the location computed based on the location query 162. Accordingly, the server determines that the wireless signal source 134 is moving.

At 508, the server identifies wireless signal sources that are public signal sources. For example, the location server 110 determines that multiple user devices have observed, i.e., connected to or detected, the wireless signal source 134. Accordingly, the location server determines that the wireless signal source 134 is public. In some implementations, the location server determines that the wireless signal source 134 is public only if the number of user devices observing the wireless signal source 134 meets or exceeds a predetermined threshold number.

At 510, the server matches public moving wireless signal sources to public transit routes. For example, upon determining that the wireless signal source 134 is a public moving wireless signal source, the location server 110 compares the locations of the wireless signal source 134 to the database 118 of transit routes known to the location server. If the locations of the wireless signal source 134 correspond to locations on a particular public transit route, e.g., public transit route P, then the location server determines that the wireless signal source 134 is associated with the public transit route P. The locations of the wireless signal source may be computed based on location queries, or obtained from periodic harvests/historical location data, or from movement traces 116, or any suitable combination of these.

At 512, the server stores identifiers for the public moving wireless signal sources along with the associations to public transit routes. For example, the location server 110 stores the identifying information of the wireless signal source 134 as a public moving wireless signal sources in the database 112a, or 114, or both. In addition, upon determining that the wireless signal source 134 corresponds to a vehicle on the public transit route P, the location server 110 stores the association of the signal source 134 with P along with storing the identifying information of 134.

At 514, the server responds to the user devices with location information about the wireless signal sources, along with information identifying public moving wireless signal sources. For example, the location server 110 sends a location response message 164 to the user device 130, which includes the locations of the wireless signal sources 132, 134, 136 and 138. In addition, the message includes information identifying the wireless signal source 134 as a public moving wireless signal source. Consequently, the user device 130 can trace the location of the wireless signal source 134 as the user device is moving.

In some implementations, the server includes information about known public moving wireless signal sources near the user devices. For example, the location server 110 may include in the location response message 164, a list of public moving wireless signal sources that are determined to be in the neighborhood of the user device 130. The server may estimate the location of the user device 130 based on the determined locations of one or more of the wireless signal sources 132, 134, 136 or 138. Consequently, the user device 130 can trace the locations of the public moving wireless signal sources, which it detects as it is moving and which are identified from the list.

At 516, the server receives one or more ETA queries from user devices. For example, the location server 110 receives a transit ETA query message 168 from the user device 150.

At 518, the server determines locations of public moving wireless signal sources corresponding to public transit routes in the ETA queries. For example, the location server 110 determines, based on the ETA query 168, that the user device 150 is seeking ETA for the public transit route P, and that wireless signal source 134 is associated with a transit vehicle V on the route P. The location server 110 computes the instant location of the wireless signal source 134 based on the information received from the other user devices, e.g., as described at 504.

At 520, the server computes ETAs for public transit routes in the ETA queries. For example, the location server 110 determines that the transit vehicle V would be the first transit vehicle on the route P that would arrive at the location of user device 150. The location server 110 computes the ETA at the location of the user device 150 for the transit vehicle V based on the instant location of the wireless signal source 134, historical movement data for transit vehicles on the route P that are obtained from the database 114, live movement traces 116 of the transit vehicle V, or any suitable combination of these.

At 522, the server sends computed ETAs to the user devices. For example, the location server 110 sends the ETA response message 169 to the user device 150. The ETA response message 169 includes information indicating the time that the next transit vehicle on the public transit route P (e.g., the transit vehicle V) will arrive at the location provided by the ETA query 168. Upon receiving the time information, the user device 150 may display an alert message that shows the time.

Figure 6:
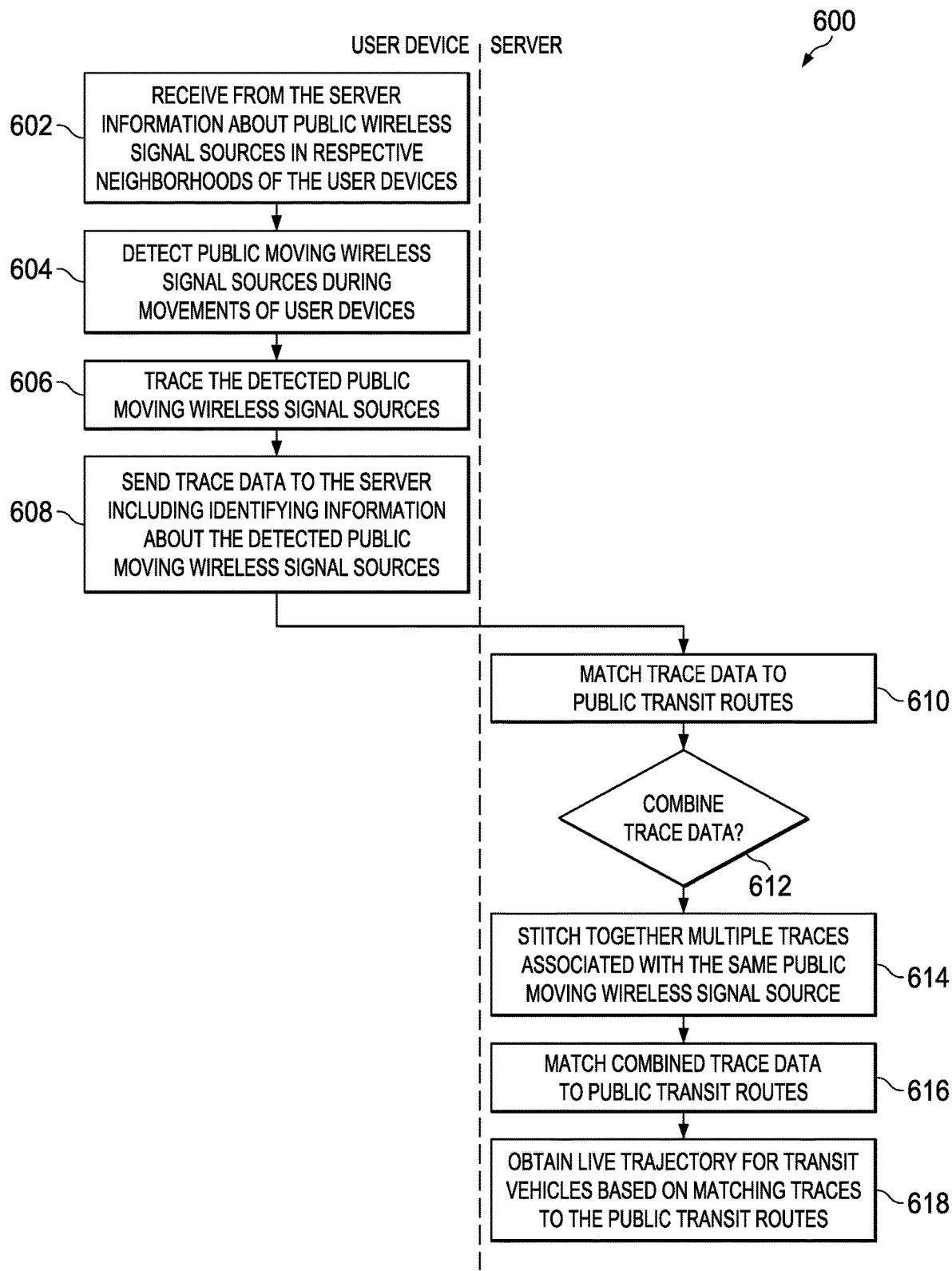
FIG. 6 is a flowchart illustrating an exemplary process for obtaining movement traces of public moving wireless signal sources.

FIG. 6 is a flowchart illustrating an exemplary process 600 for obtaining movement traces of public moving wireless signal sources. The process 600 may be used for computing live traces of transit vehicles on public transit routes based on crowd-sourcing information from user devices. For example, the process 600 may be used by the location server 110 working with one or more user devices, for example, 130, 140 or 150, to generate movement traces 116. Accordingly, the following section describes the process 600 as being performed by components of the system 100 as the user devices move along paths matching the public transit route 310. However, the process 600 may be performed by other systems or system configurations.

The location server 110 and the user devices that work together use one or more processors included in the respective devices to execute instructions stored in memory coupled to respective devices to implement the process 600. In some implementations, the process 600 may be used in conjunction with the process 500.

At 602, one or more user devices receives, from the server, information about public moving wireless signal sources in the respective neighborhoods of the user devices. For example, the user device 130 receives the location response message 164 from the location server 110. The message 164 identifies the wireless signal source 302 as a public moving wireless signal sources. Additionally, the message 164 includes a list of public moving wireless signal sources that are determined by the location server 110 to be in the neighborhood of the location of the user device 130. Similarly, second and third user devices may receive messages from the location server 110 that include lists of public moving wireless signal sources that are in the neighborhood of the respective user devices.

At 604, one or more user devices detect public moving wireless signal sources during movements of the user devices. For example, the wireless signal source 302 may be providing network connectivity on the transit vehicle V. The user device 130 detects signals from the wireless signal source 302, e.g., at location A, as the user associated with the user device 130 is traveling in transit vehicle V along the segment 1. The second user device detects signals from wireless signal source 302 in segment 2 as the second user travels in a vehicle close to the transit vehicle V, while the third user device detects signals from the wireless signal source 302 in segment 3 while the third user is a passenger in the transit vehicle V.

At 606, one or more user devices trace the detected public moving wireless signal sources. For example, upon learning that the wireless signal source 302 is public, the user device 130 tracks signals from the wireless signal source 302 as the user device traces its movement. Similarly, each of the second and third user devices track the wireless signal source 302 based on identifying the wireless signal source 302 as a public moving wireless signal sources included in the lists received from the location server 110.

At 608, one or more user devices send trace data to the server, including identifying information about the detected public moving wireless signal sources. For example, the user device 130 sends to the location server 110 movement traces collected for segment 1, along with identifying information (e.g., MAC address) of the wireless signal source 302 that is indicated as detected along the movement traces. Similarly, the second and third user devices send movement traces for segments 2 and 3 respectively, where the trace data include identifying information for the wireless signal source 302.

At 610, the server matches the trace data to public transit routes. For example, the location server 110 receives the trace data from one or more of the user device 130, the second and the third user devices. In some implementations, the location server 110 attempts to match the locations included in the trace data received from the individual devices to public transit routes known to the server (e.g., using the historical locations database 114, or the database 118, or both).

At 612, the server determines whether the trace data have to be combined. For example, the location server checks whether the trace data for the segments 1, 2 or 3 that are received from the user device 130, the second and the third devices respectively, are each, by itself, of sufficient length to match to public transit routes.

If the server determines that the trace data do not have to be combined, then the server obtains live trajectory for transit vehicles based on matching traces to public transit routes at 618. For example, the trace for segment 1 that is received from the user device 130 may be of sufficient length to find a match with the public transit route 310. Accordingly, the server may determine that the wireless signal source 302 is associated with a transit vehicle, e.g., vehicle V, on the public transit route. The server may then use the trace data for segment 1 received from the user device 130 as providing a live trajectory of the movement of vehicle V along the section of the public transit route 310 that encompasses segment 1.

On the other hand, if the server determines that the trace data have to be combined, then at 614 the server stitches together multiple traces associated with the same public moving wireless signal source. For example, the location server 110 may determine that each of the traces received from the user device 130 and the second and third users are of insufficient length to match definitively to a public transit route. However, each trace is associated with the same public moving wireless signal source 302. In addition, the location server may determine that the time periods of the traces are close to one another, indicating that all the traces are from the same instance of movement of the signal source 302. Based on these determinations, the location server stitches or combines the traces together to generate a longer trace that encompasses segments 1, 2 and 3.

At 616, the server matches the combined trace data to public transit routes. For example, the location server 110 determines that the combined trace for wireless signal source 302 that is generated by stitching together the individual traces is of sufficient length for comparing to public transit routes. Based on comparing to the database 118 of transit routes, the location server 110 successfully matches the combined trace to the public transit route 310.

At 618, the server obtains live trajectory for transit vehicles based on matching traces to public transit routes. For example, upon determining that the combined trace for the wireless signal source 302 corresponds to the public transit route 310, the location server 110 may determine that the wireless signal source 302 is associated with transit vehicle V on the public transit route 310. The server then uses the combined trace data for providing a live trajectory of the movement of vehicle V along the section of the public transit route 310 that encompasses segments 1, 2 and 3. In this manner, live traces may be used to obtain realtime trajectories of transit vehicles along transit routes, thereby facilitating location forecasts and ETA computations.

Exemplary Provision for Transit Routine

Figure 7A:
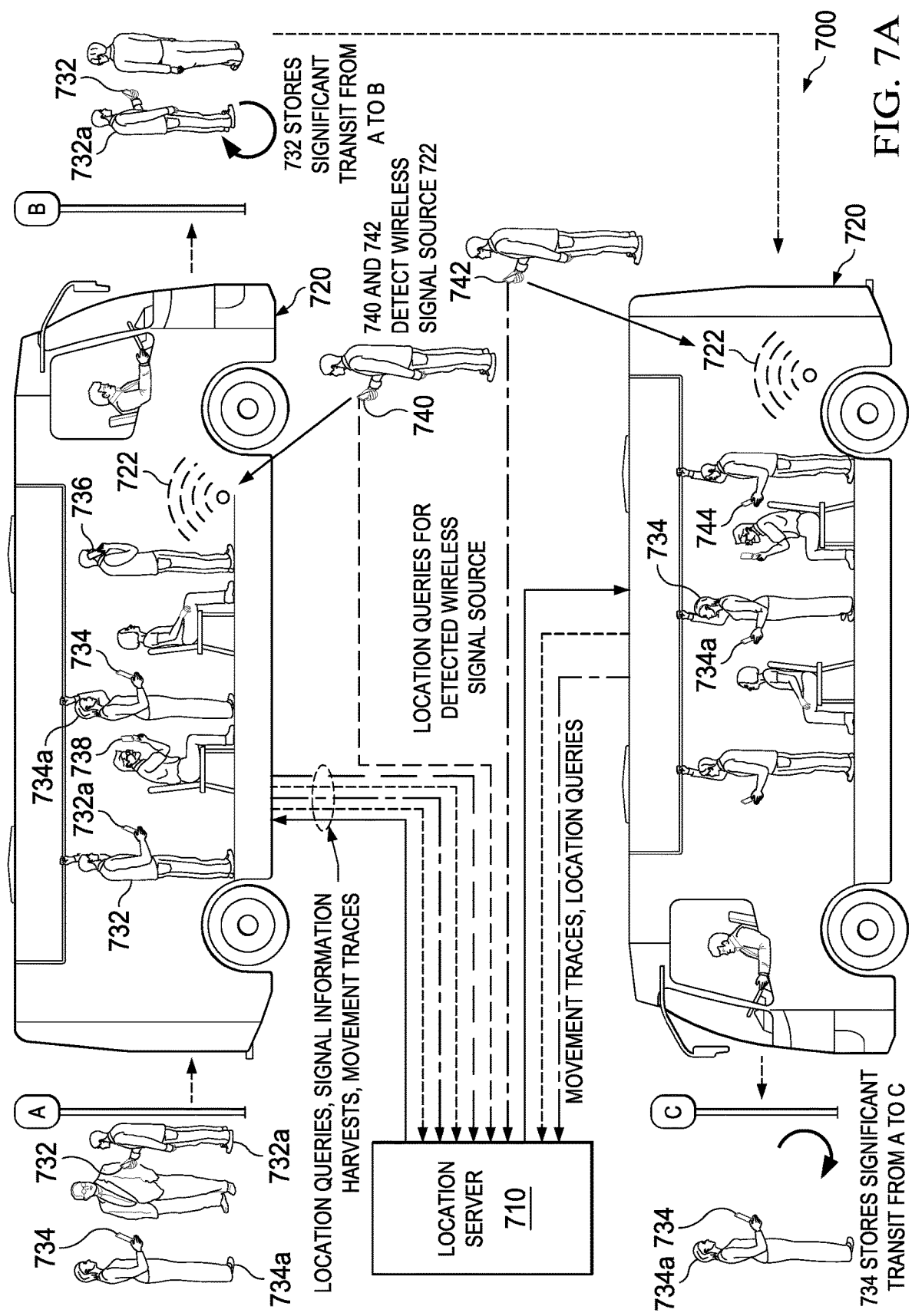
FIGS. 7A and 7B illustrate an exemplary system for determining transit routine of users and providing significant transit information.
Figure 7A:
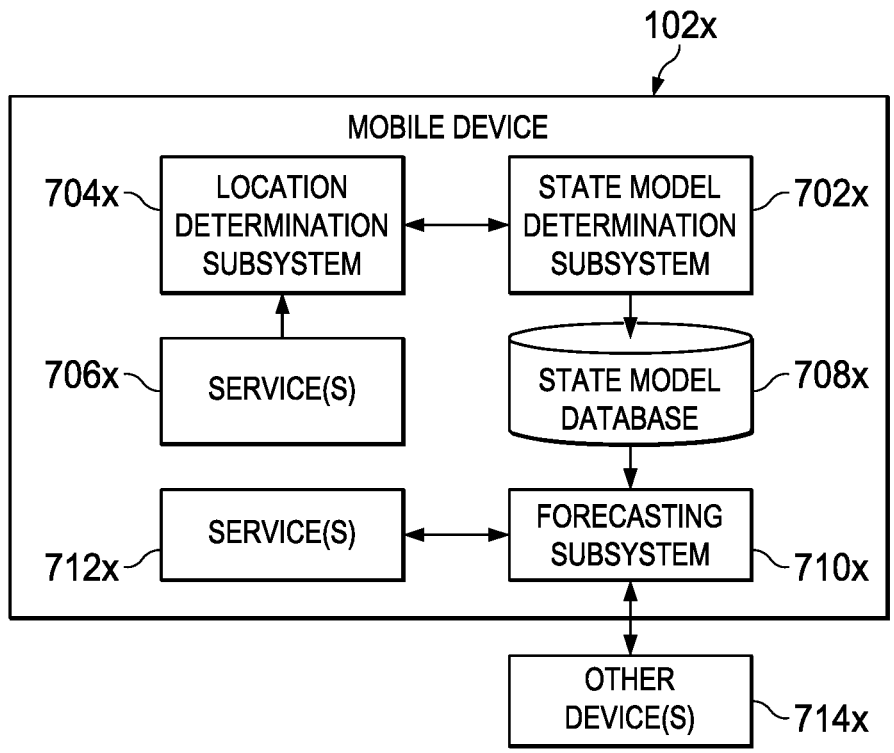
Figure 7B:
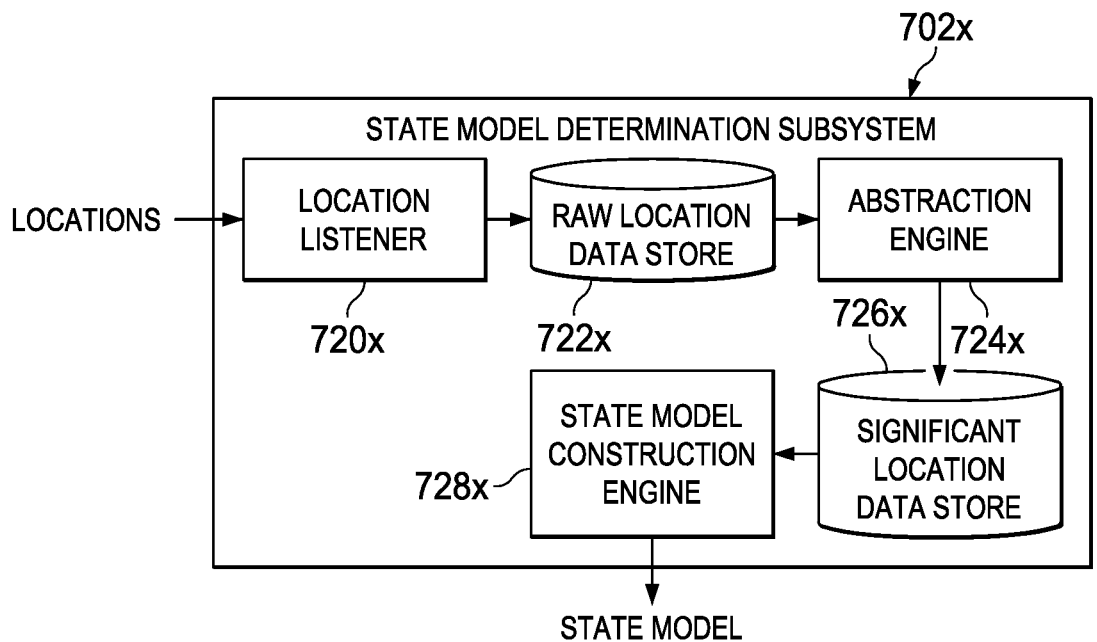
Figure 7B:
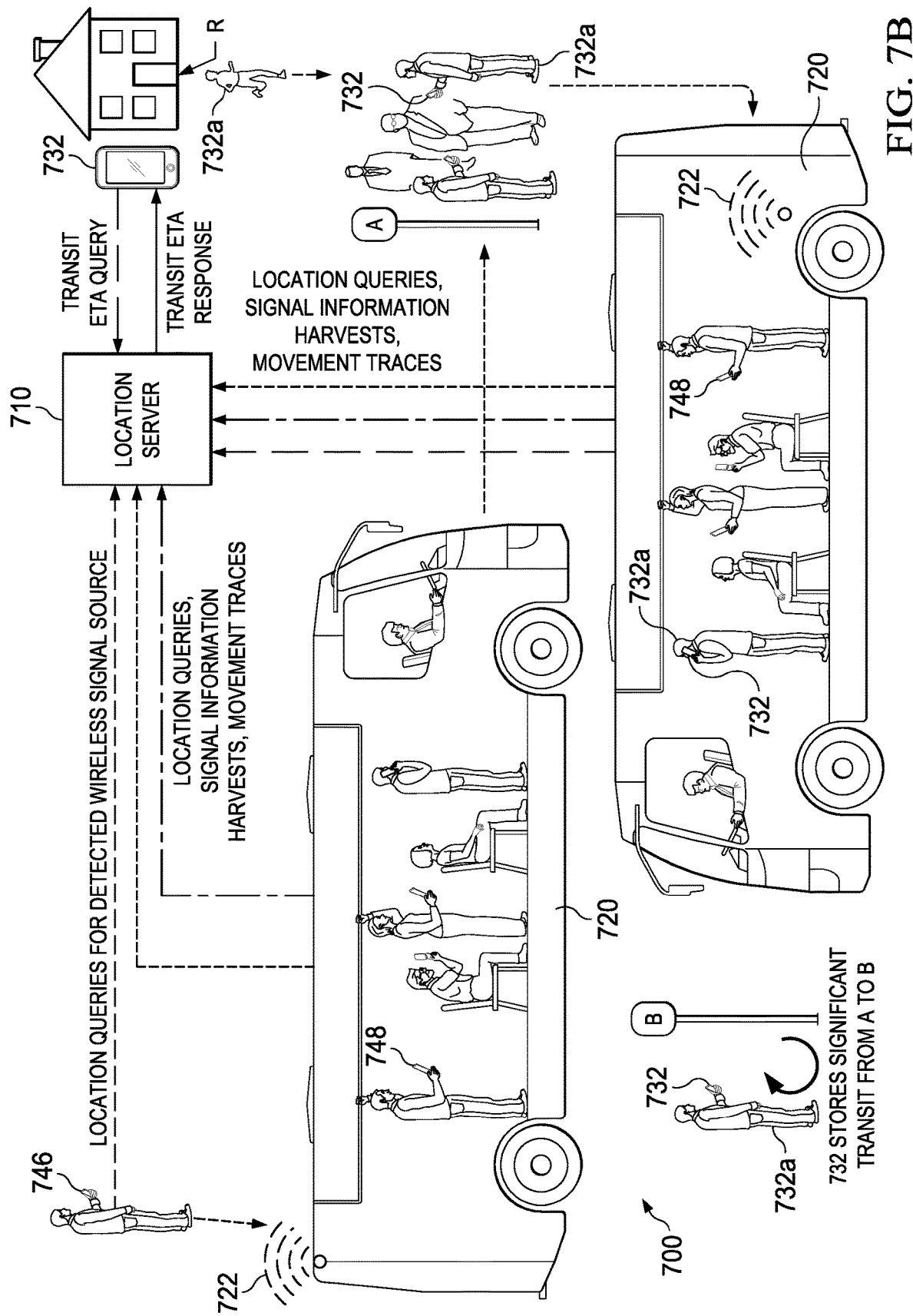

FIGS. 7A and 7B illustrate an exemplary system 700 for determining transit routine of users and providing significant transit information. For example, as shown in FIG. 7A, the system 700 may enable user device 732 or 734 to learn the transit routine of the device user 732a or 734a, respectively. Upon learning the transit routine of the user 732a, the user device 732 may provide live transit information for transit routes that are significant to the user 732a, as shown in FIG. 7B.

The system 700 may include the location server 710, a transit vehicle 720 that includes a wireless signal source 722, user device 732 associated with user 732a, user device 734 associated with user 734a, and other user devices 736, 738, 740, 742, 744, 746 and 748 that are associated with other users.

In some implementations, the user device 732 observes movement patterns of the associated device user 732a to determine a transit route that is significant to the user 732a. For example, the device 732 notes that every weekday at 8 am the user 732a is at location A, where wireless signal source 722 is detected by the device. Signals from wireless signal source 722 continue to be detected by the device 732 until the location is at B, which is approximately at 8:40 on weekdays. The device 732 learns the location A or B, or intermediate locations in between, where the signal source 722 is detected by sending one or more location queries to the location server 710 with the identifying information, e.g., MAC address, of the wireless signal source 722.

The location server 710 crowd-sources information from other user devices, e.g., 736, 738, 740, or 742, to compute the instant location of wireless signal source 722. Based on location queries, data harvest messages and trace data received from multiple user devices, the location server 710 determines that the wireless signal source 722 is detected at different places, and accordingly determines that the wireless signal source 722 is moving. In some implementations, the location server 710 also determines that the wireless signal source 722 is a public signal source based on the number of user devices observing the wireless signal source. The location server 710 sends one or more location response messages to the user device 732 including the computed location of the wireless signal source 722. The location server 710 also includes information indicating that the wireless signal source 722 is moving. In some implementations, the location server 710 also sends information indicating that the wireless signal source 722 is public.

Based on the location server 710 message(s) indicating that the wireless signal source 722 is moving, the user device 732 determines that location A or B, or intermediate locations in between, correspond to a transit route associated with the wireless signal source 722 that is significant to the device user 732a. In some implementations, the user device 732 also determines that the significant transit route is a public transit route, based on either the information sent by the location server 710, or by observing behavioral patterns of the device user 732a, or both.

The user device 732 includes the significant transit route associated with wireless signal source 722 to a state model. The user device 732 also adds location A, or B, or intermediate locations on the transit route in between A and B to the state model. The times at which the device user 732a is typically at location A or B also may be added to the state model.

The user device 732 executes the state model to forecast, based on the current location, and/or the current time, whether the user 732a will be next using the significant transit route associated with wireless signal source 722, e.g., whether the user will next be at location A or B. Based on the forecast, the user device 732 determines the ETA for a transit vehicle at location A or B and sends an alert message to the user 732a, indicating the ETA.

One or more of the user devices 732, 734, 736, 738, 740, 742, 744, 746 and 748 may be mobile devices with wireless network subsystems that are configured to detect wireless signal sources. The user devices may send location queries to the location server 710 for determining the locations of the detected wireless signal sources.

A user device, e.g., 732, may learn the transit routine of the associated device user, e.g., 732, by exchanging location query and response messages with the remote location server 710, and using the information received from the location server 710 to model significant locations, i.e., determine locations that are significant to the device user. In this context, a significant location can be a location that is significant to a user of a user device for a variety of reasons. The user device can determine that a place or region is a significant location upon determining that, with sufficient certainty, the user device has stayed at the place or region for a sufficient amount of time.

In addition to significant locations, a user device, e.g., 732, can determine transitions between the significant locations. Each transition from a first significant location to a second significant location can be associated with a transition begin timestamp indicating a time when the user device 732 leaves the first significant location and a transition end timestamp indicating a time when the user device 732 enters the second significant location.

In the example of FIG. 7A, user 732a boards a transit vehicle 720 at location A. As the user 732a travels on the transit vehicle 720, the user device 732 may detect signals from the wireless signal source 722 and send a location query to the location server 710 to determine the location of the signal source 722. The server 710 may receive information of the wireless signal source 722 from other user devices as well. For example, one or more of user devices 736 and 738 associated with other passengers on the transit vehicle 720 may send location queries about signal source 722. Additionally or alternatively, a user device 740 that is external to the transit vehicle 720, e.g., associated with a user traveling in a car alongside the transit vehicle 720, also may detect the wireless signal source 722 and send a location query to the server 710. One or more user devices, e.g., 736 or 738, also may send to the server 710 periodic signal information harvests, or movement traces, or both, that include information about the wireless signal source 722.

Based on the above information received from the user devices, the location server 710 can compute the instant location of the wireless signal source 722. In addition, the location server 710 can determine that the wireless signal source 722 is moving. This information may be communicated to the user device 732 in response to the location query message.

Upon receiving the information from the location server 710, the user device 732 caches identifying information about the signal source 722, e.g., MAC address, along with the location information for the signal source 722. For example, the user device 732 may record the location A associated with the MAC address of the wireless signal source 722. In addition, the user device 732 may record the time at which the wireless signal source 722 was detected at location A.

The user 732a disembarks the transit vehicle 720 at location B. The user device 732 may record the location B associated with the MAC address of the wireless signal source 722. The user device 732 also may record the time at which the wireless signal source 722 was detected at location B.

The transit vehicle 720 may be associated with a regular transit route of the user 732a. Accordingly, as described above, the user device 732 may detect the wireless signal source 722 at locations A and B, and at one or more points in between A and B, on a regular schedule and record these locations. The user device 732 also may determine that the wireless signal source 722 is detected at regular times of the day at the locations A and B. For example, on weekdays the user 732a may board the transit vehicle 720 from location A at approximately 8:00 am, and disembark at location B at approximately 8:40 am. In some implementations, the user device 732 may record these times as well.

In this manner, the user device 732 can determine that one or more of locations A or B are significant locations to the user 732a, and that the wireless signal source 722 is associated with a significant transit of the user 732a between the locations A and B. In some implementations, from the perspective of a user device, a significant transit may be considered to be a regularly-used motion path of the user device and that is associated with a moving wireless signal source.

The user device 732 may further determine that the significant transit between A and B associated with the wireless signal source 722 corresponds to a public transit route. In some implementations, the user device 732 may make this determination by analyzing the user 732a's behavioral patterns between the locations A and B. For example, the user device 732 may determine that, at the locations and/or during the times the wireless signal source 722 is detected, the user 732a performs some function on the user device 732, e.g., texting, reading, web browsing or talking on the phone. The user device 732 may determine that such functions are inconsistent with the user 732a driving her own vehicle, and accordingly infer that the user 732a is a passenger on a transit vehicle while associated with the wireless signal source 722 between the significant locations A and B.

In some implementations, the user device 732 may determine that the wireless signal source 722 is associated with a public transit route based on information received from the location server 710. For example, when the server 710 sends a location response to the user device 732 providing the location of wireless signal source 722, the server also may include information indicating that the wireless signal source 722 is associated with a public transit route.

The user device 732 may store, in storage coupled to the user device, the identifying information, e.g., MAC address, of wireless signal source 722 along with the location of A, or B, or both, as associated with a significant transit pattern for the device user 732a. The user device 732 also may store the significant times associated with the transit pattern, e.g., the time when the user 732a is typically at location A or B respectively. Additionally, if the user device 732 learns as described above that the significant transit pattern corresponds to a public transit route, the user device 732 may store that information as well, e.g., indicating that the wireless signal source 722 is associated with a transit vehicle on a public transit route that is significant to user 732a.

In a manner similar to the above, the user device 734 may learn a significant transit for the associated device user 734a. The user device 734 also may cache the identifying information, e.g., MAC address, of wireless signal source 722 along with the location of A, or C, or both, as associated with a significant transit pattern for the device user 734a. In association, the user device 732 may store information indicating that the wireless signal source 722 is associated with a transit vehicle on a public transit route that is significant to user 734a.

A user device may feed the transit pattern of the associated device user, learned as described above, to a forecasting subsystem of the device to proactively determine the user's movement patterns, and accordingly obtain ETA information for transit vehicles at locations on the device user's regular transit route that are significant to the user. Additionally, the forecasting subsystem may obtain the ETA information for times that are significant to the device user.

The user device may model the significant locations as states in a state model, and the movement of the device user from one significant location to another as a transition between the associated states. In some implementations, the user device may consider both significant locations and significant times in modeling the states in the state model. The forecasting subsystem may execute the state model to obtain a predictive pattern of the user's movements, and accordingly forecast the user's future location based on a current location of the user and the current time. The user device may obtain an ETA of a transit vehicle associated with the user's significant transit route when the user is forecasted to be at a significant location on the transit route.

In the example of FIG. 7B, the user 732a may be at her residence at location R on a weekday at approximately 7:45 am, preparing to leave for work. The user device 732 may have stored the location R as a significant location. The user device 732 also may have stored the time around 7:45 am as a significant time. The user device 732 may model this significant location, or the significant time, or both, as states in a state model in the device. Upon executing the state model, a forecasting subsystem of the user device 732 may determine that the next state for the user corresponds to significant location A at significant time of approximately 8:00 am.

The user device 732 may determine, by looking up cached information about significant transit routes for user 732a, that the next state at significant location A and at significant time 8:00 am corresponds to the public transit route associated with the wireless signal source 722. Upon making this determination, the user device 732 may send a transit ETA query message to the location server 710, inquiring about the time the transit vehicle associated with the wireless signal source 722 will arrive at the location A.

The location server 710 determines the instant location of the wireless signal source 722 upon receiving the transit query message from the user device 732. The location server 710 may determine the instant location of the wireless signal source 722 based on the location queries it receives from other user devices that detect the wireless signal source 722, e.g., a location query from user device 746 sent upon detecting the wireless signal source 722 as the transit vehicle 720 passes by the user associated with 746. Additionally or alternatively, the location server 710 may determine the instant location of the wireless signal source 722 based on single information harvests and movement traces received from other user devices that include the wireless signal source 722. For example, the user device 748 traveling on the vehicle 720 may send movement traces to the location server that includes identifying information of the signal source 722.

Once the instant location of the wireless signal source 722, i.e., the instant location of the transit vehicle 720, is determined, the location server 710 computes the ETA of the vehicle 720 at location A. The location server may use historical arrival/departure data of the transit vehicle 720, e.g., data harvested from the periodic signal information harvests received from the other user devices including 746, to compute the ETA. The location server 710 also may use the movement traces obtained from the other user devices, e.g., 748, in computing the ETA with a low margin of error.

Upon computing the ETA of the transit vehicle 720 at the location A, the location server 710 may send a transit ETA response to the user device 732 with the ETA information. The user device 732 may send an alert message to the user 732*a*, informing that the next transit vehicle on the significant transit route of the user 732*a* will arrive at the significant location A at the time that is indicated by the transit ETA response message. The user device 732 may show the alert message on a display screen coupled to the device, or send an audible alert, or both. Accordingly, the user 732*a* may be made aware of the ETA for the next transit vehicle at the user's departure stop, and therefore the user may arrive at the location A in time to board the transit vehicle.

Additionally or alternatively, in a manner similar to the above, the user device 732 may alert the user 732*a* when the user is traveling on the transit vehicle 720 and about to reach the location B. For example, the user device 732 may include intermediate points on the transit route between locations A and B, or regular times of arrival/departure at these intermediate points, as states or state triggers in the state model. Accordingly, when the transit vehicle 720 arrives at an intermediate point that precedes location B, the forecasting subsystem of the user device 732 may determine that the next state for the user corresponds to significant location B. Upon making this determination, the user device 732 may send another transit ETA query message to the location server 710, inquiring about the time of arrival at location B.

The location server 710 may compute the ETA of the transit vehicle 720 at location B in a manner similar to that described above with respect to location A, and send a second transit ETA response to the user device 732 with the ETA at location B. Upon receiving the second transit ETA response message, the user device 732 may send an alert to the user 732*a*, informing that the transit vehicle will arrive at the significant location B at the time that is indicated by the second transit ETA response message.

In the manner described above, a user device may learn which wireless signal sources are associated with the transit routes of the device user, and the significant locations and times for the transit routes. The user device may employ this information to provide to the user ETAs for the transit vehicles at the significant locations, or at significant times, or both. In this context, the transit vehicle, e.g., 720, may be a commuter bus or train on a public transit route, e.g., in a metropolitan bus or train network. The transit vehicle 720 alternatively may be a regular company shuttle operated along specified routes, a chartered bus, or a long-distance bus or train, or any other suitable vehicle. The wireless signal source 722 may be a Wi-Fi™ network access point or a Bluetooth™ node, among others, that broadcast signals for a public wireless network operational on the transit vehicle 720.

In some implementations, there may be multiple transit vehicles associated with a significant transit route of a device user, e.g. 732*a*. Different transit vehicles may include different wireless signal sources. The user device, e.g., 732, may learn, following the exchange with the location server 710, to associate the different wireless signal sources with their respective transit vehicles. In some implementations, when sending location queries to the location server 710 for the same significant location, the user device may identify different wireless signal sources based on different significant times, which may be due to learning that the significant location is serviced by different transit vehicles at the different significant times.

In some implementations, when the user device, e.g., 732, is traveling on a transit vehicle along a significant route, the device 732 sends realtime movement traces to the location server 710 that identifies the transit vehicle, e.g., 720. The user device 732 may identify the transit vehicle 720 by including the identifying information about the wireless signal source 722 in the live trace data feed sent to the location server 710. In this manner, the user device 732 can provide information to the location server 710 about the current location of the transit vehicle 720. This may help the location server 710 to determine the realtime path of the transit vehicle 720, and thereby provide greater accuracy in determining ETAs for other user devices. In this manner, all user devices contribute towards providing realtime transit schedules and/or alerts, e.g., ETAs at significant locations or at significant times, to individual users.

In this context, the location server 710 may be similar to the location server that is described with reference to FIGS. 1-4. The location queries, signal information harvest messages and movement traces described in FIGS. 7A and 7B may be similar to the location queries, signal information harvest messages and movement traces, respectively, that are described with reference to FIGS. 1-3. The wireless signal source 722 may be similar to the public moving wireless signal source described with reference to FIGS. 1-3. The transit route described in FIGS. 7A and 7B may be similar to the public transit routes described with reference to FIGS. 1-3.

Techniques for determining significant locations, computing state models based on the significant locations, and using the state models for predictive user assistance are also described in the following sections.

Exemplary Predictive User Assistance

FIG. 1X is a diagram illustrating an exemplary implementation of predictive user assistance. Exemplary user device 102*x* can utilize past movements of user device 102*x* to predict a future location of user device 102*x*. User device 102*x* can then adapt behavior of user device 102*x* to perform services that are specific to the predicted future location.

User device 102*x* can use machine learning and data mining techniques to learn the past movement of user device 102*x*. The past movement can be recorded as significant locations visited by user device 102*x* and movement of user device 102*x* between the significant locations. User device 102*x* can determine that a place or region is a significant location upon determining that, with sufficient certainty, user device 102*x* has stayed at the place or region for a sufficient amount of time. The amount of time can be sufficient if it satisfies various criteria, for example, when the amount of time satisfies a time length threshold (e.g., X hours) or a frequency threshold (e.g., X minutes per day, Y number of days per week). Records of movement of user device 102x can include a measured or calculated time of entry into each significant location and a measured or calculated time of exit from each significant location. A significant location can be associated with multiple entries and exits.

In addition to significant locations, the records of movement can include transitions between the significant locations. Each transition from a first significant location to a second significant location can be associated with a transition begin timestamp indicating a time user device 102x leaves the first significant location and a transition end timestamp indicating a time user device 102x enters the second significant location.

User device 102x can represent the records of movement as state model 104x. State model 104x can include states (e.g., state 106x and other states) each representing a significant location, and transitions (e.g., transition 107x and other transition between the states) each representing a movement of user device 102x between significant locations. Additional details of determining state model 104x are described below in reference to FIG. 2X-5.

Based on state model 104x, user device 102x can determine (1) a transition probability density that, at a given time, user device 102x moves from a given significant location to each other significant location, or (2) an entry probability density that user device 102x enters a significant location from a previously unknown or unrepresented location. A pattern analyzer of user device 102x can determine a daily, weekly, monthly, or annual movement pattern of user device 102x using state model 104x. A predictive engine of user device 102x can use transition probability density (or entry probability density) and the movement pattern to forecast a significant location that user device 102x will enter (or stay) at a future time. User device 102x can then use the forecast to provide predictive user assistance, e.g., to assist the user to plan for a future event.

In the example of FIG. 1X, user device 102x can determine current location 108x using a location determination subsystem of user device 102x. User device 102x can determine current time 110x. Based on the current location, current time, and the probabilities and patterns of state model 104x, user device 102x can determine that a most likely location of user device 102x at a given time in the future is a significant location represented by state 106x. User device 102x can then perform a user-assistance function corresponding to the significant location, or corresponding to a transition from the current location to the significant location. For example, upon being turned on or unlocked, user device 102x can provide for display alert 112x on a display surface of user device 102x. Alert 112x can include user assistance information 116x. User assistance information 116x can include, for example, a route from the current location to the likely future location, and traffic information along the route. User device 102x can provide for display alert 112x and user assistance information 116x automatically, without requesting a user to input the likely future location as a destination.

In some implementations, user device 102x can provide a label associated with the likely future location. The label can be an address or a name of a point of interest pre-specified by a user or determined by user device 102x through reverse geocoding or through semantic analysis of movements of user device 102x. For example, user device 102x can determine that a first location is likely to be a home and a second location is likely to be a work place. Accordingly, user device 102x can use the terms "home" and "work" in user assistance information 116x.

Exemplary Techniques of Constructing a State Model

FIG. 2X is a diagram illustrating exemplary techniques of determining location clusters. Exemplary user device 102x (of FIG. 1X) can use the learning techniques to determine state model 104x (of FIG. 1X).

User device 102x can sequentially trace location data through time (T). Sequentially tracing location data can be performed by piggybacking on another application to avoid or reduce cost of location data collection. For example, user device 102x can collect the location data when another service requests location from a location determination subsystem of user device 102x. Accordingly, collecting the location data can be "free" without having to activate the location determination subsystem solely for determining a movement pattern of user device 102x.

User device 102x can collect locations 202x, 204x, 206x, 208x, 210x, and 212x over time T. Collecting the locations can be ongoing operations. Locations older than a specified period can be purged. The period can be specified by user preference or privacy policies. Locations 202x, 204x, 206x, 208x, 210x, and 212x can each include latitude, longitude, and altitude coordinates and being associated with a timestamp indicating a time the corresponding location is collected.

User device 102x can determine that some of locations 202x, 204x, 206x, 208x, 210x, and 212x belong to location clusters that may indicate a significant location. User device 102x can determine that a location cluster is formed upon determining that (1) at least a pre-specified threshold number (e.g., two) of consecutive locations are collected; (2) a time span of the consecutive locations satisfies a pre-specified threshold time window; and (3) these locations are identical, indicating that user device 102x is stationary, or sufficiently close to one another, indicating that user device 102x is located in a sufficiently small and defined area during the time the locations are collected.

For example, user device 102x can determine two location clusters, location cluster 218x and location cluster 220x, over time T. Location cluster 218x can include locations 202x, 204x, and 206x, which are collected over a time period [T1, T2] that is longer than a threshold time window (e.g., a time window of 45 minutes). User device 102x can determine that location cluster 218x includes locations 202x, 204x, and 206x upon determining that a variance of locations 202x, 204x, and 206x is low enough to satisfy a variance threshold. Likewise, location cluster 220x can include locations 210x and 212x, which are collected within time period [T3, T4]. User device 102x can determine that location cluster 220x includes locations 210x and 212x upon determining that a variance of locations 210x and 212x satisfies the variance threshold.

An outlier detection mechanism can filter out locations that do not belong to clusters. For example, user device 102x can determine that location 208x is different from location 206x and location 210x (e.g., the distance between location 206x and 208x and the distance between location 208x and location 210x exceeds a threshold). In addition, user device 102x can determine that no other locations are (1) collected within the threshold time window before or after location 208x and (2) geographically close to location 208x. In response, user device 102x can determine that location 208x is an outlier and discard location 208x. In addition, if a location in a time period is significantly different from many other locations in the time period, user device 102x can discard the different location as an outlier and determine the location cluster using other locations in the time window. User device 102x can use location clusters 218x and 220x to determine significant locations and states of state model 104x.

Figure 3X:
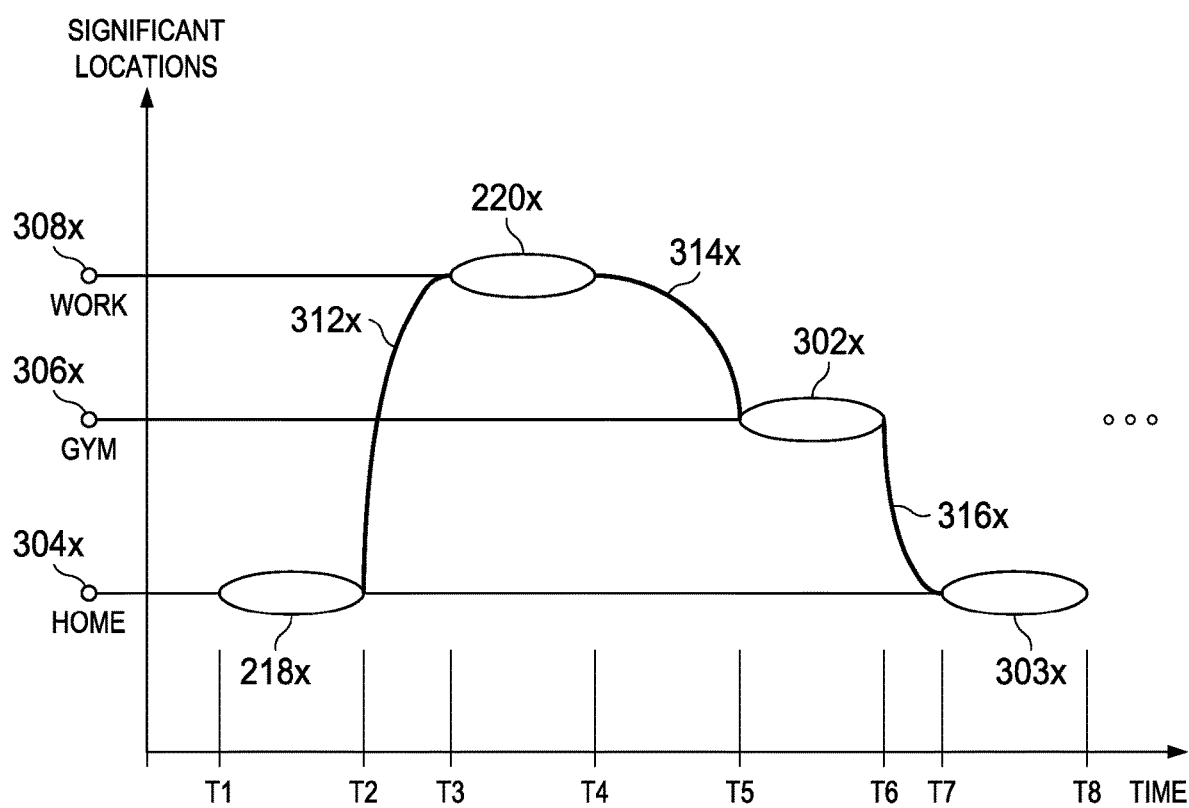
FIG. 3X is a diagram illustrating exemplary techniques of identifying significant locations based on location clusters.

FIG. 3X is a diagram illustrating exemplary techniques of identifying significant locations based on location clusters. Using the techniques described above in reference to FIG. 2X, user device 102x can identify location clusters 218x, 220x, 302x, and 303x. User device 102x can determine significant locations 304x, 306x, and 308x based on location clusters 218x, 220x, 302x, and 303x.

User device 102x can determine each of significant locations 304x, 306x, and 308x based on location clusters 218x, 220x, 302x, and 303x using the locations in each of location clusters 218x, 220x, 302x, and 303x. Determining significant locations 304x, 306x, and 308x can be based on recursive filter with a constant gain. Details of determining significant locations 304x, 306x, and 308x are provided below in the next paragraph. Each of significant locations 304x, 306x, and 308x can include latitude, longitude, and optionally, altitude coordinates. Each of significant locations 304x, 306x, and 308x can be associated with one or more location clusters. For example, signification location 304x can correspond to location cluster 218x in time period [T1, T2] and location cluster 303x during time period [T7, T8]. Location in location cluster 218x and location cluster 303x can be identical. The length of time period [T1, T2] and time window [T7, T8] can be same or different.

User device 102x can have an initial state model at time T2. At time T2+k, user device 102x can receive incremental location data, where k is a difference between time T2 and the time the additional location data are received (in this example, k=T7−T2). User device 102x can use the incremental location data to determine significant location 304x for use in the state model. User device 102x can determine that location cluster 218x corresponds to latitude and longitude coordinates X1. User device 102x can determine that location cluster 303x corresponds to latitude and longitude coordinates X2. User device 102x can determine that a distance between X1 and X2 satisfies a threshold. In response, user device 102x can determine that location cluster 218x and location cluster 303x belong to a same location (significant location 304x). User device 102x can then add location cluster 303x to significant location 304x using constant gain filter as shown below in filter 1 (e.g., a function of sampling data, e.g., 5, 6, 7, may not be same for all clusters).

$$\frac{X2 + \alpha X1}{1 + \alpha}, \text{ where } \alpha \geq 1 \quad (1)$$

The value α in filter 1 (e.g., 5, 6, 7) can be a function of sampling data and may be same for all location clusters or different for each location cluster.

Each of significant locations 304x, 306x, and 308x can be associated with one or more entry timestamps and one or more exit timestamps. Each entry timestamp can correspond to a time associated with a first location in a location cluster. For example, a first entry timestamp associated with significant location 304x can be a timestamp associated with location 202x, which is the first location of location cluster 218x. A second entry timestamp associated with significant location 304x can be a timestamp associated with a first location in location cluster 303x. Likewise, each exit timestamp can correspond to a time associated with a last location in a location cluster. For example, a first exit timestamp associated with significant location 304x can be a timestamp associated with location 206x, which is the last location of location cluster 218x. A second entry timestamp associated with significant location 304x can be a timestamp associated with a last location in location cluster 303x.

Each of significant locations 304x, 306x, and 308x can be associated with a label. The label can be designated by a user (e.g., "Home," "Gym," or "Work"), or automatically determined by user device 102x through reverse geocoding. In some implementations, the label can be derived from a semantic analysis of a pattern of the time of day and day of week of each location cluster associated with the significant locations. The semantic analysis can be based on behaviors natural to human beings. User device 102x can be programmed to apply pre-determined patterns that reflect the human behavior. The behavior can include, for example, every human being needs to sleep for some time. The time for sleeping can be a time user device 102x is strictly stationary. A user sleeps eight hours a day and eating dinner at home is likely to spend X hours (e.g., 10-12 hours) at home on weekdays, and Y hours on weekends. A user can be at work Monday through Friday for regular hours. User device 102x can leverage these patterns to determine that a significant location as "home" where (1) user device 102x spends more than a first threshold number of hours (e.g., 60 hours) per week; (2) user device 102x records most entries and exits; and (3) those entries and exists indicate that user device stays at least a second threshold number of hours (e.g., eight hours) per day.

For example, user device 102x can determine that each location cluster associated with significant location 304x corresponds to a time period designated as evening during weekdays (e.g., from 7:00 pm to 8:00 am next day). User device 102x can then designate significant location 304x as "home" and provide the designation as a label for significant location 304x.

User device 102x can determine transitions from one significant location to another. For example, user device 102x can determine that, on a given weekday, user device 102x transitions (312x) from significant location 304x ("Home") to significant location 308x ("Work") between time T2 and time T3. User device 102x can associate the transition with a transition begin timestamp (e.g., T2) and a transition end timestamp (e.g., T3). User device 102x can construct state model 104x based on significant locations 304x, 306x, and 308x and transitions 312x, 314x, and 316x. Details of state model 104x are described below in reference to FIG. 4X.

Figure 4X:
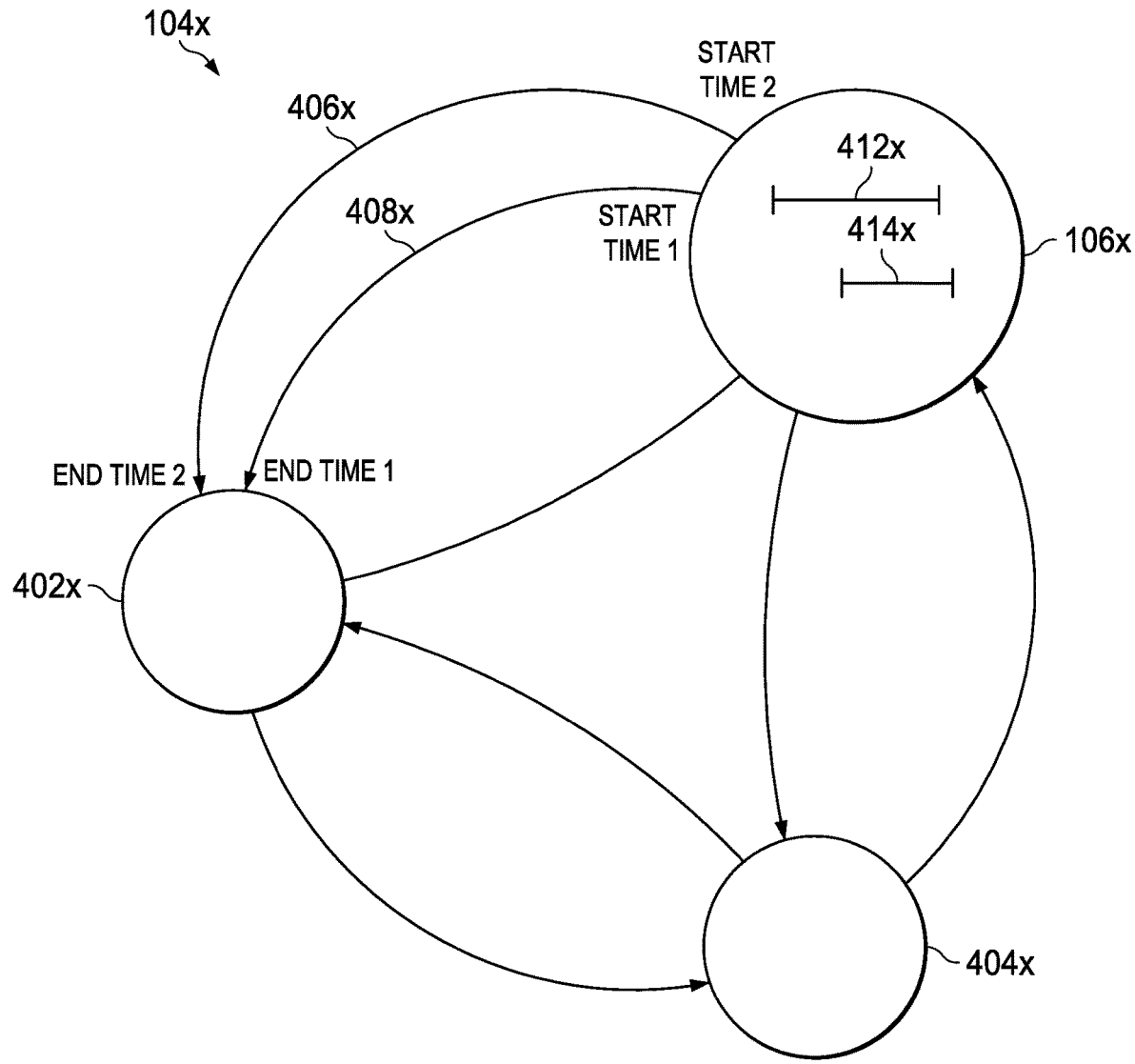
FIG. 4X is a diagram illustrating an exemplary state model determined based on the location clusters.

FIG. 4X is a diagram illustrating exemplary state model 104x determined based on the location clusters. State model 104x can be an $n^{th}$ order autoregressive process (e.g., first order autoregressive process) depicting states and state transitions where a transition into a state q is conditioned by a previous state r. Accordingly, state model 104x can capture an entire history of states and transitions before a given state. The state and state transitions can be an abstraction of movement of user device 102x among significant locations. Compared to a conventional Gauss-Markov model, state model 104x can be a sufficient model, retaining stochastic properties of the state transitions using distribution function in time and duration.

State model 104x can include states 106x, 402x, and 404x. States 106x, 402x, and 404x can correspond to significant locations 304x, 308x, and 306x, respectively. User device 102x can determine significant locations 304x, 308x, and 306x based on location clusters 218x, 220x, 302x, and 303x, as described above in reference to FIG. 3X. Each of states 106x, 402x, and 404x can be a representation of significant locations 304x, 308x, and 306x, respectively.

State model 104x can include multiple transitions from each state to each other state. The transitions can include, for example, transition 406x from state 106x to state 402x, and transition 408x from state 106x to state 402x. In state model 104x, each transition from state 106x to state 402x can correspond to a transition from a location cluster of significant location 304x to a location cluster of significant location 308x. For example, transition 406x can represent transition 312x from location cluster 218x of significant location 304x to location cluster 220x of significant location 308x. Transition 408x can represent a transition from location cluster 303x of significant location 304x to a next location cluster of significant location 308x.

Each of transitions 406x and 408x can be associated with a transition begin timestamp and a transition end timestamp. Each transition begin timestamp can be a time that user device 102x leaves significant location 304x represented by state 106x. For example, the transition begin timestamp of transition 406x can be Tuesday, 7:00 am; the transition begin timestamp of transition 408x can be Wednesday, 7:00 am. Each transition end timestamp can be a time that user device 102x enters significant location 308x represented by state 402x. For example, the transition end timestamp of transition 406x can be Tuesday, 9:00 am; the transition end timestamp of transition 408x can be Wednesday, 9:00 am.

Each state of state model 104x can be associated with one or more state entry timestamps and one or more state exit timestamps. For example, a first state entry timestamp for state 106x can be a time associated with a first location (location 202x) of user device 102x located in location cluster 218x of significant location 304x. A first state exit timestamp can be a time associated with a last location (location 206x) of user device 102x located in location cluster 218x of significant location 304x. The first state entry timestamp and the first state exit timestamp can define first dwell time 412x of user device 102x staying at state 106x. A second state entry timestamp for state 106x can be a time associated with a first location of user device 102x located in location cluster 303x of significant location 304x. A second state exit timestamp can be a time associated with a last location of user device 102x in location cluster 303x of significant location 304x. The second state entry timestamp and the second state exit timestamp can define second dwell time 414x of user device 102x staying at state 106x.

Figure 5X:
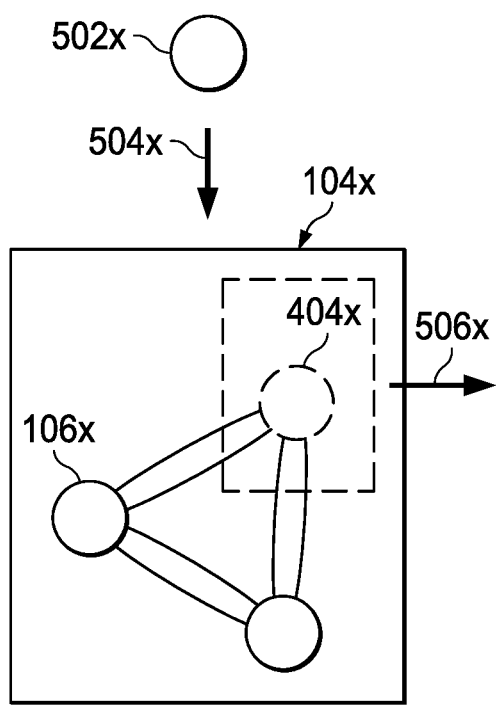
FIG. 5X is a diagram illustrating incremental changes to the state model.

FIG. 5X is a diagram illustrating incremental changes to state model 104x. State model 104x can have a variable topology, allowing incremental addition of new states and deletion of obsolete states.

User device 102x can determine new state 502x. For example, user device 102x can determine that a series of location readings indicate that user device 102x is located at a place for a sufficiently long duration that, with sufficient certainty, that the place is a significant location. User device 102x can determine that the significant location is not represented in state model 104x. In response, user device 102x can create new state 502x, and add (504x) new state 502x to state model 104x. User device 102x can add transitions to state 502x based on a last significant location visited by user device 102x prior to visiting state 502x. User device 102x can associate state 502x with a state entry timestamp of a first location reading indicating user device 102x is located at the significant location of state 502x. User device 102x can associate state 502x with a state exit timestamp of a last location reading indicating user device 102x is at the significant location represented by state 502x before user device 102x enters another significant location. User device 102x can add transitions from state 502x based on the next significant location visited by user device 102x and represented in state model 104x.

In addition to adding states, user device 102x can periodically remove states from state model 104x. User device 102x can determine that, for a sufficiently long time (e.g., exceeding an X day or week threshold), user device 102x has not visited a significant location represented by state 404x. Accordingly, user device 102x can remove (506x) state 404x from state model 104x. Removing state 404x can include removing transitions into state 404x and transitions from state 404x.

User device 102x can use state model 104x to predict a future location of user device 102x. Predicting the future location can be based at least in part on a current location of user device 102x. The current location can be "in state," where the current location is represented by a state of state model 104x. Upon determining that the current location is in state, user device 102x can predict the future location based on transition probability densities between states. The current location can be "out of state," where the current location is not represented by a state of state model 104x. Upon determining that the current location is out of state, user device 102x can predict the future location based on entry probability densities of entering a state of state model 104x from the current location. Details on determining the transition probability densities and entry probability densities are described below in reference to FIGS. 6AX and 6BX.

Figure 6A:
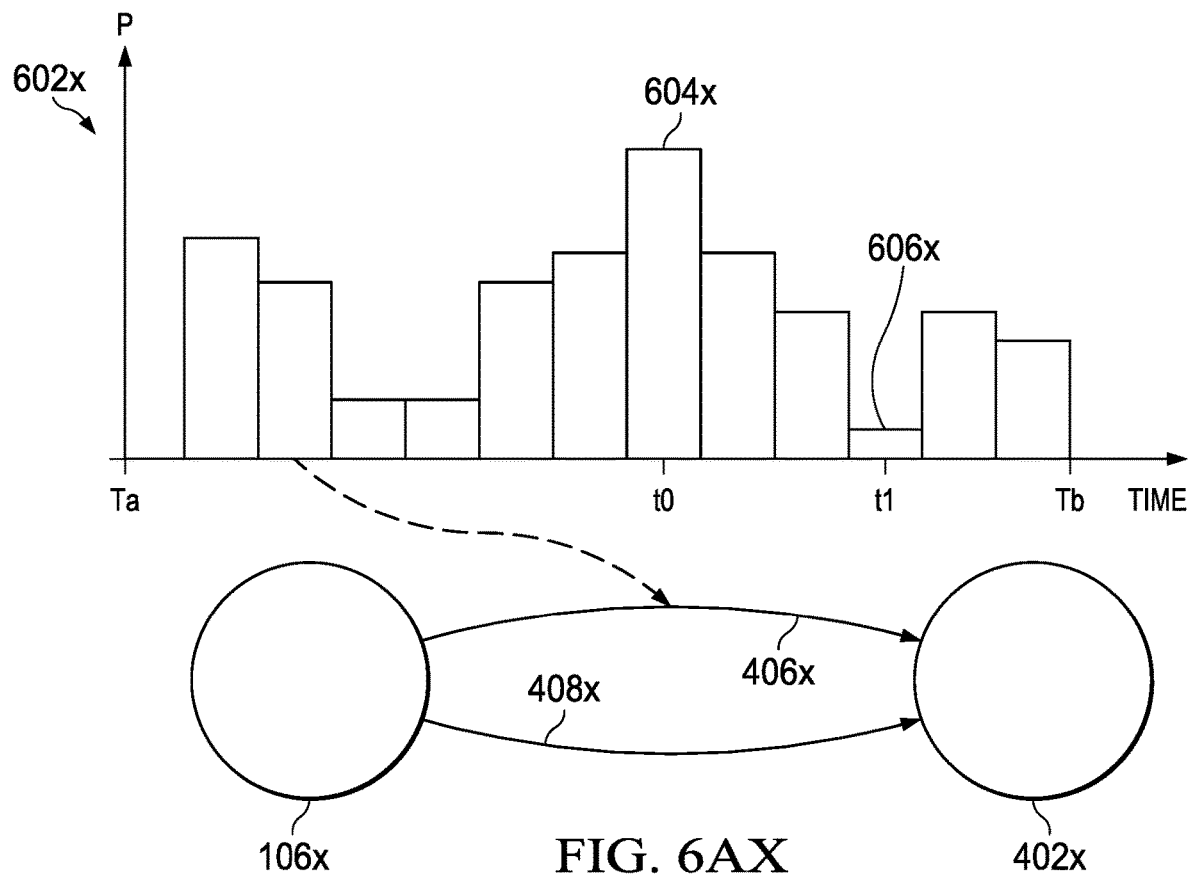
FIG. 6AX is a diagram illustrating determining a transition probability density between exemplary states.

FIG. 6AX is a diagram illustrating determining a transition probability density 602x between exemplary states 106x and 402x. Transition probability density 602x can indicate a probability distribution of user device 102x transitions from state 106x to state 402x of state model 104x. User device 102x can determine transition probability density 602x upon receiving a request to predict a future location of user device 102x. The request can be associated with a current time and a future time. At the current time, user device 102x can be located at a significant location corresponding to state 106x. The future time can be a point in time or a time window.

Transition probability density 602x can be a distribution over a time period, e.g., [Ta, Tb], where Ta is a starting time, and Tb is an ending time of the time period. The time period [Ta, Tb] can be a window of forecast. In some implementations, the starting time Ta can correspond to the current time, or the current time with a bias (e.g., X minutes before or after the current time); the ending time Tb can correspond to the future time, or the future time with a bias (e.g., Y minutes before or after the future time). In some implementations, the starting time Ta and ending time Tb can correspond to a beginning and an ending of a time window (e.g., a day or a week), respectively.

User device 102X can determine transition probability density 602x based on past transitions of user device 102X from state 106x to state 402x. At a given time between Ta and Tb, (1) more transitions from state 106x to state 402x in the past at the given time can correspond to a higher probability density value; (2) more certainty on the transitions in the past at the given time can correspond to a higher probability density value; and (3) a more stable pattern of transitions in the past at the given time can correspond to a higher probability density value.

For example, t0 corresponds to 8:00 am, and t1 corresponds to 3:00 pm. In the past, and as recorded in state model 104x, X number of transitions occurred between state 106x and state 402x between 7:00 am and 9:00 am; and Y number of transitions occurred between 2:00 pm and 4:00 pm. If X is greater than Y, t0 can correspond to comparatively higher probability density value 604x, whereas t1 can correspond to comparatively lower probability density value 606x.

In addition, the certainty of the transitions can be relevant. If a mean time of the transition start timestamps of the X transitions is closer to t0 than a mean time of the transition start timestamps of the Y transition is closer to t1, t0 can correspond to comparatively higher probability density value 604x, whereas t1 can correspond to comparatively lower probability density value 606x. If a variance of the transition start timestamps of the X transitions is smaller than a variance of the transition start timestamps of the Y transitions, t0 can correspond to comparatively higher probability density value 604x, whereas t1 can correspond to comparatively lower probability density value 606x.

In addition, stability of patterns of transitions in the past can be relevant. User device 102x can determine a pattern of movement based on time. For example, user device 102x can determine, based on transitions in state model 104x, that movement of user device 102x follows a weekly pattern. On week days, user device 102x transitions from state 106x to state 402x between 7:00 am and 9:00 am. On weekends, user device 102x transitions from state 106x to state 402x between 2:00 pm and 4:00 pm. Based on this identified weekly pattern, user device 102x can associate a comparatively higher probability density value 604x for time t0 if t0 is in a weekday, or associate a comparatively lower probability density value for time t0 if t0 is in a weekend day.

Transition probability density 602x can be discrete or continuous. Upon determining transition probability density 602x and other transition probability densities between states of state model 104x, user device 102x can determine a time-based likelihood of user device 102x transitioning from a current state (e.g., state 106x) to each other state directly or indirectly (e.g., through one or more intermediate states). User device 102x can determine a predicted future location of user device 102x based on the current location, the future time, and the probabilities of user device 102x transitioning to each state.

Figure 6B:
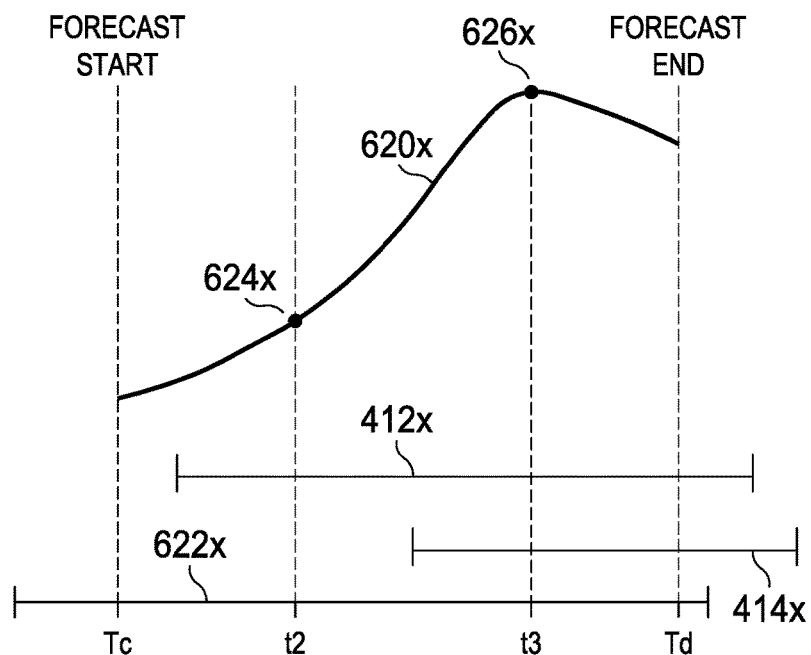
FIG. 6BX is a diagram illustrating determining an entry probability density of an exemplary state.

FIG. 6BX is diagram illustrating determining entry probability density 620x of exemplary state 106x. Entry probability density 620x can indicate a probability distribution that user device 102x enters state 106x from a current location that is not represented in state model 104x. User device 102x can determine entry probability density 620x upon receiving a request to predict a future location of user device 102x. The request can be associated with a current time and a future time. At the current time, user device 102x can be located at the un-represented current location. The future time can be a point in time or a time window.

Entry probability density 620x can be a distribution over a time period, e.g., [Tc, Td], where Tc is a starting time, and Td is an ending time of the time period. The time period [Tc, Td] can be a window of forecast. In some implementations, the starting time Tc can correspond to the current time, or the current time with a bias (e.g., X minutes before or after the current time); the ending time Td can correspond to the future time, or the future time with a bias (e.g., Y minutes before or after the future time). In some implementations, the starting time Tc and ending time Td can correspond to a beginning and ending of a time window (e.g., a day or a week), respectively.

User device 102x can determine entry probability density 620x based on dwell time of user device 102x in state 106x. The dwell time, e.g., dwell time 412x, 414x, and 622x, can be determined as described above in reference to FIG. 4X.

At a given time between Tc and Td, (1) more number of stays of user device 102x in state 106x in the past at the given time can correspond to a higher probability density value; (2) more certainty on the entry into the state 106x in the past can correspond to a higher probability density value; and (3) a more stable pattern of entry into state 106x in the past can correspond to a higher probability density value.

For example, t2 corresponds to 10:00 am, and t2 corresponds to 3:00 pm. In the past, and as recorded in state model 104x by dwell time 412x, 414x, and 622x, on X number occasions, user device 102x is located in state 106x at time t2; and on Y number occasions, user device 102x is in state 106x at time t3. If X is less than Y (e.g., in this example, X=2, Y=3), t2 can correspond to comparatively lower probability density value 624x, whereas t3 can correspond to comparatively lower probability density value 626x.

Additionally or alternatively, user device 102x can determine, based on state dwelling time determined from state model 104x, that location of user device 102x follows a weekly pattern. For example, user device 102x can determine that dwell time 414x, and a number of other dwell times occur only on weekdays, whereas dwell times 412x and 622x occur only on weekends. Based on this identified weekly pattern, user device 102x can associate lower probability density value 624x to time t2 and higher probability density value 624x to time t3 if time t2 and time t3 fall on a weekday. User device 102x can associate equal probability density values to time t2 and time t3 fall on a weekend day.

Entry probability density 620x can be discrete or continuous. Upon determining entry probability density 620x and other entry probability densities between states of state model 104x, user device can determine a time-based likelihood of user device 102x enters from a current location to each other state directly or indirectly (e.g., through one or more intermediate states). User device 102x can determine a predicated future location of user device 102x based on the current location, the future time, and the probabilities of user device 102x entering each state.

User device 102x can filter out states from state model 104x before, during, or after calculating the entry probability densities based on various factors. Filtering out a state can include preventing the state being used for a particular location prediction without removing the state from state model 104x. The factors for filtering out a state can include a distance between the current location and the location represented by the state in state model 104x. User device 102x can filter out a state upon determining that, during the forecast time window, user device 102x is unlikely to reach from the current location to the location of that state. User device can perform the filtering based on a time difference between the current time and the starting time or the ending time of the time window, and a pre-specified maximum speed of movement of user device 102x.

For example, user device 102x can determine that the time difference between the current time and the closing time Td of the forecasting time window is X hours. User device can determine that a distance between the current location and the significant location represented by state 106x is Y kilometers. Based on a pre-specified maximum speed of Z kilometers per hour, user device 102x can filter out state 106x upon determining that X*Z<Y, indicating that user device 102x cannot reach the location represented by state 106x in X hours, even if traveling at maximum speed.

Exemplary Device Components

FIG. 7AX is a block diagram illustrating components of exemplary user device 102x implementing predictive user assistance. Each component of user device 102x can include hardware and software components.

User device 102x can include state model determination subsystem 702x. State model determination subsystem 702x can be a component of user device 102x programmed to determining a state model (e.g., state model 104x) using location data from location determination subsystem 704x. The location data can include a series of one or more location readings, each being associated with a timestamp. The location readings can include latitude, longitude, and optionally, altitude coordinates.

Location determination subsystem 704x is a component of user device 102x programmed to determine a location of user device 102x using a satellite navigation system (e.g., GPS), a cellular communications system (e.g., by triangulation using cellular towers), or wireless access gateways (e.g., by triangulation using known access point locations).

User device 102x can include one or more services 706x. Services 706x can include functions of an operating system of user device 102x or one or more application programs. Services 706x can request location data from location determination subsystem 704x. The request can activate location determination subsystem 704x.

State model determination subsystem 702x can be configured to read location data provided by location determination subsystem 704x upon activation of location determination subsystem 704x by services 706x. Triggering reading location data by activation of location determination subsystem 704x can avoid or minimize consumption of battery power by operations of determining the state model. Based on the location data, state model determination subsystem 702x can determine a state model and store the state model in state model database 708x. State model database 708x can include a storage device on user device 102x or on a server located remotely from user device 102x.

User device 102x can include forecasting subsystem 710x. Forecasting subsystem 710x is a component of user device 102x configured to determine a predicted future location of user device 102x based on the state model stored in state model database 708x. One or more services 712x or other devices 714x can request a forecast from forecasting subsystem 710x. The request can be associated with a future time point or time window. In response, forecasting subsystem 710x can provide one or more predicted future locations corresponding to the future time or time window.

FIG. 7BX is a block diagram illustrating components of exemplary state model determination subsystem 702x of FIG. 7AX. Each component of state model determination subsystem 702x can include hardware and software components.

State model determination subsystem 702x can include location listener 720x. Location listener 720x is a component of state model determination subsystem 702x configured to read location data from location determination subsystem 704x upon being triggered by an activation of location determination subsystem 704x. In some implementations, location listener 720x can be programmed to activate location determination subsystem 704x periodically to obtain the location data.

Location listener 720x can store the location data received from location determination subsystem 704x to raw location data store 722x. Raw location data store 722x can be a storage device of user device 102x programmed to store raw location data as read from location determination subsystem 704x. Raw location data store 722x can enforce a persistency policy where the raw location data are purged after a specified persistency period based on user request or privacy policy.

State model determination subsystem 702x can include abstraction engine 724x. Abstraction engine 724x is a component of state model determination subsystem 702x configured to access the location data stored in raw location data store 722x. Based on the location data, abstraction engine 724x can determine location clusters based on one or more pre-specified conditions. The conditions can include a minimum number of locations for establishing a significant location (e.g., two), a threshold time window (e.g., minimum of X minutes), and outlier criteria. Abstraction engine 724x can determine the significant locations by generating abstractions of the location clusters. Abstraction engine 724x can store the significant locations in location data store 726x.

Location data store 726x is a storage device of state model determination subsystem 702x configured to store significant locations determined by abstraction engine 724x. Location data store 726x can enforce a persistency policy where the significant locations are purged after a specified persistency period. The persistence policy for location data store 726x can be different from the persistence policy for raw location data store 722x.

State model determination subsystem 702x can include state model construction engine 728x. State model construction engine 728x is a component of state model determination subsystem 702x configured to read the significant locations from location data store 726x, and generate state model 104x. In addition, state model construction engine 728x can be configured to maintain state model 104x by adding and removing states to state model 104x.

Figure 7C:
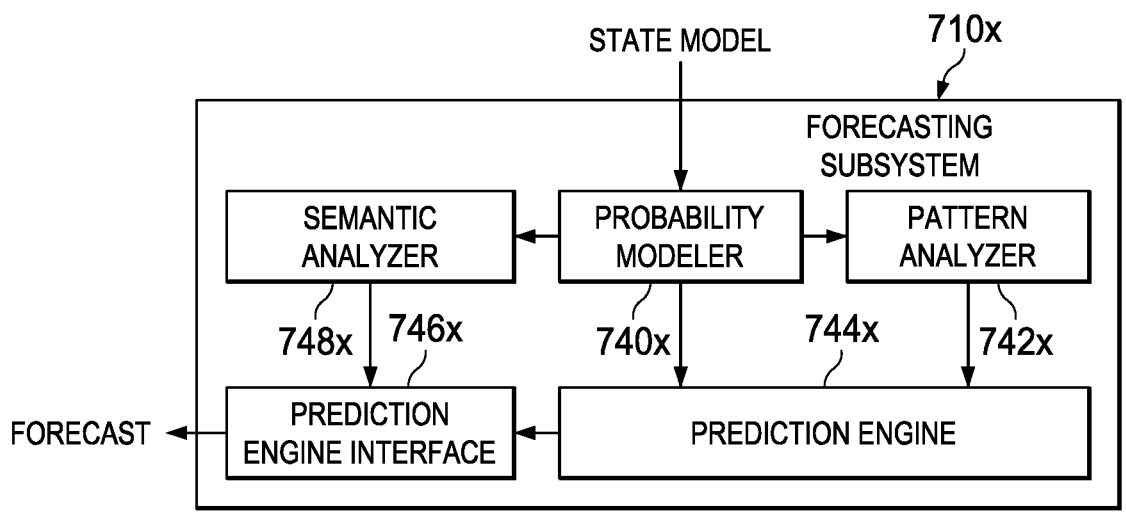

FIG. 7CX is a block diagram illustrating components of exemplary forecasting subsystem 710x of FIG. 7AX. Each component of forecasting subsystem 710x can include hardware and software components.

Forecasting subsystem 710x can include probability modeler 740x. Probability modeler 740x is a component of forecasting subsystem 710x configured to determine probability densities (e.g., transition probability density 602x and entry probability density 620x) based on states and transitions of a state model (e.g., state model 104x). Probability modeler 740x can determine the probability densities for transitions and entries over a time window.

Forecasting subsystem 710x can include pattern analyzer 742x. Pattern analyzer 742x is a component of forecasting subsystem 710x configured to determine a pattern of movement of user device 102x over a time period. The time period can be a day, a week, a month, or a year. Pattern analyzer 742x can determine whether to determine a pattern based on a day, a week, a month, or a year based on a longevity of state model 104x. For example, pattern analyzer 742x can determine whether state model 104x has satisfied a longevity threshold (e.g., contains at least X weeks of data).

Upon determining that state model 104x satisfies the threshold, pattern analyzer 742x can determine a weekly pattern. The weekly pattern can include a probability distribution calculated for each day of week, where, for example, a probability distribution for Monday is determined separately from a probability distribution for Sunday. Upon determining that state model 104x does not satisfy the threshold, pattern analyzer 742x can determine a daily pattern. The daily pattern can include a probability distribution calculated for each hour of day, where, for example, a probability distribution for 9:00 am to 10:00 am is determined separately from a probability distribution for 5:00 pm to 6:00 pm.

In some implementations, pattern analyzer 742x can determine a daily pattern upon determining that user device 102x has moved to a new place. For example, pattern analyzer 742x can determine that, the distances between each of the last X number of new states and each state older than the last X number of new states exceed a local threshold (e.g., Y kilometers), indicating that user device 102x has recently traveled to a new location (e.g., to a vacation place). Upon the determination, pattern analyzer 742x can determine the daily pattern, starting from the last X number of states.

Forecasting subsystem 710x can include prediction engine 744x. Prediction engine 744x is a component of forecasting subsystem 710x configured to receive a current time and a current location and determine a forecast location. Prediction engine 744x can determine a predicted location of user device 102x based on the probability densities for transitions and entries provided by probability modeler 740x and the movement patterns provided from pattern analyzer 742x. Prediction engine 744x can identify multiple candidate future locations based on the probability densities and the movement patterns. Prediction engine 744x can then rank the candidate future locations using various attributes.

The attributes used by prediction engine 744x to rank the candidate future locations can include a last visit to a candidate future location as represented by a state, where a more recent visit can be associated with a higher ranking. The attributes can include a data longevity of the state associated with the candidate location, where a state having a longer data history can be associated with a higher ranking. The attribute can include a likelihood associated with a forecast time window, which is determined based on a current location, a future time of the forecast time window, and a length of the forecast time window. The attributes can include an aggregated dwell time, where a state having longer aggregated dwell time can be ranked higher. The attributes can include a number of visits to the state of the candidate location, where more visits or a higher frequency of visits to the state can be ranked higher. Prediction engine 744x can provide one or more candidate future locations, including the highest ranked candidate future location, to prediction engine interface 746x as a forecast.

Prediction engine interface 746x can be a component of user device 102x configured to implement an application programming interface (API) to prediction engine 744x such that an application program, function, or device complying with the API can access the forecast determined by prediction engine 744x. In some implementations, prediction engine interface 746x can include an interface to other devices 714x, e.g., external display screens or GPS devices, and provide the forecast location to other devices 714x.

Forecasting subsystem 710x can include semantic analyzer 748x. Semantic analyzer 748x is a component of forecasting subsystem 710x configured to determine a meaning of each significant location based on pattern of visit to the significant location. Semantic analyzer 748x can generate labels (e.g., "work" or "home") based on the meaning and provide the labels to prediction engine interface 746x to be associated with the forecast.

Exemplary Procedures for Determining and Servicing Transit Routine

Figure 8:
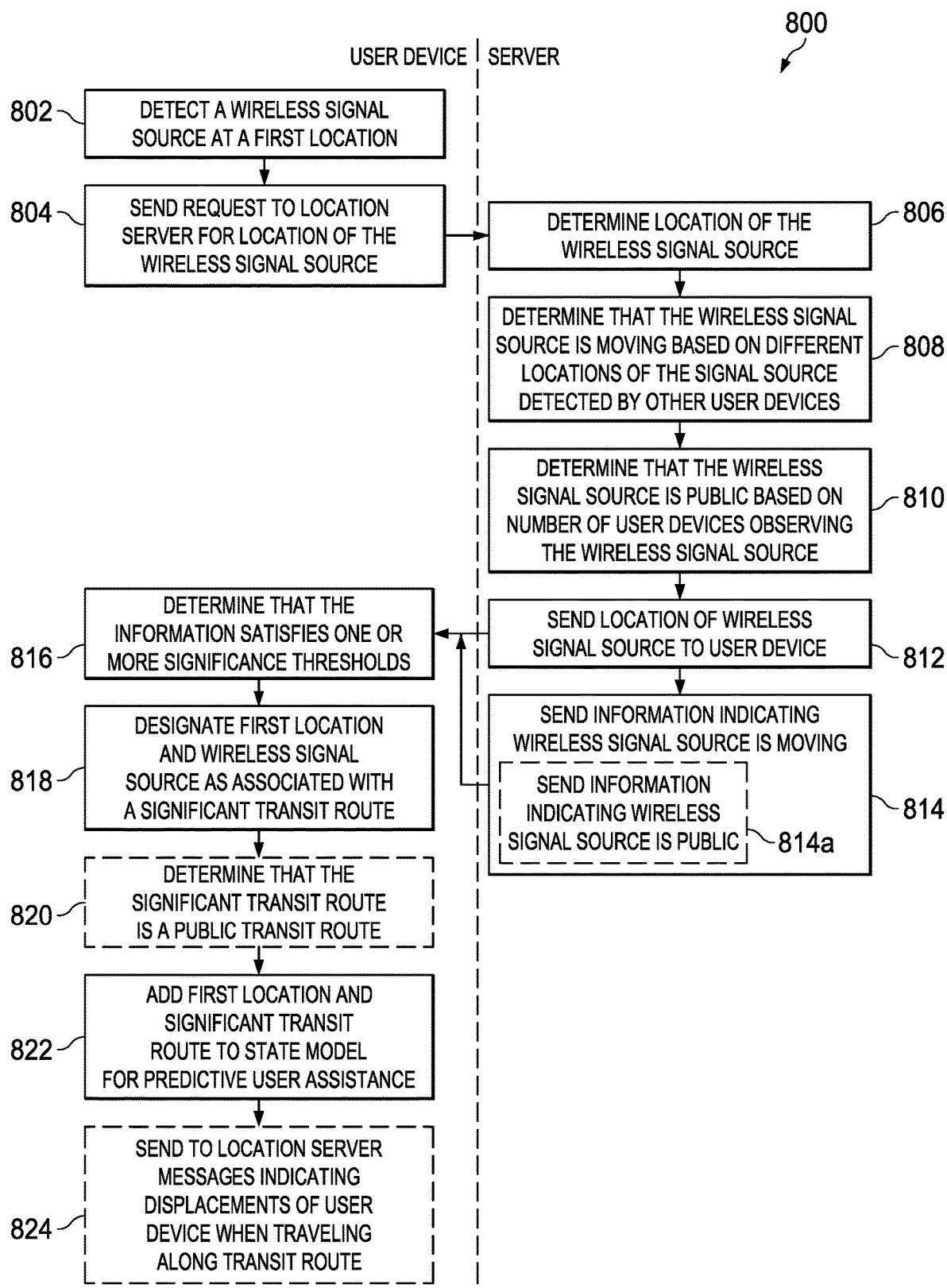
FIG. 8 is a flowchart illustrating an exemplary process for determining transit routine of users.

FIG. 8 is a flowchart illustrating an exemplary process 800 for determining transit routine of users. The process 800 may be used for correlating significant locations of a user to a transit route traveled by the user based on associating a moving wireless signal source with the significant locations and the transit route. For example, the process 800 may be executed by the user device 732 working in conjunction with the location server 710. Accordingly, the following section describes the process 800 as being performed by components of the system 700. However, the process 800 may be performed by other systems or system configurations.

The user device 732, or the location server 710, or both, may use one or more processors included in the respective devices to execute instructions stored in memory coupled to the respective devices to implement the process 800.

At 802, the user device detects a wireless signal source at a first location. For example, the user 732a may board the transit vehicle 720 at location A. At that time, the user device 732 may detect signals from the wireless signal source 722 at location A.

The user device sends a request to a location server for location of the wireless signal source at 804. For example, the user device 732 may send a location query message to the location server requesting information about the location of wireless signal source 722 that is detected by the device. The location query message may include identifying information, e.g., the MAC address of the wireless signal source 722.

At 806, the location server determines the location of the wireless signal source. For example, upon receiving the location query from the user device 732, the location server 710 determines the instant location of the wireless signal source 722. The location server 710 may make the determination based on messages received from other user devices that include information about the wireless signal source 722. The messages received from other user devices may include location queries, wireless signal information harvests, movement traces, or any suitable combination of all these.

At 808, the location server determines that the wireless signal source is moving based on different locations of the signal source detected by other user devices. For example, based on messages that are received from the user devices, the location server 710 may compute different locations of the wireless signal source 722 at different times. Accordingly, the location server may determine that the wireless signal source 722 is moving.

At 810, the location server determines that the wireless signal source is public based on the number of user devices observing the wireless signal source. For example, the location server 710 may determine that the number of user devices reporting the identifying information about the wireless signal source 722 in messages they sent to the location server satisfy a predetermined threshold. Based on this determination, the location server 710 may determine that the wireless signal source 722 is a public wireless signal source. In some implementations, in making this determination, the location server 710 may check how many of the user devices reporting the wireless signal source 722 establish connections with the wireless signal source 722; and whether the user devices that establish connections with the wireless signal source 722 satisfy the predetermined threshold.

The location server sends the location of the wireless signal source to the user device at 812. For example, the location server 710 sends a location response message to the user device 732 that includes the computed location, e.g., in <latitude, longitude> coordinates, of the wireless signal source 722.

At 814, the location server sends information to the user device indicating that the wireless signal source is moving. For example, when sending the location response message to the user device 732 with the computed location of the wireless signal source 722, the location server 710 includes with the message information indicating that the wireless signal source 722 is moving. In some implementations, the location server 710 may send the information indicating that the wireless signal source 722 is moving separately from the location of the wireless signal source 722.

In some implementations, the location server may send, at 814a, information to the user device indicating that the wireless signal source is public. The location server may send this information along with the information indicating that the wireless signal source is moving. For example, the location server 710 may send to the user device 732 the information indicating that the wireless signal source 722 is moving and public. The location server 710 may send this information as part of the location response message. However, in other implementations, the location server may not send information to the user device indicating that the wireless signal source is public.

At 816, the user device determines that the information satisfies one or more significance thresholds. For example, the user device 732 may determine that signals from the wireless signal source 722 are detected a number of times at locations A, B, or at intermediate points between A and B, that satisfies a predetermined number. Additionally or alternatively, the user device 732 may determine that signals from the wireless signal source 722 are detected frequently at specific times at locations A, B, or at intermediate points between A and B, where the frequency of detection at the specific times satisfies a predetermined value. Based on these determinations, the user device 732 may infer that the device user 732a follows a regular pattern or routine at locations A, B, or at intermediate points between A and B, and at the specific times.

At 818, the user device designates the first location and the wireless signal source as associated with a significant transit route. For example, upon receiving the information from the location server 710 indicating the wireless signal source 722 is moving, the user device 732 may determine that the regular pattern at and between locations A and B associated with the wireless signal source 722 corresponds to a regular transit route taken by the user 732a between locations A and B. Based on this determination, the user device 732 may designate location A, or B, or both, and the wireless signal source 722 as associated with a significant transit route of the device user 732a. The user device 732 also may designate the location A, or B, or both, as significant locations for the device user 732a, and the specific times at these locations as associated significant times.

In some implementations, the user device may determine at 820 that the significant transit route is a public transit route. For example, the user device 732 may observe behavioral patterns of the device user 732a while on the significant transit route between locations A and B and determine that the user 732a is traveling as a passenger on the significant transit route. Accordingly, the user device 732 may infer that the significant transit route is a public transit route. Additionally or alternatively, the user device 732 may receive, e.g., at 814a, information from the location server 710 indicating that the wireless signal source 722 is public. However, in other implementations, the user device may not determine at 820 that the significant transit route is a public transit route.

At 822, the user device adds the first location and the significant transit route to a state model for predictive user assistance. For example, the user device 732 may add the location A, or B, or both, as states in a state model executed by the user device. The user device 732 may add the significant transit route associated with the wireless signal source 722 as state transition between the states corresponding to A and B. The user device also may add the specific times at which the device user uses the significant transit route at location A, or B, or both, to the states in the state model.

Following the process 800 as described above, a user device establishes a transit route for the device user. The user device maintains a list of significant locations and times associated with the transit routine. The user device also maintains a list of significant wireless signal sources associated with the transit routine.

In some implementations, at 824, the user device may send to the location server messages indicating displacements of the user device when traveling along the transit route. For example, when the user device 732 is traveling in the transit vehicle 720 between locations A and B, the device 732 may send realtime movement traces to the location server 710 that identifies the transit vehicle 720, e.g., by including the identifying information about the wireless signal source 722 in the movement traces. In this manner, the user device can provide information to the location server that helps the location server to determine the realtime path of a transit vehicle along a transit route, and thereby provide greater accuracy in servicing location and ETA queries for other user devices. However, in other implementations, the user device may not send to the location server messages indicating displacements of the user device when traveling along the transit route, as described at 824.

Figure 9X:
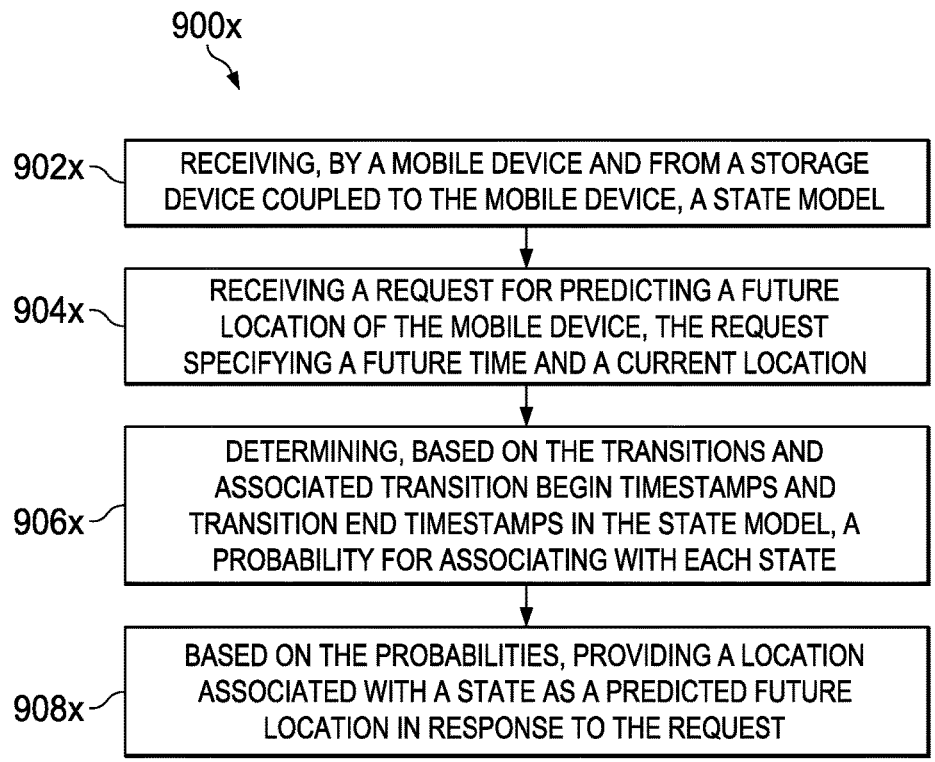
FIG. 9X is a flowchart illustrating an exemplary procedure of predicting a future location.
Figure 9:
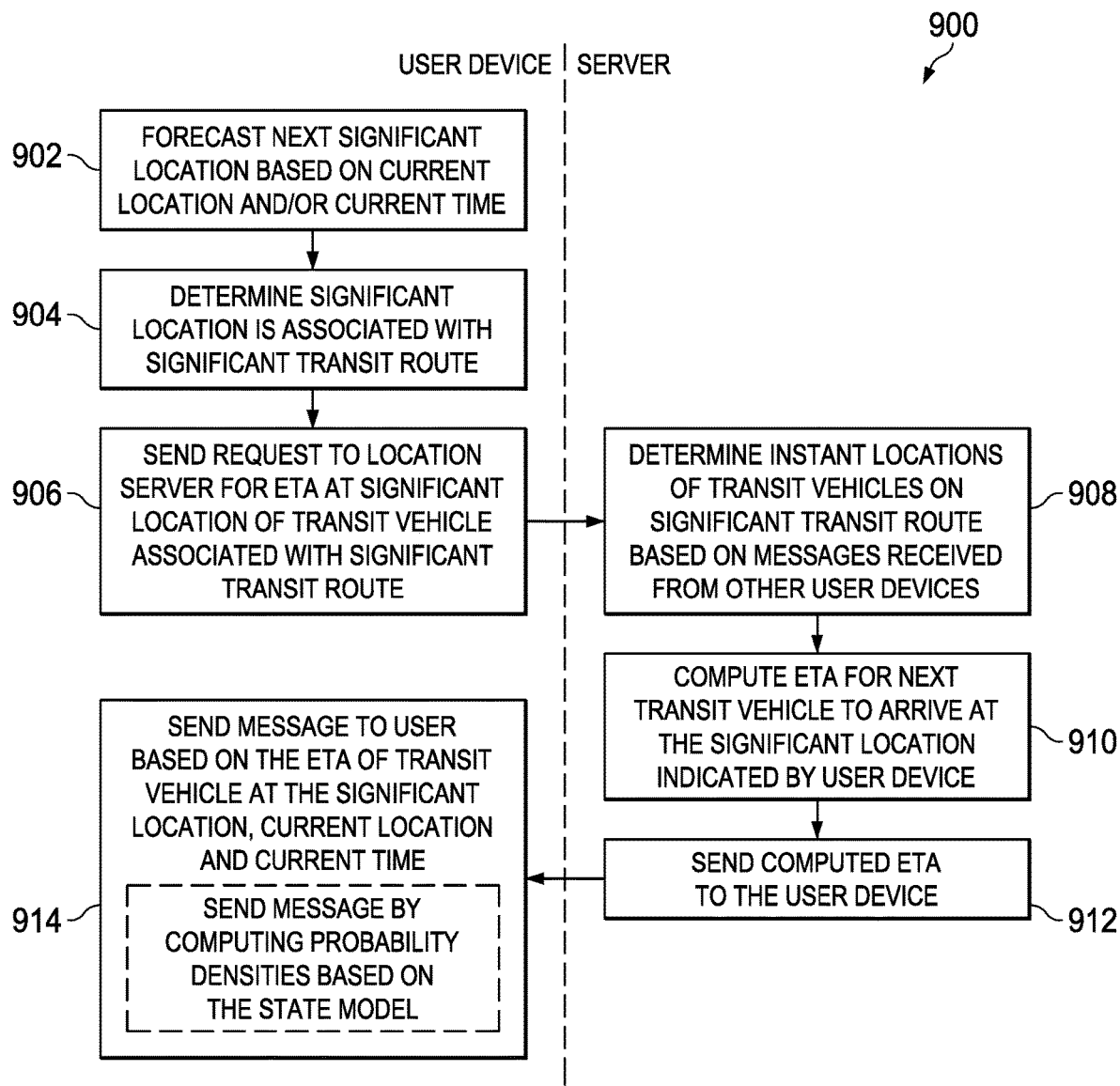
FIG. 9 is a flowchart illustrating an exemplary process for providing significant transit information to a user.

FIG. 9 is a flowchart illustrating an exemplary process 900 for providing significant transit information to a user. The process 900 may be used for determining the next significant location of a user on a significant transit route traveled by the user based on the user's current location and time, and providing an ETA of a transit vehicle at the significant location. For example, the process 900 may be executed by the user device 732 working in conjunction with the location server 710. Accordingly, the following section describes the process 900 as being performed by components of the system 700. However, the process 900 may be performed by other systems or system configurations.

The user device 732, or the location server 710, or both, may use one or more processors included in the respective devices to execute instructions stored in memory coupled to the respective devices to implement the process 900. In some implementations, the process 900 may be used for providing significant transit information to a user following use of the process 800 for learning significant transit routes for the user.

At 902, the user device forecasts the next significant location based on the current location and/or the current time. For example, the device user 732a may be at her residence at location R at approximately 7:45 am. The user device 732 may execute a state model that is used by a forecasting subsystem of the device to determine, based on the current location R and the current time of 7:45 am, that the next state for the user 732a corresponds to significant location A. The forecasting subsystem also may determine that the user 732a is expected to be at significant location A at time of approximately 8:00 am.

At 904, the user device determines that the significant location is associated with a significant transit route. For example, the user device 732 may look up cached information about significant transit routes for device user 732a and determine that the next state at significant location A, or at significant time 8:00 am, or both, corresponds to the significant transit route associated with the wireless signal source 722.

At 906, the user device sends a request to a location server for ETA at the significant location of a transit vehicle associated with the significant transit route. For example, the user device 732 may send a transit ETA query message to the location server 710, inquiring about the time the transit vehicle associated with the wireless signal source 722 will arrive at the location A.

At 908, the location server determines instant locations of transit vehicles on a significant transit route based on messages received from other user devices. For example, upon receiving the request from the user device 732, the location server 710 may identify the transit route corresponding to the wireless signal source 722. Then the location server 710 may determine instant locations of transit vehicles on the identified transit route, e.g., transit vehicle 720, based on messages received at the server from other user devices that detect the wireless signal source 722.

The location server computes the ETA for the next transit vehicle to arrive at the significant location indicated by the user device at 910. For example, the location server 710 may determine that the transit vehicle 720 would be the next transit vehicle on the significant transit route associated with wireless signal source 722 that would arrive at the location A. Then the location server 710 may compute the ETA of the vehicle 720 at location A using, for example, the instant computed location of the transit vehicle 720 based on the messages received from other user devices, including movement traces obtained from the other user devices, and optionally, historical arrival/departure data of the transit vehicle 720.

At 912, the location server sends the computed ETA to the user device. For example, upon computing the ETA of the transit vehicle 720 at location A, the location server 710 may send a transit ETA response to the user device 732 with the ETA information.

At 914, the user device sends a message to the user based on the ETA of the transit vehicle at the significant location, current location and current time. For example, the user device 732 may send an alert message to the device user 732a based on determining that the current location, or current time, or both, is close to the significant time when the user is predicted to be at the significant location A, or B. Accordingly, the user device 732 may send the alert, informing the user 732a that the next transit vehicle on the significant transit route of the user 732a will arrive at the significant location A at the ETA time received from the location server 710.

In some implementations, the user device may send the message by computing probability densities based on the state model. For example, the user device 732 may execute the state model to determine the probability that the device user 732a will be at the significant location A, or B, based on the current location, or the current time, or both. If the probability is higher than a certain threshold, then the user device 732 may send the alert message to the device user 732a. However, in other implementations, the user device may not use probability densities based on the state model to send the message to the user.

In the manner described above, a user device may combine significant transit routes of the device user that are learned via a location server through crowd-sourced information, and predictive user assistance, to proactively provide service to the device user for the user's significant transit routes.

Exemplary Procedures for Predictive User Assistance

Figure 8X:
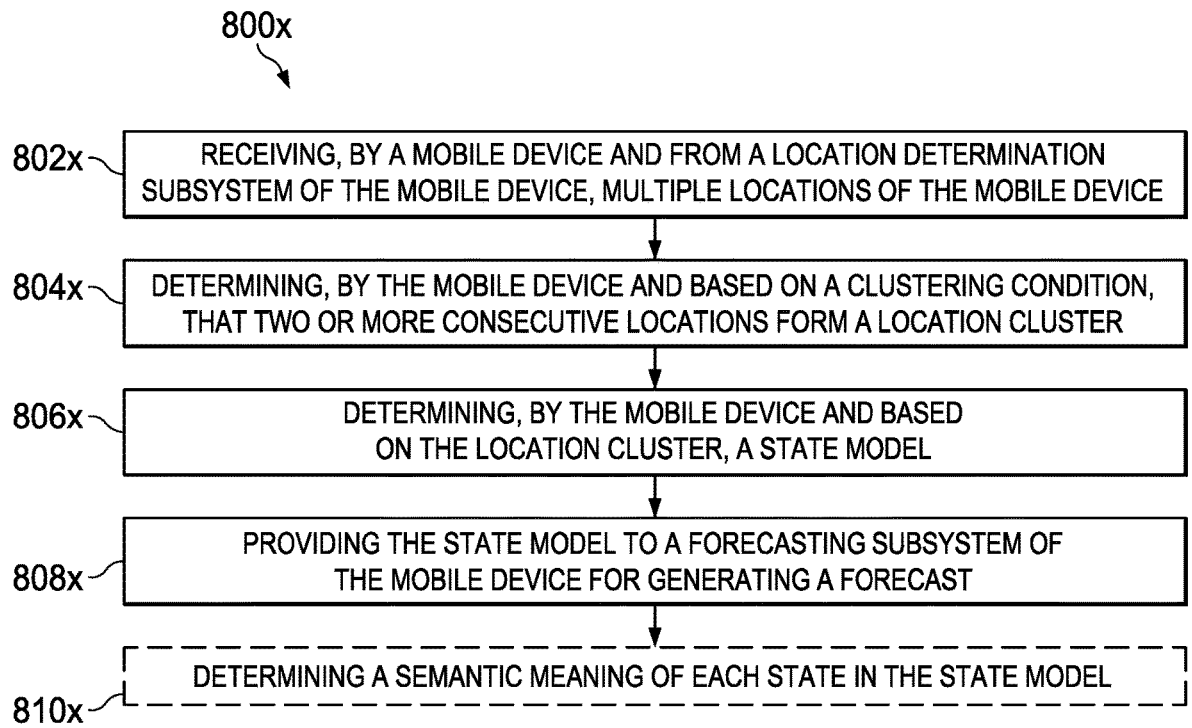
FIG. 8X is a flowchart illustrating an exemplary procedure of generating a state model.

FIG. 8X is a flowchart illustrating exemplary procedure 800x of generating a state model 104x. Procedure 800x can be performed by user device 102x.

User device 102x can receive (802x), from location determination subsystem 704x of user device 102x, multiple locations of user device 102x. Each location can be associated with a timestamp indicating a time the location was determined by location determination subsystem 704x. The locations can be ordered sequentially based on timestamps of the locations. Receiving the locations can include reading the location from location determination subsystem 704x one at a time. Each reading of location determination subsystem 704x can be triggered by an activation of location determination subsystem 704x by an application program or function external to a location forecasting application program or function.

User device 102x can determine (804x), based on a clustering condition, that two or more consecutive locations in the ordered locations form a location cluster. The location cluster can indicate that user device 102x has stayed at a geographic location that is sufficiently significant to be represented in a state model for forecasting a movement of user device 102x. The clustering condition can specify that, to be designated as a location cluster, the consecutive locations are identical, or a distance between each pair of the consecutive locations is less than a spatial proximity threshold. In addition, the clustering condition can specify that, to be designated as a location cluster, a time difference between a timestamp associated with a first location among the consecutive locations and a timestamp associated with a last location among the consecutive locations is greater than a temporal proximity threshold (e.g., X minutes). The geographic location can be designated as a significant location, which is a location where user device 102x has stayed for a time period at least as long as indicated by the temporal proximity threshold.

In some implementations, determining the location cluster can include validating each of the two or more consecutive locations based on an uncertainty value associated with each respective location. The uncertainty value can indicate a likelihood that the respective location is determined correctly by location determination subsystem 704x. User device 102x can exclude one or more outliers from the consecutive locations. Each outlier can be a location associated with an uncertainty value that exceeds a threshold. User device 102x can then determine the location cluster using the validated locations that are not outliers.

In some implementations, a significant location can correspond to multiple location clusters (e.g., a first location cluster on Monday and a second location cluster on Tuesday). Each location cluster may include locations that are different from one another. User device 102x can determine the significant location based on one or more location clusters corresponding to the significant location by applying a recursive filter having a constant gain to locations in each location cluster.

User device 102x can determine (806x), based on the location cluster, the state model (e.g., state model 104x). User device 102x can designate the significant location as a state in the state model. User device 102x can represent each movement of user device 102x from a first significant location to a second significant location as a transition from a first state representing the first significant location to a second state representing the second significant location. The transition can be associated with a transition start time and a transition end time. Each state can be associated with one or more state entry timestamps and one or more state exit timestamps.

Determining the state model can include adding a state or adjusting a state. Upon determining that a location cluster is not already designated as a state in the state model, user device 102x can add the location cluster to the state model as a new state. Upon determining that the location cluster is already represented as a state in the state model, user device 102x can adjust the state, including adding a transition to or from the state, or adding a new state entry time and state exit time to the state.

User device 102x can provide (808x) the state model to forecasting subsystem 710x of user device 102x for generating a forecast. The forecast can include a prediction that a future location of user device 102x, at a given future time, is one of the significant locations represented in the state model. Forecasting subsystem 710x can generate the forecast based on a current time, the future time, a current location, and a probability density determined based on the states and transitions of the state model.

In some implementations, user device 102x can determine (810x) a semantic meaning of each state of the state model. User device 102x can determine that at least one attribute of the state model satisfies a statistical threshold, and then determine a semantic meaning of the state and a semantic meaning of the transition. The statistical threshold can include a longevity of the state. Determining the semantic meaning of the state comprises determining whether the state relates to an activity pattern of life (e.g., a pattern of a person going to work or going home). Determining the semantic meaning of the transition can be based on an attribute of a commute between two activities of life.

For example, user device 102x can determine that during weekday mornings, user device 102x usually travels from significant location A to significant location B; that during weekday evenings, user device 102x usually travels from significant location B to significant location A; and that during weekends, user device 102x is sometimes located at location A, but never located at location B. Upon the determination, user device 102x can designate location A as "home" and location B as "work" and provide the designations as labels of predicted locations to an application program requesting a forecast.

In some implementations, user device 102x can adjust states in the state model over time using an autoregressive filter. Adjusting the states includes removing a stale state from the state model upon determining that the user device has not visited a significant location represented by the stale state model for a given period of time.

FIG. 9X is a flowchart illustrating exemplary procedure 900x of predicting a future location. Procedure 900x can be performed by user device 102x, for example, using forecasting subsystem 710x of user device 102x.

User device 102x can receive (902x), from a storage device (e.g., state model database 708x) coupled to user device 102x, a state model. The state model can include multiple states and transitions between the states. Each state can correspond to a location. Each transition from a first state to a second state can indicate that, in the past, user device 102x moved from a corresponding first location to a corresponding second location. Each location and transition can be associated with one or more timestamps.

User device 102x can receive (904x), from an application program or a device, a request for predicting a future location of user device 102x. The request can specify a future time and, optionally, a current location of user device 102x. The future time can include a point in time in the future or a time window in the future.

User device 102x can determine (906x), using a current time, the future time, and a current location of the user device as inputs, a probability for associating with each state in the state model. If the request does not include the current location, user device 102x can determine the current location using location determination subsystem 704x. User device 102x can determine the probabilities based on the states, transitions, and associating timestamps. The probabilities can indicate a likelihood that user device 102x will be located at each respective location corresponding to a state at the future time.

Determining (906x) the probability for associating with each state can include determining that the current location is in state, where the current location is represented as a state in the state model. Determining the probability for each state can include determining a transition probability density of user device 102x moving from the state representing current location to a location corresponding to the state in one or more transitions. The transition probability density can satisfy properties of a Markov process. Determining the transition probability density can be based on the transitions between states and a transition begin timestamp and a transition end timestamp associated with each of the transitions.

Determining (906x) the probability for associating with each state can include determining that the current location is out of state, where the current location is not represented as a state in the state model. Determining the probability to be associated with each state can include determining an entry probability density of user device 102x entering a location corresponding to each state from the out-of-state current location. Determining the entry probability density can be based on a dwell time user device 102x is in each state. User device 102x can determine the dwell time based on one or more entry timestamps and one or more exit timestamps associated with the respective state.

In some implementations, determining (906x) the probability for associating with each state can be based on a daily, weekly, monthly, or annual pattern. User device 102x can determine whether the state model satisfies a longevity threshold (e.g., X weeks). User device 102x can determine a first activity pattern upon determining that the state model satisfies the longevity threshold. The first activity pattern can correspond to a first time span (e.g., a week). Alternatively, user device 102x can determine a second activity pattern upon determining that the state model does not satisfy the longevity threshold. The second activity pattern can correspond to a second time span (e.g., a day). The first time span can be longer than the second time span. User device 102x can determine the probability based on the current time, the future time, and the first activity pattern or second activity pattern. User device 102x can then determine the probability for associating with each state based on the current time, the future time, and the first activity pattern or second activity pattern.

In some implementations, user device 102x can filter the states in the state model based on a distance between the current location and each location represented in the state model and a difference between the current time and the future time. User device 102x can filter out the states that, given the difference in time, and given a moving speed of user device 102x, a likelihood that user device 102x reaches the state from the current location falls below a threshold value.

Based on the probabilities, user device 102x can provide (908x) at least one location associated with a state as a predicted future location of user device 102x in response to the request. In some implementations, providing the location as the predicted future location can include identifying a state associated with a highest probability, and designating the location associated with the state associated with the highest probability as the predicted future location. In some implementations, providing the location as the predicted future location can include ranking the states based on the probabilities and one or more forecast attributes, and designating the location associated with a highest rank as the predicted future location.

The forecast attributes can include a time of last visit to each corresponding location. The forecast attributes can include a derived likelihood for a forecast window based on the current location, the current time, and a forecast window length. The forecast attributes can include a temporal length of the state model. The forecast attributes can include an aggregated dwell time at each state. The forecast attributes can include a number of visits at each state.

In some implementations, user device 102x can determine that a data density of the state model satisfies a sparse model threshold. In response, user device 102x can determine the probability for associating with each state in a sparse operating mode. In the sparse operating mode, probability density calculations and rankings can be performed in a less stringent matter than the calculations and rankings in normal operating mode.

Exemplary Mobile Device Architecture

Figure 10:
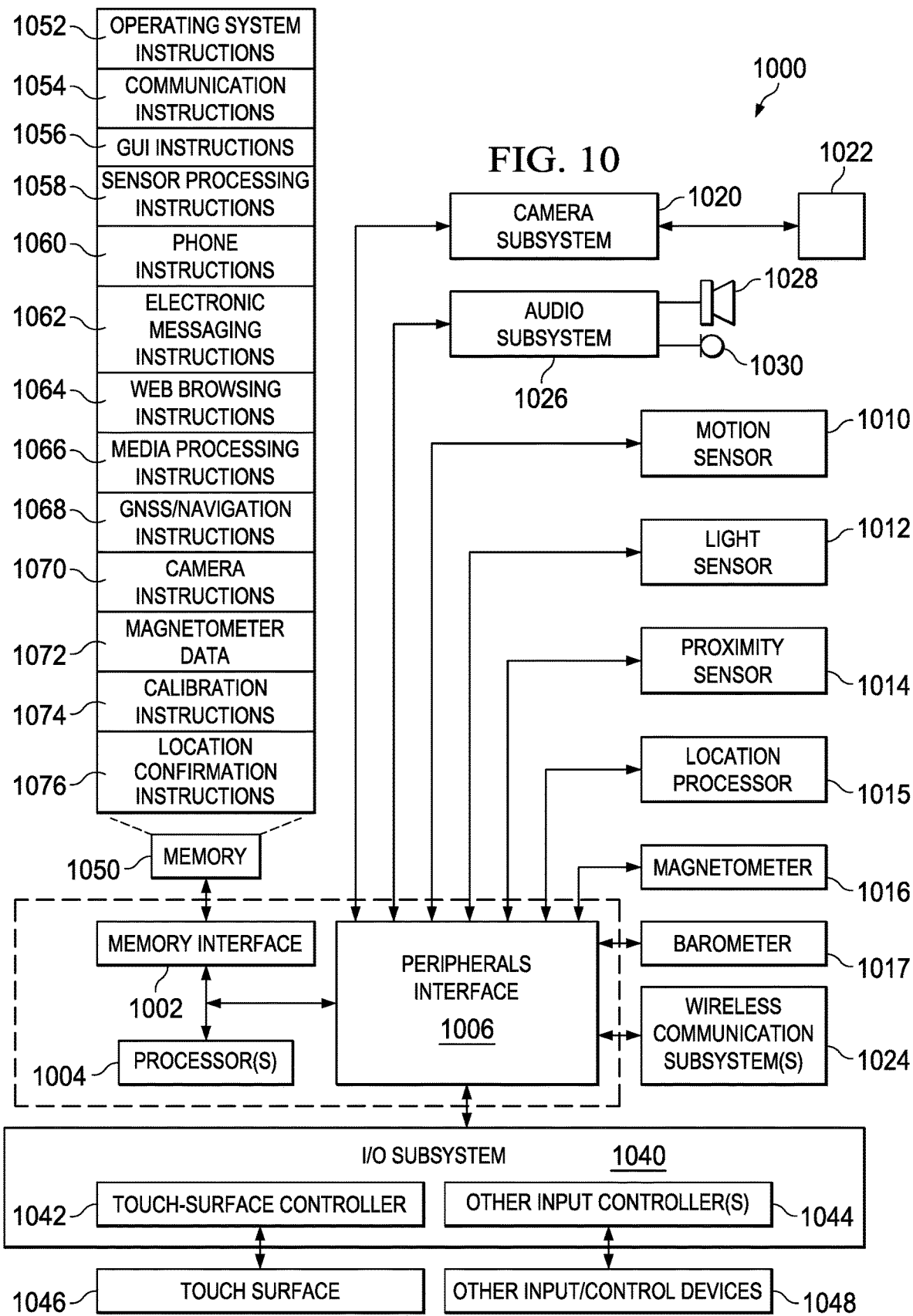
FIG. 10 is a block diagram illustrating exemplary device architecture of a mobile device implementing the features and operations of FIGS. 1-9 and FIGS. 1X-9X.

FIG. 10 is a block diagram illustrating exemplary device architecture 1000 of a mobile device implementing the features and operations of FIGS. 1-9 and FIGS. 1X-9X. A mobile device (e.g., user device 130, 140 or 150) can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. Processors 1004 can include application processors, baseband processors, and wireless processors. The various components in the mobile device, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., a Global Navigation Satellite System (GNSS) receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Motion sensor 1010 can include one or more accelerometers configured to determine change of speed and direction of movement of the mobile device. Barometer 1017 can include one or more devices connected to peripherals interface 1006 and configured to measure pressure of atmosphere around the mobile device.

Camera subsystem 1020 and an optical sensor 1022, e.g., a charged coupled device (CCD) or a complementary metal-oxide semiconductor (CMOS) optical sensor, can be utilized to facilitate camera functions, for example, recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a Wi-Fi™ or WiMAX™ network, and a Bluetooth™ network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, for example, voice recognition, voice replication, digital recording, and telephony functions. Audio subsystem 1026 can be configured to receive voice commands from the user.

I/O subsystem 1040 can include touch surface controller 1042 and/or other input controller(s) 1044. Touch surface controller 1042 can be coupled to a touch surface 1046 or pad. Touch surface 1046 and touch surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1046. Touch surface 1046 can include, for example, a touch screen.

Other input controller(s) 1044 can be coupled to other input/control devices 1048, for example, one or more buttons, rocker switches, thumb-wheel, infrared port, USB port, and/or a pointer device, for example, a stylus. The one or more buttons (not shown) can include an up/down button for volume control of speaker 1028 and/or microphone 1030.

In one implementation, a pressing of the button for a first duration may disengage a lock of the touch surface 1046; and a pressing of the button for a second duration that is longer than the first duration may turn power to the mobile device on or off. The user may be able to customize a functionality of one or more of the buttons. The touch surface 1046 also can be used, for example, to implement virtual or soft buttons and/or a keyboard.

In some implementations, a mobile device can present recorded audio and/or video files, such as MP3, AAC, and MPEG files. In some implementations, the mobile device can include the functionality of an MP3 player. The mobile device may, therefore, include a pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, iOS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS (e.g., GPS) and navigation-related processes and instructions; camera instructions 1070 to facilitate camera-related processes and functions; magnetometer data 1072 and calibration instructions 1074 to facilitate magnetometer calibration. The memory 1050 may also store other software instructions (not shown), such as security instructions, web video instructions to facilitate web video-related processes and functions, and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can store location confirmation instructions 1076. Location confirmation instructions 1076, upon execution, can cause processor 1004 to perform at least a portion of the operations of procedures 600, 800, 900, 800*x* or 900*x*.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Exemplary Operating Environment

Figure 11:
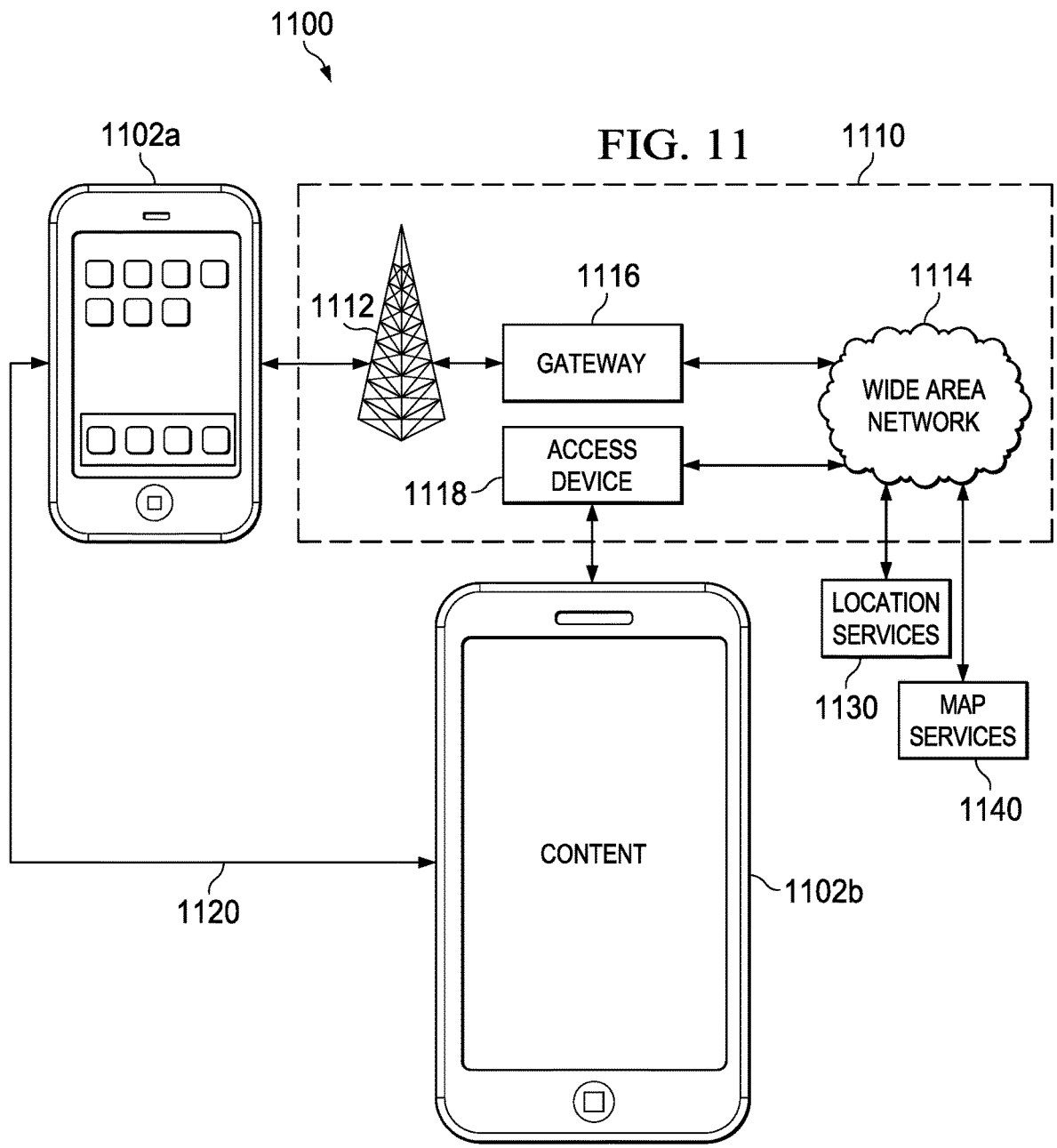
FIG. 11 is a block diagram of exemplary network operating environment for the mobile devices implementing the features and operations of FIGS. 1-9 and FIGS. 1X-9X.

FIG. 11 is a block diagram of exemplary network operating environment 1100 for the mobile devices implementing the features and operations of FIGS. 1-9 and FIGS. 1X-9X. Each of mobile device 1102*a* and mobile device 1102*b* can be a user device as described above. Mobile devices 1102*a* and 1102*b* can communicate, for example, over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access point, can provide communication access to the wide area network 1114. Each of mobile devices 1102*a* and 1102*b* can be a user device as described in FIGS. 1-7.

In some implementations, both voice and data communications can be established over wireless network 1112 and the access device 1118. For example, mobile device 1102*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102*b* can place and receive phone calls, send and receive e-mail messages, and retrieve electronic documents over the access device 1118 and the wide area network 1114. In some implementations, mobile device 1102*a* or 1102*b* can be physically connected to the access device 1118 using one or more cables and the access device 1118 can be a personal computer. In this configuration, mobile device 1102*a* or 1102*b* can be referred to as a "tethered" device.

Mobile devices 1102*a* and 1102*b* can also establish communications by other means. For example, wireless device 1102*a* can communicate with other wireless devices, e.g., other mobile devices, cell phones, etc., over the wireless network 1112. Likewise, mobile devices 1102*a* and 1102*b* can establish peer-to-peer communications 1120, e.g., a personal area network, by use of one or more communication subsystems, such as the Bluetooth™ communication devices. Other communication protocols and topologies can also be implemented.

Mobile device 1102*a* or 1102*b* can communicate, for example, with one or more services 1130 and 1140 over the one or more wired and/or wireless networks. For example, one or more location services 1130 can provide representations of addresses or and associated assumed locations for confirmation. Map services 1140 can provide a virtual map for display. The virtual map can include addresses of land features that are confirmed by a user device.

Mobile device 1102*a* or 1102*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 1102*a* or 1102*b*. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Exemplary System Architecture

Figure 12:
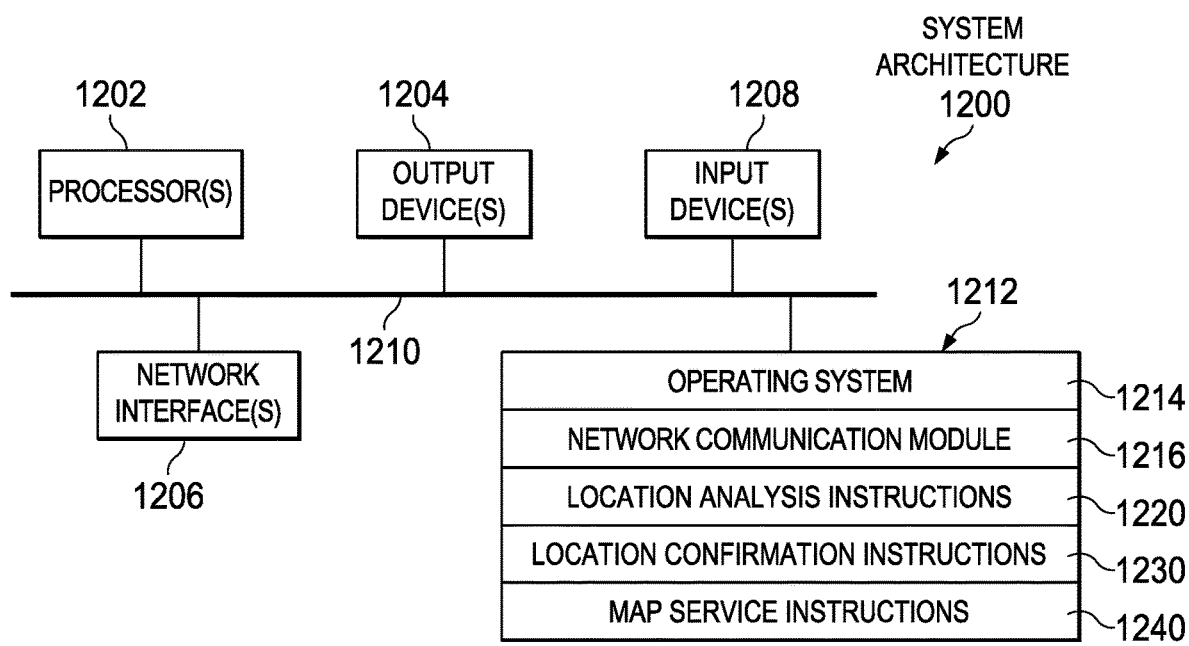
FIG. 12 is a block diagram of exemplary system architecture for implementing the features and operations of FIGS. 1-9 and FIGS. 1X-9X.

FIG. 12 is a block diagram of exemplary system architecture 1200 for implementing the features and operations of FIGS. 1-9 and FIGS. 1X-9X. Other architectures are possible, including architectures with more or fewer components. System architecture 1200 can be implemented by components of the system 100, e.g., the location server 110. In some implementations, architecture 1200 includes one or more processors 1202 (e.g., dual-core Intel® Xeon® Processors), one or more output devices 1204 (e.g., LCD), one or more network interfaces 1206, one or more input devices 1208 (e.g., mouse, keyboard, touch-sensitive display) and one or more computer-readable mediums 1212 (e.g., RAM, ROM, SDRAM, hard disk, optical disk, flash memory, etc.). These components can exchange communications and data over one or more communication channels 1210 (e.g., buses), which can utilize various hardware and software for facilitating the transfer of data and control signals between components.

The term "computer-readable medium" refers to any medium that participates in providing instructions to processor 1202 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1212 can further include operating system 1214 (e.g., Mac OS® server, Windows Server®, or iOS®), network communication module 1216, location analysis instructions 1220, location confirmation instructions 1230, and map service instructions 1240. Operating system 1214 can be multi-user, multiprocessing, multitasking, multithreading, real time, etc. Operating system 1214 performs basic tasks, including but not limited to: recognizing input from and providing output to devices 1204, 1206, 1208; keeping track and managing files and directories on computer-readable mediums 1212 (e.g., memory or a storage device); controlling peripheral devices; and managing traffic on the one or more communication channels 1210. Network communications module 1216 includes various components for establishing and maintaining network connections (e.g., software for implementing communication protocols, such as TCP/IP, HTTP, etc.). Location analysis instructions 1220 can include instructions that, when executed, cause processor 1202 to perform operations as described above in reference to FIGS. 1-9 and 1X-9X. Location confirmation instructions 1230 can include instructions that, when executed, cause processor 1202 to perform server-side operations as described above. Map service instructions 1240 can include instructions that, when executed, cause processor 1202 to provide map information to user devices. The map information can include confirmed locations of street addresses.

Architecture 1200 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of examples and implementations of the invention have been described. Nevertheless, it will be understood that various modifications and enhancements to the described examples and implementations and other implementations can be made based on what is disclosed without departing from the spirit and scope of the invention.

What is claimed is:

1. A method comprising:
   sending, by a user device to a location server, a request with information on at least one detected signal source from one or more locations;
   determining whether or not the user device is moving along a transit route based on a response to the request, wherein the response includes at least one location of the at least one detected signal source and the determining includes correlating the at least one location with the transit route;
   obtaining, by a user device, a state model that includes one or more states, each state representing the transit route designed as significant to a user of the user device, and wherein each state in the state model is further associated with a time and a stationary location that is significant to the user;
   determining a current location of the user device;
   predicting, using the state model, the current location of the user device, and a determination that the user is moving along the transit route, that a first location that corresponds to a state in the state model is a next significant location to the user;
   based on the current location of the user device, predicting, using the state model, that a first time associated with the first location in the state model is a next significant time to the user;
   in response to predicting the first location as the next significant location to the user and the first time as the next significant time to the user, determining an estimated time of arrival (ETA) using the transit route to the first location for display on the user device; and
   displaying, on a display of the user device, the transit route and the estimated time of arrival.

2. The method of claim 1, further comprising:
   displaying, on the user device, a message providing information on the estimated time duration of travel from the current location to the first location using a transit vehicle at a current time.

3. The method of claim 2, wherein providing the information comprises:
   determining that the user is travelling aboard the transit vehicle; and
   based on the current location and the current time, predicting, using the state model, that the user will disembark the transit vehicle at the first location.

4. The method of claim 2, wherein providing the information further comprises:
   identifying the first location using a descriptive label that is familiar to the user.

5. The method of claim 1, further comprising:
   sending a message to the user indicating an estimated time of arrival (ETA) of one or more transit vehicles at the first location.

6. The method of claim 5, wherein determining the ETA of one or more transit vehicles at the first location comprises:
   determining that the user is travelling aboard a particular transit vehicle; and
   based on the current location and the current time, predicting, using the state model, that the user will disembark the particular transit vehicle at the first location.

7. The method of claim 1, wherein determining the estimated time duration of travel from the current location to the first location using a transit vehicle at the current time comprises:
   determining, based on cached information, that the user is expected to board the transit vehicle at the current location at the current time.

8. The method of claim 1, wherein determining the estimated time duration of travel from the current location to the first location using a transit vehicle at the current time comprises:
   communicating, by the user device with a location server through a network connection; and
   obtaining, from the location server, an estimated time of arrival (ETA) of one or more transit vehicles at the current location.

9. A non-transitory computer-readable medium storing instructions that, when executed by one or more processors, cause the one or more processors to perform operations comprising:
   sending, by a user device to a location server, a request with information on at least one detected signal source from one or more locations;
   determining whether or not the user device is moving along a transit route based on a response to the request, wherein the response includes at least one location of the at least one detected signal source and the determining includes correlating the at least one location with the transit route;
   obtaining, by a user device, a state model that includes one or more states, each state representing the transit route designed as significant to a user of the user device, and wherein each state in the state model is further associated with a time and a stationary location that is significant to the user;
   determining a current location of the user device;

predicting, using the state model, the current location of the user device, and a determination that the user is moving along the transit route, that a first location that corresponds to a state in the state model is a next significant location to the user;

based on the current location of the user device, predicting, using the state model, that a first time associated with the first location in the state model is a next significant time to the user;

in response to predicting the first location as the next significant location to the user and the first time as the next significant time to the user, determining an estimated time of arrival (ETA) using the transit route to the first location for display on the user device; and displaying, on a display of the user device, the transit route and the estimated time of arrival.

10. The non-transitory computer-readable medium of claim 9, further comprising:
    displaying, on the user device, a message providing information on the estimated time duration of travel from the current location to the first location using a transit vehicle at the current time.

11. The non-transitory computer-readable medium of claim 10, wherein providing the information comprises:
    determining that the user is travelling aboard the transit vehicle; and
    based on the current location and the current time, predicting, using the state model, that the user will disembark the transit vehicle at the first location.

12. The non-transitory computer-readable medium of claim 10, wherein providing the information further comprises:
    identifying the first location using a descriptive label that is familiar to the user.

13. The non-transitory computer-readable medium of claim 9, further comprising:
    sending a message to the user indicating an estimated time of arrival (ETA) of one or more transit vehicles at the first location.

14. The non-transitory computer-readable medium of claim 13, wherein indicating the ETA further comprises:
    identifying the first location using a descriptive label that is familiar to the user.

15. The non-transitory computer-readable medium of claim 13, wherein determining the ETA of one or more transit vehicles at the first location comprises:
    determining that the user is travelling aboard a particular transit vehicle; and
    based on the current location and the current time, predicting, using the state model, that the user will disembark the particular transit vehicle at the first location.

16. The non-transitory computer-readable medium of claim 9, wherein determining the estimated time duration of travel from the current location to the first location using a transit vehicle at the current time comprises:

determining, based on cached information, that the user is expected to board the transit vehicle at the current location at the current time.

17. The non-transitory computer-readable medium of claim 9, wherein determining the estimated time duration of travel from the current location to the first location using a transit vehicle at the current time comprises:
    communicating, by the user device with a location server through a network connection; and
    obtaining, from the location server, an estimated time of arrival (ETA) of one or more transit vehicles at the current location.

18. A system comprising:
    a user device that is configured to perform operations comprising:
    sending, by a user device to a location server, a request with information on at least one detected signal source from one or more locations;
    determining whether or not the user device is moving along a transit route based on a response to the request, wherein the response includes at least one location of the at least one detected signal source and the determining includes correlating the at least one location with the transit route;
    obtaining, by a user device, a state model that includes one or more states, each state representing the transit route designed as significant to a user of the user device, and wherein each state in the state model is further associated with a time and a stationary location that is significant to the user;
    determining a current location of the user device;
    predicting, using the state model, the current location of the user device, and a determination that the user is moving along the transit route, that a first location that corresponds to a state in the state model is a next significant location to the user;
    based on the current location of the user device, predicting, using the state model, that a first time associated with the first location in the state model is a next significant time to the user;
    in response to predicting the first location as the next significant location to the user and the first time as the next significant time to the user, determining an estimated time of arrival (ETA) using the transit route to the first location for display on the user device; and
    displaying, on a display of the user device, the transit route and the estimated time of arrival.

19. The system of claim 18, wherein the operations further comprise:
    displaying, on the user device, a message providing information on the estimated time duration of travel from the current location to the first location using a transit vehicle at a current time.

20. The system of claim 19, wherein providing the information further comprises:
    identifying the first location using a descriptive label that is familiar to the user.

* * * * *